United States Patent
Itoh et al.

(10) Patent No.: US 7,630,692 B2
(45) Date of Patent: Dec. 8, 2009

(54) INFORMATION PROCESSING APPARATUS AND COMMUNICATION APPARATUS

(75) Inventors: Katsutoshi Itoh, Tokyo (JP); Masanori Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/329,744

(22) Filed: Jan. 11, 2006

(65) Prior Publication Data

US 2006/0105719 A1  May 18, 2006

Related U.S. Application Data

(63) Continuation of application No. 10/181,300, filed on Nov. 4, 2002.

(51) Int. Cl.
*H04B 1/00* (2006.01)
*H04B 7/00* (2006.01)
*H04B 17/00* (2006.01)

(52) U.S. Cl. ............ 455/69; 455/67.11; 455/522; 455/515; 370/204

(58) Field of Classification Search ............ 455/69, 455/67.11, 522, 515; 370/204
See application file for complete search history.

(56) References Cited

U.S. PATENT DOCUMENTS

| | | | |
|---|---|---|---|
| 5,842,113 A | | 11/1998 | Nanda et al. |
| 5,982,760 A | * | 11/1999 | Chen .................... 370/335 |
| 6,151,512 A | * | 11/2000 | Chheda et al. ........ 455/562.1 |
| 6,253,063 B1 | * | 6/2001 | Cudak et al. .......... 455/63.1 |
| 6,597,894 B1 | * | 7/2003 | Ue et al. ............... 455/69 |
| 6,618,375 B2 | | 9/2003 | Razaiffar et al. |
| 6,621,808 B1 | * | 9/2003 | Sadri ..................... 370/335 |
| 6,690,652 B1 | * | 2/2004 | Sadri ..................... 455/522 |
| 6,700,881 B1 | * | 3/2004 | Kong et al. ............. 370/335 |
| 6,807,264 B1 | | 10/2004 | Almgren et al. |
| 6,823,193 B1 | | 11/2004 | Persson et al. |
| 7,099,384 B1 | * | 8/2006 | Jalali et al. ............. 375/229 |
| 2005/0208961 A1 | * | 9/2005 | Willenegger ........... 455/522 |

FOREIGN PATENT DOCUMENTS

| | | |
|---|---|---|
| EP | 0 680 160 | 11/1995 |
| EP | 0 986 282 | 3/2000 |
| EP | 1 122 965 | 8/2001 |
| EP | 1 128 573 | 8/2001 |
| JP | 7-226709 | 8/1995 |
| JP | 9-312649 | 12/1997 |
| JP | 2000-49663 | 2/2000 |
| JP | 2001-238251 | 8/2001 |
| WO | WO 97 18643 | 5/1997 |
| WO | WO 99/55112 | 10/1999 |
| WO | WO 00 45527 | 8/2000 |

* cited by examiner

*Primary Examiner*—Yuwen Pan
*Assistant Examiner*—Wen W Huang
(74) *Attorney, Agent, or Firm*—Frommer Lawrence & Haug LLP; William S. Frommer; Thomas F. Presson

(57) ABSTRACT

An information processing apparatus and a communication apparatus for accurately recognizing at the base station the current receiving quality of the mobile terminals for improving the throughput of the base station. A mobile terminal determines its own receiving quality based on the signal received from the base station for generating the receiving quality message indicating the receiving quality and generates the power control information requesting the transmission power of the base station. The receiving quality message is transmitted at a frame rate and power control information is transmitted at the slot rate to the base station. Based on both the receiving quality message and power control information, the base station estimates the current receiving quality of the mobile terminal and adaptive modulation and coding is performed based on the estimated value.

26 Claims, 44 Drawing Sheets

FIG.4
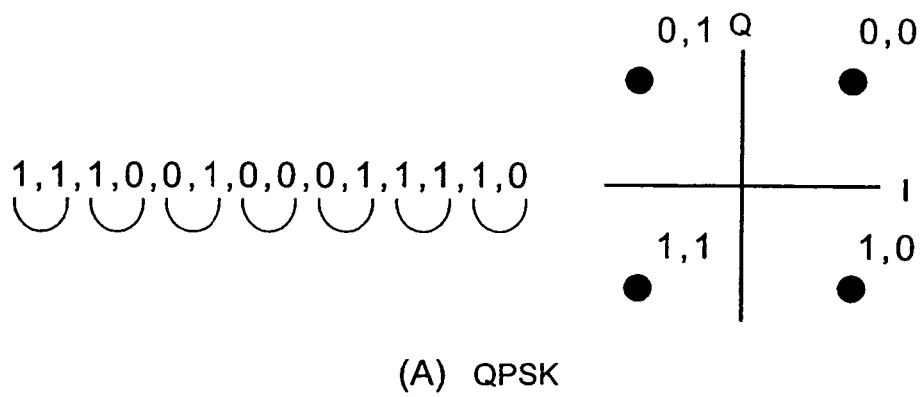
(A) QPSK
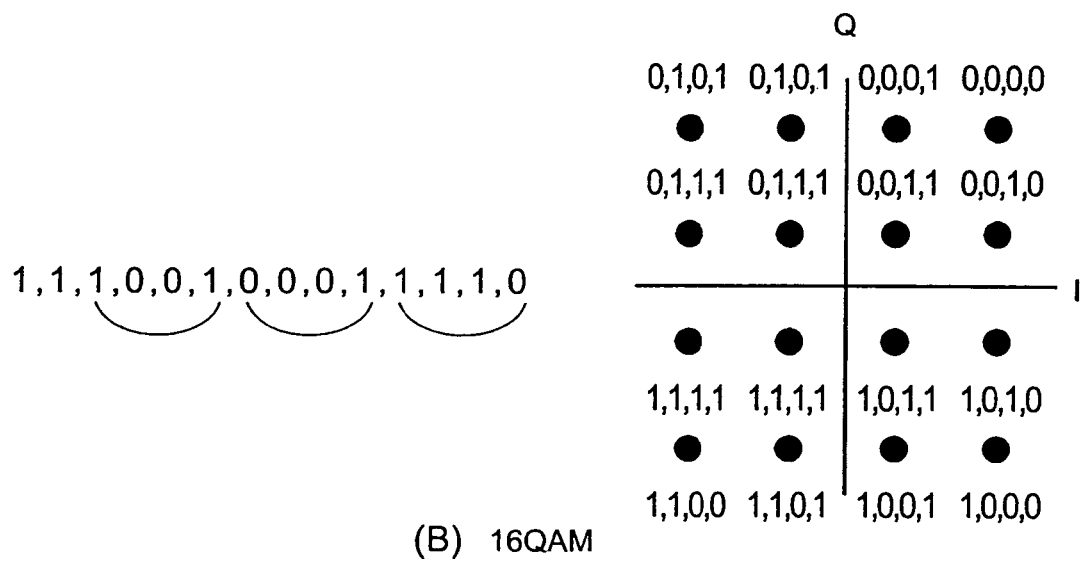
(B) 16QAM

FIG.5

| MODULATION CODING MODE | CODING METHOD | MODULATION METHOD |
|---|---|---|
| #0 | R=1/2 | QPSK |
| #1 | R=1/2 | 16-QAM |
| #2 | R=3/4 | 16-QAM |

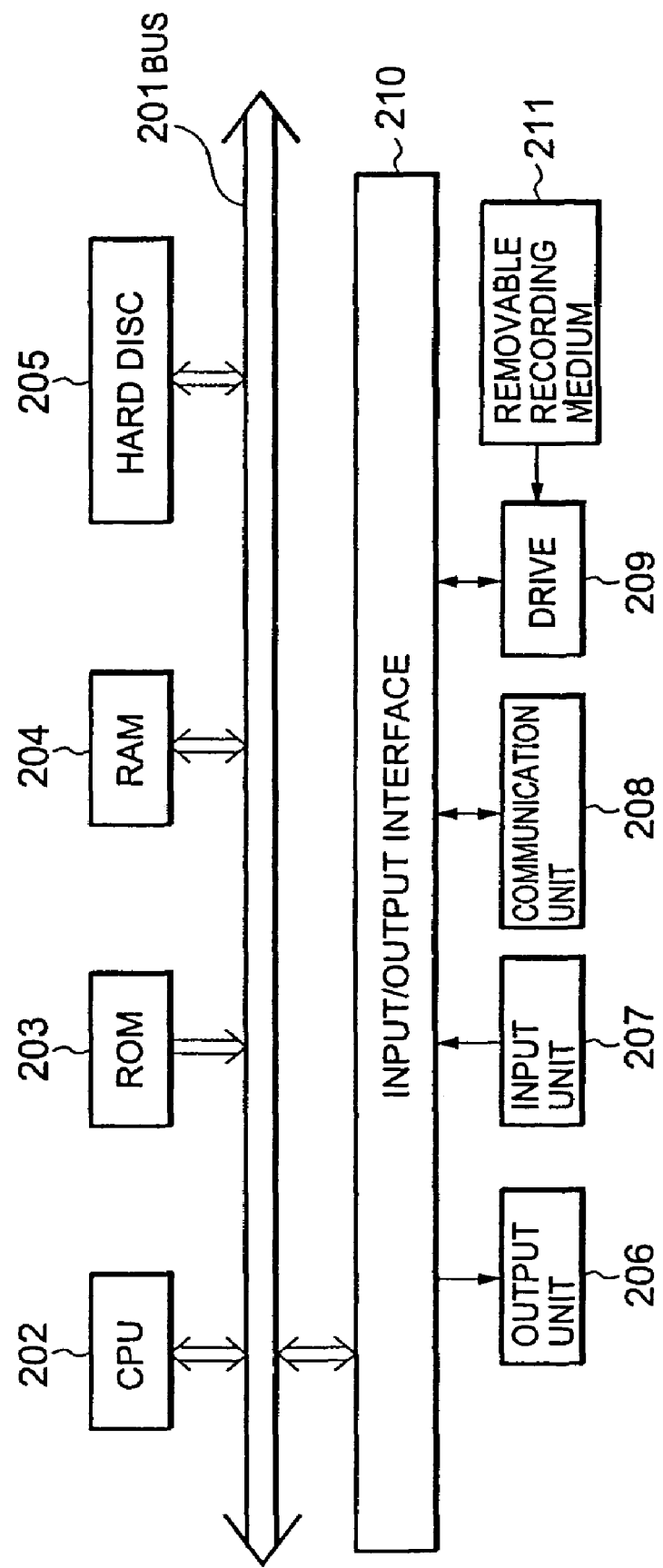

INFORMATION PROCESSING APPARATUS AND COMMUNICATION APPARATUS

This application is a Continuation of U.S. application Ser. No. 10/181,300, filed Nov. 4, 2002, now pending, which is hereby incorporated by reference in its entirety herein.

TECHNICAL FIELD

The present invention relates to an information processing apparatus and a communication apparatus and more specifically to an information processing apparatus and a communication apparatus capable of efficient communication by accurately recognizing the current receiving quality at a base station in, e.g., a cellular phone system.

BACKGROUND ART

In recent years, attention is paid to an adaptive modulation and communication system (sometimes referred to as AMCS communication system hereunder). The adaptive modulation and coding communication system features in varying the coding rate indicating the ratio of the actual data (user data) and error correction codes for the actual data and the multi-level modulation factor in response to the quality of the transmission line. In high quality transmission lines, high speed data transmission is possible in sacrifice of noise resistance characteristic. On the other hand, in lower quality transmission lines, noise resistance characteristic is improved in sacrifice of data rate.

The AMCS communication system is applied to, for example, an EGPRS (Enhanced General Packet Radio Service) used in a GSM (Global System for Mobile Communications) and a wireless communication system such as an HDR (High Data Rate) developed by Qualcomm Corporation. Furthermore, the AMCS communication system is planned to be utilized in the W-CDMA (Wide Band Code Division Multiple Access) system which is forecasted to gain popularity in future.

Incidentally, the AMCS communication system may be applied to communication between, e.g., mobile terminals as movable stations and a base station as a fixed station. In the AMCS communication system, mobile terminals send to the base station a receiving quality message indicating their receiving quality and the base station determines the modulation coding mode based on the receiving quality message transmitted from the mobile terminal 1.

However, there is considerable delay between a mobile terminal determining its receiving quality and the base station recognizing it because the base station must receive the receiving quality message and demodulates and decodes such message.

Accordingly, at the time when the base station recognized the receiving quality indicated by the receiving quality message, the current receiving quality of the mobile terminal might have changed. This means that the optimum modulation coding mode cannot be chosen, thereby degrading the transmission efficiency.

Such problem is more significant especially when the mobile terminal user is moving in a high speed train or the like, thereby encountering very rapid change in characteristics of the transmission path.

On the other hand, from the viewpoint of improvement of the transmission efficiency, it is preferable to increase the period of transmission of the receiving quality message of the mobile terminal. However, in this case, the current receiving quality of the mobile terminal may largely depart from the receiving quality indicated by the receiving quality message, thereby adversely affecting the improvement of the transmission efficiency by the adaptive modulation coding.

DISCLOSURE OF THE INVENTION

The present invention has been made in view of the above problems and enables to improve transmission efficiency (or preventing degradation of the transmission efficiency) by accurately recognizing the current receiving quality of the mobile terminal in, e.g., base station.

A first information processing apparatus according to the present invention is characterized by the provision of the receiving quality estimation means for estimating the current receiving quality in a communication apparatus based on both the receiving quality message to be transmitted from the communication apparatus at a first interval and a power control information to be transmitted at a second interval shorter than the first interval.

A first information processing method according to the present invention is characterized in a provision of a receiving quality estimation step for estimating the current receiving quality of a communication apparatus based on both the receiving quality message to be transmitted from the communication apparatus at a first interval and a power control information to be transmitted at a second interval shorter than the first interval.

A first program according to the present invention is characterized by the provision of a receiving quality estimation step for estimating the current receiving quality of a communication apparatus based on both a receiving quality message to be transmitted from the communication apparatus at a first interval and a power control information to be transmitted at a second interval shorter than the first interval.

A first recording medium according to the present invention is characterized by recording a program including a receiving quality estimation step for estimating the current receiving quality of a communication apparatus based on both the receiving quality message to be transmitted from the communication apparatus at a first interval and a power control information to be transmitted at a second interval shorter than the first interval.

A first communication apparatus according to the present invention comprises receiving quality message generation means for generating a receiving quality message indicating the receiving quality by obtaining the receiving quality based on the signal received by the communication apparatus from an information processing apparatus, power control information generation means for generating the power control information to request transmission power adjustment of the information processing apparatus based on the signal received therefrom, receiving quality message insertion means for inserting into the transmission signal to the information processing apparatus in such a manner that the receiving quality message is transmitted at a first interval and power control information insertion means for inserting the power control information into the transmission signal in such a manner that the power control information is transmitted at a second interval shorter than the first interval.

A first communication method according to the present invention comprises a receiving quality message generation step for generating a receiving quality message indicating the receiving quality by obtaining a receiving quality thereof based on the signal received from an information processing apparatus, a power control information generation step for generating a power control information to request transmission power adjustment of the information processing apparatus based on the signal received therefrom, a receiving quality message insertion step for inserting the receiving quality message into the transmission signal to the information processing apparatus in such a manner that the receiving quality message is transmitted at a first interval and a power control information insertion step for inserting a power control information into the transmission signal in such a manner that the power control information is transmitted at a second interval shorter than the first interval.

A second program according to the present invention comprises a receiving quality message generation step for generating a receiving quality message indicating the receiving quality by obtaining a receiving quality thereof based on the signal received from an information processing apparatus, a power control information generation step for generating a power control information to request transmission power adjustment of the information processing apparatus, a receiving quality message insertion step for inserting the receiving quality message into the transmission signal to the information processing apparatus in such a manner that the receiving quality message is transmitted at a first interval and a power control information insertion step for inserting the power control information into the transmission signal in such a manner that the power control information is transmitted at a second interval shorter than the first interval.

A second recording medium according to the present invention is characterized by recording a program comprising a receiving quality message generation step for generating a receiving quality message indicating the receiving quality by obtaining a receiving quality thereof based on the signal received from an information processing apparatus, a power control information generation step for generating a power control information to request transmission power adjustment of the information processing apparatus based on the signal received form the information processing apparatus, a receiving quality message insertion step for inserting the receiving quality message into the transmission signal to the information processing apparatus in such a manner that the receiving quality message is transmitted at a first interval and a power control information insertion step for inserting the power control information into the transmission signal in such a manner that the power control information is transmitted at a second interval shorter than the first interval.

A first communication system according to the present invention is characterized by receiving quality message generation means for generating a receiving quality message indicating the receiving quality by obtaining a receiving quality thereof based on the signal received by a communication apparatus from an information processing apparatus, power control information generation means for generating a power control information to instruct transmission power adjustment of the information processing apparatus based on the signal received therefrom, receiving quality message insertion means for inserting the receiving quality message into the transmission signal to the information processing apparatus in such a manner that the receiving quality message is transmitted at a first interval and power control information insertion means for inserting the power control signal into the transmission signal in such a manner that the power control signal is transmitted at a second interval shorter than the first interval, wherein the information processing apparatus comprises receiving quality estimation means for estimating the current receiving quality of the communication apparatus based on both the receiving quality message and the power control information.

A second communication method according to the present invention characterized by the communication method in a communication apparatus comprises a receiving quality message generation means for generating a receiving quality indicating the receiving quality by obtaining a receiving quality thereof based on the signal received therefrom, a power control information generation step for generating a power control information to request transmission power adjustment of the information processing apparatus based on the signal received from the information processing apparatus, a receiving quality message insertion step for inserting the receiving quality message into the transmission signal to the information processing apparatus in such a manner that the receiving quality message is transmitted at a first interval and a power control information insertion step for inserting the power control information into the transmission signal in such a manner that the power control information is transmitted at a second interval shorter than the first interval, and the communication method in the information processing apparatus comprises a receiving quality estimation step for estimating the current receiving quality of the communication apparatus based on both the receiving quality message and the power control information.

A second information processing apparatus according to the processing apparatus comprises mode request message acquisition means for acquiring a mode request message transmitted from a communication apparatus at a first interval, power control information acquisition means for acquiring a power control information to request transmission power adjustment transmitted from the communication apparatus at a second interval shorter than the first interval and transmission mode setting means for setting a transmission mode of the communication apparatus based on both the mode request message and the power control information.

A second information processing method according to the present invention is characterized by a mode request message acquisition step for acquiring a mode request message transmitted from a communication apparatus at a first interval, a power control information acquisition step for acquiring a power control information to request transmission power adjustment transmitted from the communication apparatus at a second interval shorter than the first interval and a transmission mode setting step for setting the transmission mode of the communication apparatus based on both the mode request message and the power control information.

A third program according to the present invention is characterized by a mode request message acquisition step for acquiring a mode request message transmitted from a communication apparatus at a first interval, a power control information acquisition step for acquiring a power control information to request transmission power adjustment transmitted form the communication apparatus at a second interval shorter than the first interval and a transmission mode setting step for setting a transmission mode of the communication apparatus based on both the mode request message and the power control information.

A third recording medium according to the present invention is characterized by recording a program comprising a mode request message acquisition step for acquiring a mode request message transmitted from a communication apparatus at a first interval a power control information acquisition step for acquiring a power control information requesting transmission power adjustment transmitted from the communication apparatus at a second interval shorter than the first interval and a transmission mode setting step for setting the transmission mode of the communication apparatus based on both the mode request message and the power control information.

A second communication apparatus according to the present invention is characterized by a mode request message generation means for generating a mode request message indicating the requesting transmission mode based on a receiving quality thereof obtained based on the signal received from an information processing apparatus, power control information generation means for generating a power control information to request transmission power adjustment of the information processing apparatus based on the signal received therefrom, mode request message insertion means for inserting a mode request message into the transmission signal to the information processing apparatus in such a manner that the mode request message is transmitted at a first interval and power control information insertion means for inserting a power control information into the transmission signal in such a manner that the power control information is transmitted at a second interval shorter than the first interval.

A second communication apparatus according to the present invention is characterized by a mode request message generation means for generating a mode request message indicating a requesting transmission mode based on a receiving quality obtained based on the signal received from an information processing apparatus, power control information generation means for generating a power control information to request transmission power adjustment of the information processing apparatus based on the signal received form the information processing apparatus, mode request message insertion means for inserting the mode request message into the transmission signal to the information processing apparatus in such a manner that the mode request message is transmitted at a first interval and power control information insertion means for inserting the power control information into the transmission signal in such a manner that the power control information is transmitted at a second interval shorter than the first interval.

A third communication method according to the present invention is characterized by a mode request message generation step for generating a mode request message indicating a requesting transmission mode based on an obtained receiving quality based on the signal received from the information processing apparatus, a power control information generation step for generating a power control information to request transmission power adjustment of the information processing apparatus based on the signal received from the information processing apparatus, a mode request message insertion step for inserting the mode request message into the transmission signal to the information processing apparatus in such a manner that the mode request message is transmitted at a first interval and a power control information insertion step for inserting the power control information into the transmission signal in such a manner that the power control information is transmitted at a second interval shorter than the first interval.

A fourth program according to the present invention comprises a mode request message generation step for generating a mode request message indicating a requesting transmission mode based on an obtained receiving quality based on the signal received from the information processing apparatus, a power control information generation means for generating a power control information requesting transmission power adjustment of the information processing apparatus based on the signal received therefrom, a mode request message insertion step for inserting the mode request message into the transmission signal to the information processing apparatus in such a manner that the mode request message is transmitted at a first interval and a power control information insertion step for inserting the power control information into the transmission signal in such a manner that the power control information is transmitted at a second interval shorter than the first interval.

A fourth recording medium according to the present invention is characterized by recording a program comprising a mode request message generation step for generating a mode request message indicating the requesting transmission mode based on an obtained receiving quality based on the signal received from an information processing apparatus, a power control information generation step for generating a power control information to request transmission power adjustment of the information processing apparatus based on the signal received from the information processing apparatus, a mode request message insertion step for inserting the mode request message into the transmission signal to information processing apparatus in such a manner that the mode request message is transmitted at a first interval and a power control information insertion step for inserting the power control information into the transmission signal in such a manner that the power control information is transmitted at a second interval shorter than the first interval.

A second communication system according to the present invention is characterized by a communication apparatus and an information processing apparatus; the communication apparatus comprising: mode request message generation means for generating a mode request message indicating the requesting transmission mode based on an obtained receiving quality based on the signal received from the information processing apparatus; power control information generation means for generating a power control information to request transmission power adjustment of the information processing apparatus based on the signal received therefrom; mode request message insertion means for inserting the mode request message into the transmission signal to the information processing apparatus in such a manner that the mode request message is transmitted at a first interval; and power control information inserting means for inserting the power control information into the transmission signal in such a manner that the power control information is transmitted at a second interval shorter than the first interval; and the information processing apparatus comprising: mode request message acquisition means for acquiring the mode request message transmitted from the communication apparatus at the first interval; power control information acquisition means for acquiring the power control information transmitted from the communication apparatus at the second interval; and transmission mode setting means for setting the transmission mode of the communication apparatus based on both the mode request message and the power control information.

A fourth communication method according to the present invention is characterized by the communication method in a communication apparatus comprising: a mode request message generation step for generating a mode request message indicating the requesting transmission mode based on an obtained receiving quality of the signal received from an information processing apparatus; a mode request message insertion step for inserting the mode request message into the transmission signal to the information processing apparatus in such a manner that the mode request message is transmitted at a first interval; and a power control information insertion step for inserting a power control information into the transmission signal in such a manner that the power control information is transmitted at a second interval shorter than the first interval; and the communication method of the information processing apparatus comprising: a mode request message acquisition step for acquiring the mode request message transmitted from the communication apparatus at the first interval; a power control information acquisition step for acquiring the power control information transmitted form the communication apparatus at the second interval; and a transmission mode setting step for setting the transmission mode of the communication apparatus based on both the mode request message and the power control information.

A third information processing apparatus is characterized by a receiving quality message acquisition means for acquiring the receiving quality message indicating a requested receiving quality in the communication apparatus transmitted from a communication apparatus at every predetermined number of frames and receiving quality estimation means for estimating the current receiving quality of the communication apparatus based on the received quality message.

A third communication apparatus according to the present invention is characterized by a receiving quality message generation means for generating a receiving quality message indicating the receiving quality by obtaining a receiving quality thereof at every predetermined number of frames based on the signal received from an information processing apparatus and receiving quality message insertion means for inserting the receiving quality message into the transmission signal to the information processing apparatus at every predetermined number of frames.

A fourth information processing apparatus according to the present invention is characterized by a receiving quality message acquisition means for acquiring a receiving quality message indicating the requested receiving quality in a communication apparatus transmitted at every predetermined number of frames and receiving quality estimation means for estimating the current receiving quality of the communication apparatus based only on the receiving quality message when the communication apparatus is under the soft hand-off condition.

A fourth communication apparatus according to the present invention is characterized by a receiving quality message generation means for generating a receiving quality message indicating the receiving quality by obtaining a receiving quality thereof at every predetermined frame and receiving quality message insertion means for inserting the receiving quality message into the transmission signal to an information processing apparatus at every predetermined frame under the soft hand-off condition.

A first receiving quality message report controlling method according to the present invention is characterized by a first step for recognizing whether or not the communication apparatus is under the soft hand-off condition and a second step for setting the reporting period of the receiving quality message of the communication apparatus.

A fifth information processing apparatus according to the present invention is characterized by a receiving quality message acquisition means for acquiring the receiving quality message indicating the receiving quality that is obtained in a communication apparatus and transmitted from the communication apparatus at a predetermined frequency and receiving quality estimation means for estimating the current receiving quality of the communication apparatus based on the receiving quality message, wherein the receiving quality message acquisition means acquires the receiving quality message at higher frequency under the soft hand-off condition than under other conditions.

A fifth communication, apparatus according to the present invention is characterized by a receiving quality message generation means for generating a receiving quality message indicating the receiving quality that is obtained at a predetermined frequency based on the signal received from an information processing apparatus and receiving quality message insertion means for inserting the receiving quality message into the transmission signal to the information processing apparatus, wherein the receiving quality message generation means generates the receiving quality message at higher frequency under the soft hand-off condition than under other conditions.

A second receiving quality message report controlling method according to the present invention is characterized by a first step for recognizing the condition of the communication resources to communicate with a communication apparatus and a second step for setting the period of reporting the receiving quality message in the communication apparatus in response to the condition of the communication resources.

A sixth information processing apparatus according to the present invention is characterized by a receiving quality message acquisition means for acquiring a receiving quality message indicating the receiving quality obtained in a communication apparatus and transmitted from the communication apparatus at a predetermined frequency and receiving quality estimation means for estimating the current receiving quality of the communication apparatus based on the receiving quality message, wherein the period of transmitting the receiving quality message from the communication apparatus is determined in response to the condition of the communication resources.

A sixth communication apparatus according to the present invention is characterized by a quality message indicating the receiving quality by obtaining a receiving quality thereof at a predetermined frequency based on the signal received from an information processing apparatus and receiving quality message insertion means for inserting the receiving quality message into the transmission signal to the information processing apparatus at the predetermined frequency, wherein the receiving quality message generated by the receiving quality message generation means is generated at the period which is determined in response to the condition of the communication resources.

In the first information processing apparatus, the first information processing method, the first program and the first recording medium according to the present invention, the current receiving quality in the communication apparatus is estimated based on both the receiving quality message transmitted form the communication apparatus at the first interval and the power control information transmitted at the second interval shorter than the first interval.

In the first communication apparatus, the first communication method, the second program and the second recording medium according to the present invention, a receiving quality thereof is obtained based on the signal received form the information processing apparatus for generating the receiving quality message indicating the receiving quality as well as the power control information for requesting transmission power adjustment of the information processing apparatus. And the receiving quality message is inserted into the transmission signal to the information processing apparatus so that the receiving quality message is transmitted at the first interval and the power control information is inserted into the transmission signal so that it is transmitted at the second interval shorter than the first interval.

In the first communication system and the first communication method according to the present invention, the receiving quality of the communication apparatus is obtained based on the receiving signal received form an information processing apparatus for generating the receiving quality message indicating the receiving quality as well as generating the power control information to request transmission power adjustment of the information processing apparatus. And the receiving quality message is inserted into the transmission signal to the information processing apparatus at the first interval and the power control information is inserted into the transmission signal at the second interval shorter than the first interval.

In the first communication system and the second communication method according to the present invention, the receiving quality in the communication apparatus is obtained based on the receiving signal received from the information processing apparatus for generating the receiving quality message indicating the receiving quality as well as the power control information for requesting transmission power adjustment of the information processing apparatus. And the receiving quality message is inserted into the transmission signal to the information processing apparatus to be transmitted at the first interval and the power control information is inserted into the transmission signal to be transmitted at the second interval shorter than the first interval. On the other hand, in the information processing apparatus, the current receiving quality in the communication apparatus is estimated based on both the receiving quality message and the power control information.

In the second information processing apparatus, the second information processing method, the third program and the third recording medium according to the present invention, acquired are the mode request message transmitted from the communication apparatus at the first interval and the power control information to request adjustment of the transmission power transmitted form the communication apparatus at the second interval shorter than the first interval. And the transmission mode of the communication apparatus is set based on both the mode request message and the power control information.

In the second communication apparatus, the third communication method, the fourth program and the fourth recording medium according to the present invention, the receiving quality is obtained based on the receiving signal received form the information processing apparatus for generating the mode request message indicating the requesting transmission mode and the power control information requesting transmission power adjustment of the information processing apparatus based on the receiving quality. And the mode request message is inserted into the transmission signal to the information processing apparatus to be transmitted at the first interval and the power control information is inserted into the transmission signal at the second interval shorter than the first interval.

In the second communication system and the fourth communication method according to the present invention, the receiving quality in the communication apparatus is obtained based on the receiving signal received from the information processing apparatus for generating the mode request message indicating the requesting transmission mode and the power control information for requesting transmission power adjustment of the information processing apparatus based on the receiving quality. And the mode request message is inserted into the transmission signal to the information processing apparatus to be transmitted at the first interval and the power control information is inserted into the transmission signal to be transmitted at the second interval shorter than the first interval. On the other hand, in the information processing apparatus, acquired from the communication apparatus are the mode request message to be transmitted at the first interval and the power control information to be transmitted at the second interval. And the transmission mode to the communication apparatus is set based on both the mode request message and the power control information.

In the third information processing apparatus according to the present invention, the receiving quality message indicating the receiving quality as obtained in the communication apparatus and transmitted from the communication apparatus at every predetermined number of frames is acquired for estimating the current receiving quality of the communication apparatus based on the receiving quality message.

In the third communication apparatus according to the present invention, a receiving quality thereof is obtained at every predetermined number of frames based on the receiving signal received from the information processing apparatus for generating the receiving quality message indicating the receiving quality. And the receiving quality message is inserted into the transmission signal to the information processing apparatus at every predetermined number of frames.

In the fourth information processing apparatus according to the present invention, when the communication apparatus is under the soft hand-off condition, the receiving quality message obtained in the communication apparatus indicating the receiving quality and transmitted at every predetermined frame is acquired for estimating the current receiving quality of the communication apparatus based only on the receiving quality message.

In the fourth communication apparatus according to the present invention, when under the soft hand-off condition, a receiving quality thereof is obtained at every predetermined frame for generating the receiving quality message indicating the receiving quality. And the receiving quality message is inserted into the transmission signal to the information processing apparatus at every predetermined frame.

In the first receiving quality message report controlling method according to the present invention, judgment is made whether or not the communication apparatus is under the soft hand-off condition and the period of receiving quality message report in the communication apparatus is set in response to the soft hand-off condition.

In the fifth information processing apparatus according to the present invention, acquired is the receiving quality message indicating the receiving quality obtained in the communication apparatus and transmitted form the communication apparatus at a predetermined frequency. The current receiving quality of the communication apparatus is estimated based on the receiving quality message. In this case, if the communication apparatus is under the soft hand-off condition, the receiving quality message is acquired more frequently than in any other condition.

In the fifth communication apparatus according to the present invention, a receiving quality thereof is obtained at a predetermined frequency based on the receiving signal received from the information processing apparatus for generating the receiving quality message indicating the receiving quality. And the receiving quality message is inserted into the transmission signal to the information processing apparatus. In this case, if the communication apparatus is under the soft hand-off condition, the receiving quality message is generated more frequently than under other conditions.

In the second receiving quality message report controlling method according to the present invention, communication resources condition for communication with the communication apparatus is recognized for setting the interval for the receiving quality message report in the communication apparatus.

In the sixth information processing apparatus according to the present invention, the receiving quality message indicating the receiving quality message indicating the receiving quality is recognized as obtained in the communication apparatus and transmitted from the communication apparatus at a predetermined frequency. The current receiving quality in the communication apparatus is estimated based on the receiving quality message. In this case, the interval of transmitting the receiving quality message from the communication apparatus is determined based on the condition of the communication resources.

In the sixth communication apparatus according to the present invention, a receiving quality thereof based on the receiving signal received from the information processing apparatus at a predetermined frequency for generating the receiving quality message indicating the receiving quality may be obtained. In addition, the receiving quality message is inserted into the transmission signal to the information processing apparatus at the predetermined frequency. In this case, the receiving quality message is generated at the interval that is determined in response to the condition of the communication resources.

BRIEF DESCRIPTION OF DRAWINGS

FIG. 4 are illustrations for describing QPSK and 16QAM.

FIG. 5 is a table for showing the coded modulation mode.

FIG. 45 is a block diagram of an example of a construction for an embodiment of a computer to which the present invention is applied.

BEST MODE OF IMPLEMENTING THE INVENTION

Figure 1:
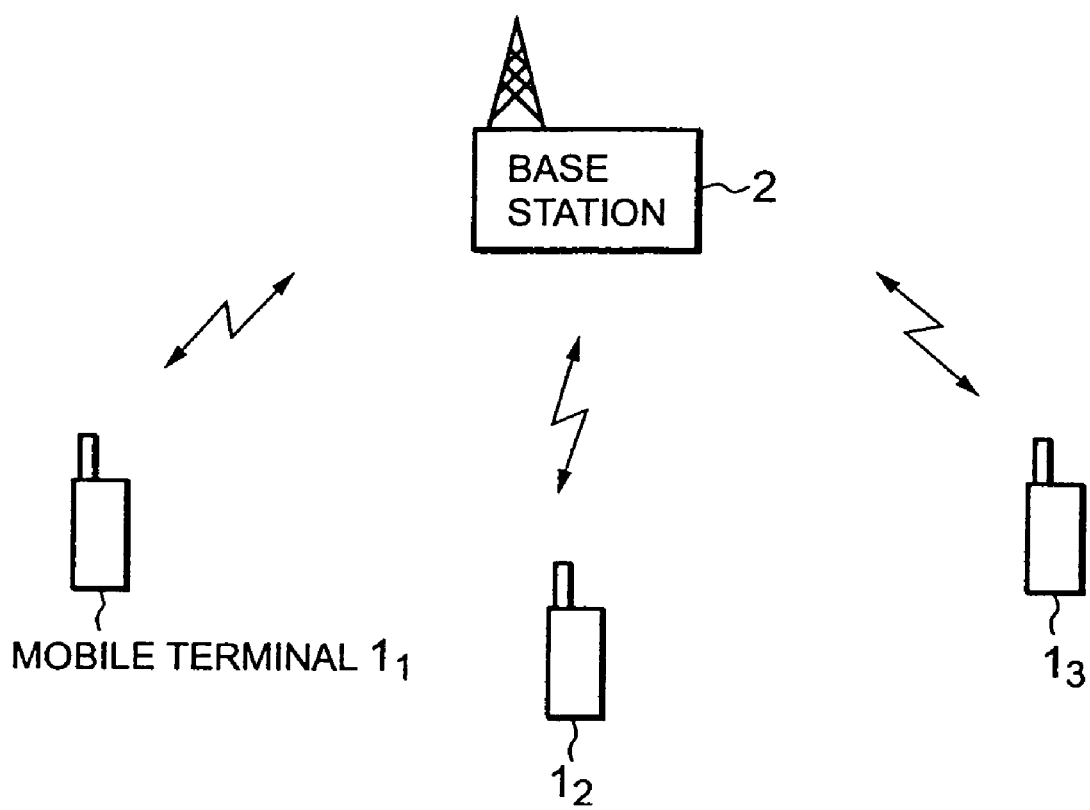
FIG. 1 is an example of construction of the communication system to which the present invention is applied.

FIG. 1 shows an example of the construction of a communication system (the term "system" herein shall mean a logical combination of a plurality of apparatus in a single compartment or separate compartments) utilizing the AMCS communication system to which the present invention is applied.

Mobile terminals $1_1$ to $1_3$ are, e.g., cellular phones or other PDAs (Personal Digital Assistance) designed for communication with base station 2 in the AMCS communication system.

It is to be noted that mobile terminals $1_1$ to $1_3$ are referred to as the mobile terminal 1 hereunder as long as they need not be distinguished.

Base station 2 controls by means of wireless communication in the AMCS communication system with mobile terminal 1 within the service area or the cell covered by the base station 2. In other words, transmission bandwidth and other communication resources for performing communication are allocated to the mobile terminal 1. In this way, e.g., data from other mobile terminal (not shown) transmitted from another base station (not shown), Web page data from internet WWW (World Wide Web) server, mails from a male server, etc. are received and transmitted to the mobile terminal 1. Alternatively, base station 2 receives data transmitted form, e.g., mobile terminal 1 for transmission to another base station or the designated network such as the Internet.

Figure 2:
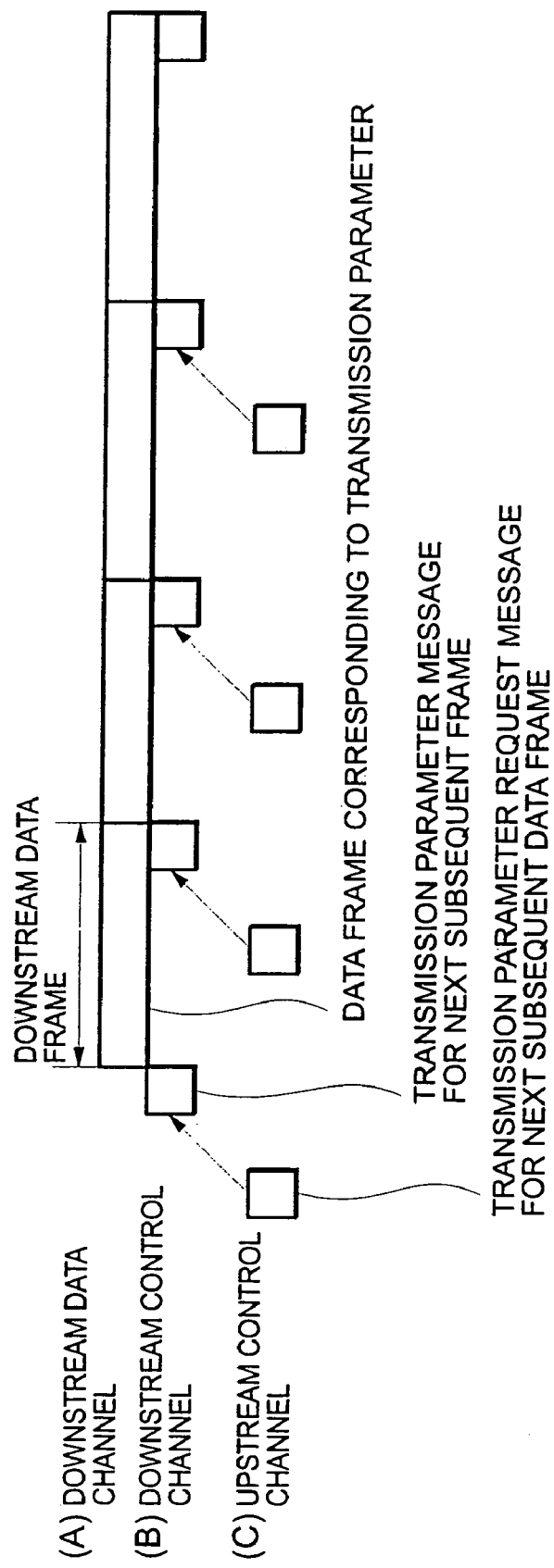
FIG. 2 is a diagram showing data communicated between mobile terminal 1 and base station 2.

The AMCS communication between the mobile terminal 1 and the base station 2 is realized in the manner e.g., as illustrated in FIG. 2.

The data transmission from the mobile terminal 1 to the base station 2 is defined as "up" while that from the base station 2 to the mobile terminal 1 is defined as "down".

As illustrated in FIG. 2 (A), the base station 2 performs adaptive modulation coding, e.g., at a predetermined frame rate and transmits data to the mobile terminal 1 using a selected downstream channel (data channel). Since coding rate and multi-level modulation factor vary in frame rate in the AMCS communication system, the base station 2 transmits to the mobile terminal 1 transmission parameters indicating the coding rate and the multi-level modulation factor in the next preceding frame in the data channel through another downstream channel (control channel) performing modulation and coding by the fixed coding rate and multi-level modulation factor as shown in FIG. 2 (B). By receiving the transmission parameters, the mobile terminal 1 recognizes the coding rate and the multi-level modulation factor in the subsequent frame in the data channel to perform demodulation and decoding for the next subsequent frame to be transmitted from the base station 2 in the data channel.

As described hereinabove, the base station 2 performs adaptive modulation and coding based on the receiving quality in the mobile terminal 1.

For this end, the mobile terminal 1 determines the receiving quality of the signal transmitted from the base station 2 and transmit to the base station 2 a receiving quality message (transmission parameter request message for the next subsequent data frame) through a selected upstream channel (control channel) as illustrated in FIG. 2 (C). The base station 2 recognizes the current receiving quality of the mobile terminal 1 based on the receiving quality message and determines the mode of coding rate and multi-level modulation factor corresponding to the receiving quality (transmission mode which is referred to as modulation coding mode hereunder). Then, as illustrated in FIG. 2 (B), the base station 2 transmits the modulation coding mode to the mobile terminal 1 and transmits the next subsequent frame to the mobile terminal 1 in accordance with the coding rate and multi-level modulation factor corresponding to the modulation coding mode.

Figure 3:
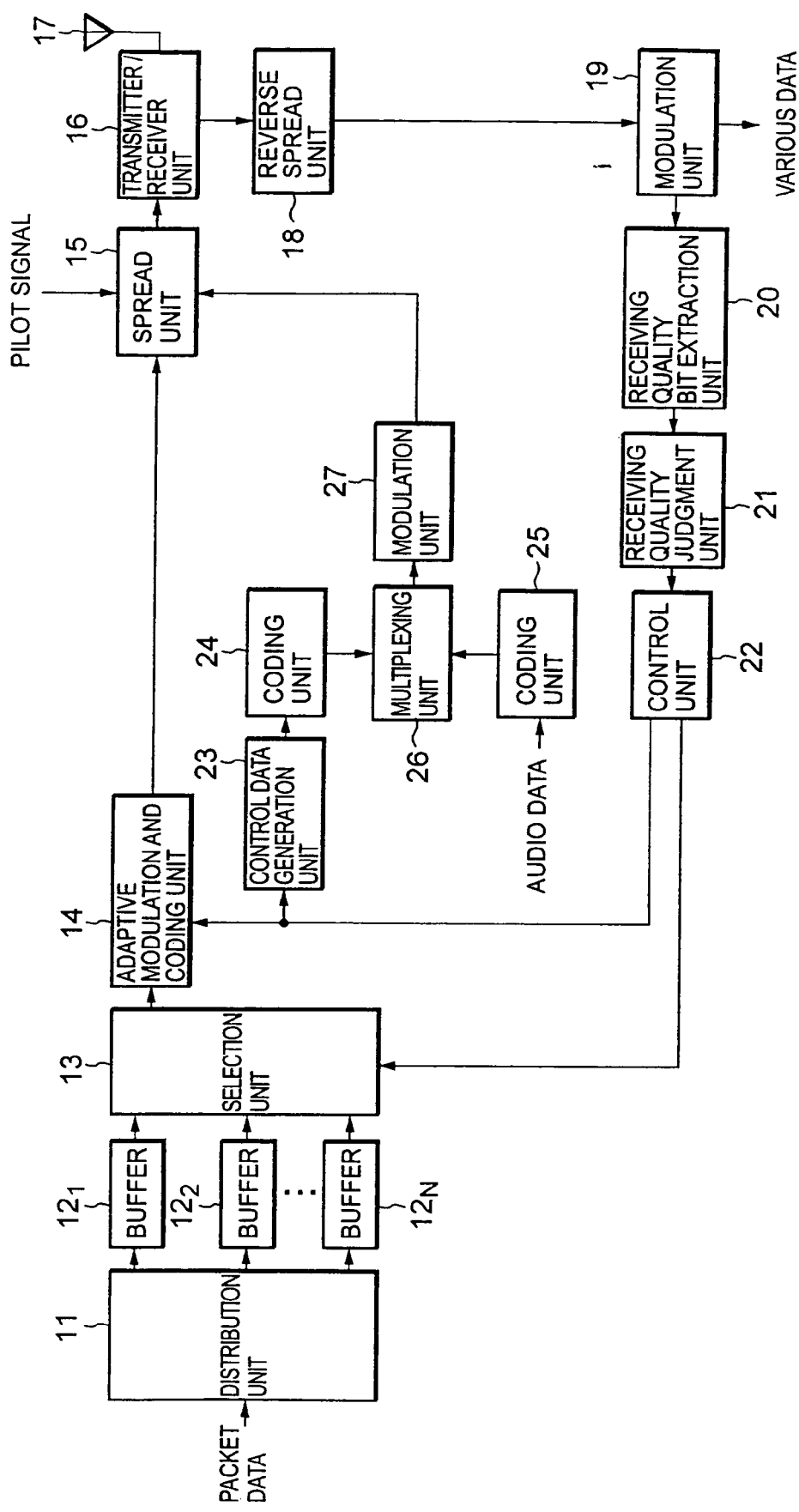
FIG. 3 is a block diagram showing an example of construction of the base station 2.

FIG. 3 shows an example of the base station 2 as illustrated in FIG. 1.

Distribution unit 11 receives packet data from other mobile terminals or the like through, e.g., another base station. The distribution unit 11 distributes the packet data depending on addressed users and supplies to the buffers $12_n$. In other words, the distribution unit 11 firstly allocates the user addressed in the packed data to one of N buffers $12_1$ to $12_n$ not allocated to any user. Subsequently, the distribution unit 11 supplies the packet data addressed to each user to the buffer $12_n$ allocated to the user.

It is to be noted that the buffer $12_n$ is released as a free buffer so as to be allocated to other user when the communication link with the user allocated to the buffer $12_n$ is disconnected.

The buffer $12_n$ is a so-called FIFO (first-in first-out) type buffer and sequentially stores packet data supplied from the distribution unit 11. And the packet data stored therein are sequentially read out by selection unit 13.

In other words, the selection unit 13 selects either one of the buffers $12_n$ allocated to the addressed user under the control of control unit 22 and supplies the read-out packet data stored in the buffer $12_n$ to adaptive modulation and coding unit 14.

The adaptive modulation and coding unit 14 encodes the packet data from the selection unit 13 in the coding method of the corresponding coding rate in accordance with the modulation coding mode supplied thereto from the control unit 22 and modulates the coded data in the modulation method of the corresponding multi-level modulation factor. The resulting modulated signal is supplied to spread unit 15.

Modulation methods of different multi-level modulation factor include, e.g., QPSK (Quadrature Phase Shift Keying), 16QAM (Quadrature Amplitude Modulation), etc.

In the case of the QPSK, 2 bits of the coded data are mapped to one symbol of 4 symbols on a plane defined by an in-phase component (I signal) and a quadrature component (Q signal) as shown in FIG. 4 (A). On the other hand, in case of the 16QAM, 4 bits in the coded data are mapped to one symbol of 16 symbols on the plane defined by the I signal and the Q signal.

As a result, even if the symbol rate for transmitting symbols is constant, the amount of transmission data per unit time is greater in the 16QAM than in the QPSK. However, the distance between symbols in the 16QAM is shorter than in the QPSK. This means that the noise characteristic in the QPSK is better than in the 16QAM.

In other words, the QPSK transmits less data but provides better resistance to noise while the 16QAM is less resistance to noise but can transmit more data (increases data rate).

On the other hand, other coding methods of different coding rates include, e.g., turbo coding of $R=\frac{1}{2}$ and $\frac{3}{4}$.

It has to be noted that R represents the coding rate and $R=x/y$ means x bits of data is coded into y bits data by adding $(y-x)$ redundancy bits. As a result, the $R=\frac{1}{2}$ coding includes 1 bit data and 1 redundancy bit while the $R=\frac{3}{4}$ coding includes 3 data bits and 1 redundancy bit.

Accordingly, $R=\frac{1}{2}$ coding includes more redundancy bits in the data bit as compared to $R=\frac{3}{4}$ coding, thereby decreasing data transmission rate (amount of real data) but improving error correction performance. On the other hand, $R=\frac{3}{4}$ coding includes less redundancy bits in the data as compared to $R=\frac{1}{2}$ coding, thereby decreasing error correction performance but increasing data transmission amount.

In the adaptive modulation and coding unit 14, the aforementioned 2 types of modulation methods and 2 types coding methods are suitably selected to provide, e.g., 3 modulation coding modes #0, #1 and #2 as shown in the table in FIG. 5.

In other words, in the modulation coding mode #0, coding is made by the $R=\frac{1}{2}$ and modulation is made by the QPSK. In the modulation coding mode #1, coding is made by the $R=\frac{1}{2}$ and the modulation is made by the 16QAM. In the modulation coding mode #2, coding is made by $R=\frac{3}{4}$ and modulation is made by the 16QAM.

In this case, data transmission amount increases in the order of the modulation coding modes #0, #1 and #2, but the resistance to noise increases in the opposite order, or the modulation coding mode #2, #1 and #0.

As a result, the control unit 22 sets the modulation coding mode to #0, enabling fast data transmission in the sacrifice of resistance to noise if the quality of the transmission path is good. Conversely, in case of poor quality of the transmission path, the control unit 22 sets the modulation coding mode to #2 for improving resistance to noise in the sacrifice of the data rate. If the quality of the transmission path is not good but not so bad, the control unit 22 sets the modulation coding mode to #1.

Figure 6:
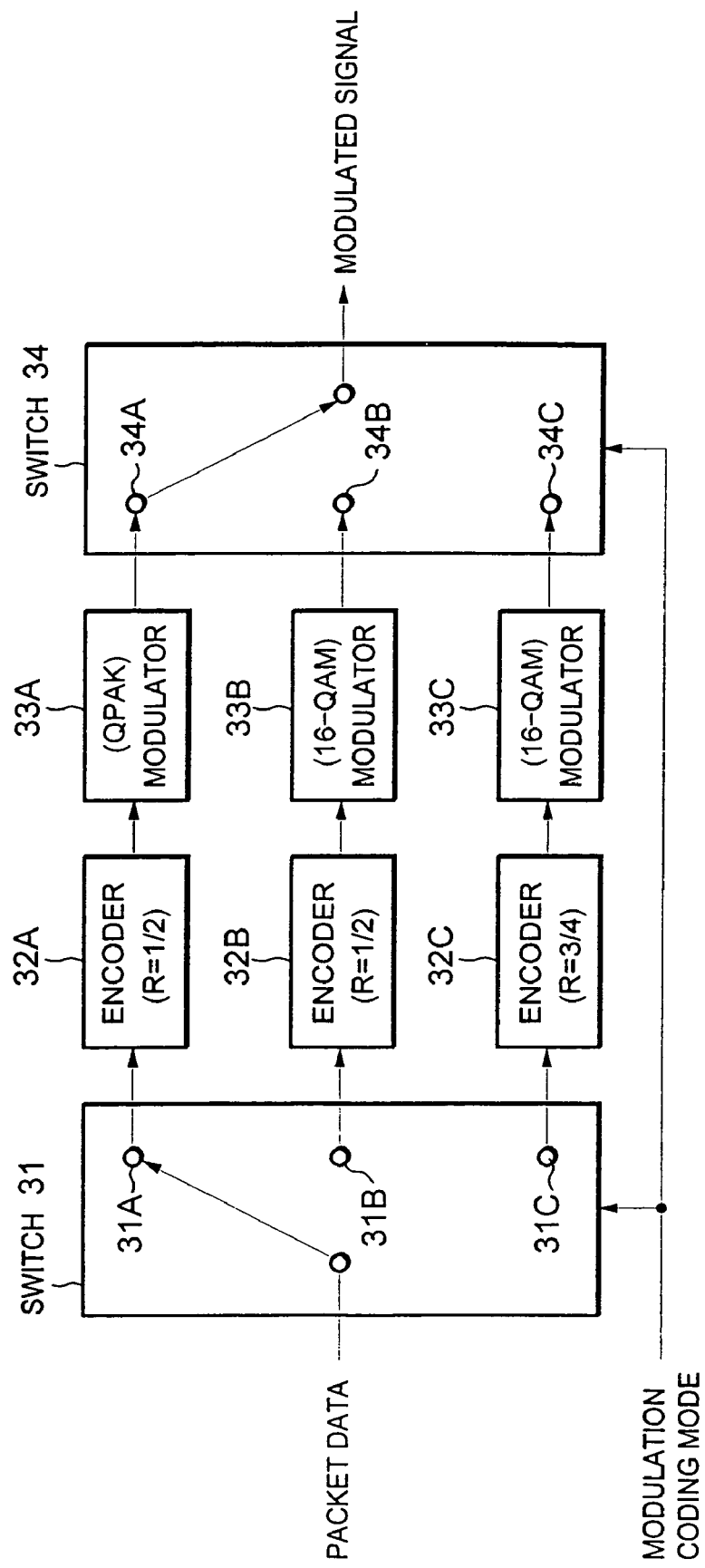
FIG. 6 is a block diagram showing an example of the adaptive modulation and coding unit 14.

FIG. 6 shows an example of the adaptive modulation and coding unit 14 having the 3 modulation coding modes #0, #1 and #2 as shown in FIG. 5.

Switch 31 is designed to receive the packet data derived from the selection unit 13 and selects either one of terminals 31A, 31B or 31C in response to the modulation coding mode supplied from the control unit 22. In other words, in case of the modulation coding mode #0, #1 or #2, the switch 31 selects the terminal 31A, 31B or 31C, respectively.

The terminal 31A is connected to encoder 32A, thereby supplying the packet data from the selection unit 13 to the encoder 32A when the terminal 31A is selected by the switch 31. The encoder 32A encodes the packet data supplied thereto from the terminal 31A by the R=½ coding method and supplies the resulting coded data to modulator 33A. The modulator 33A modulates the coded data from the encoder 32A by the QPSK modulation and supplies the resulting modulated signal to terminal 34A of a switch 34. Accordingly, in the modulation coding mode #0, the packet data is coded by the R=½ coding method and modulated by the QPSK modulation as described hereinabove.

Connected to the terminal 31B is encoder 32B for supplying the packet data from the selection unit to the encoder 32B when the terminal 31B is selected by the switch 31. The encoder 32B encodes the packet data supplied from the terminal 31B by the R=½ coding method and supplies the resulting coded signal to a modulator 33B. The modulator 33B modulates the coded data from the encoder 32B by the 16QAM modulation. The resulting modulated signal is supplied to terminal 34B of the switch 34. Accordingly, in the modulation coding mode #1, the packet data is coded by the R=½ coding method and modulated by the 16QAM modulation as described hereinabove.

The terminal 31C is connected to encoder 32C, thereby supplying the packet data from the selection unit 13 to the encoder 32C when the terminal 31C is selected. The encoder 32C encodes the packet data supplied from the terminal 31C by the R=¾ coding method and supplying the resulting coded data to modulator 33C. The modulator 33C modulates the coded data from the encoder 32C by the 16QAM modulation and the resulting modulated signal is supplied to terminal 34C of the switch 34. Accordingly, in the modulation coding mode #2, the packet data is encoded by the R=¾ coding method and modulated by the 16QAM as described hereinabove.

Similar to the switch 31, the switch 34 selects either one of the terminals 34A, 34B and 34C in response to the modulation coding mode supplied from the control unit 22. In other words, the switch 34 selects the terminal 34A, 34B or 34C in case of the modulation coding mode #0, #1 or #2, respectively.

As a result, the switch 34 provides the modulated signal as coded and modulated in accordance with the modulation coding mode.

According to the adaptive modulation and coding as described hereinabove, since the packet data is processed by the coding rate and the modulation factor depending on the quality of the transmission path, the packet data may be transmitted efficiently.

It is to be noted that the encoders 32A and 32B in FIG. 6 may be a common encoder. Similarly, the modulators 33B and 33C may be a common modulator.

Supplied to the spread unit 15 are not only the modulated signal from the adaptive modulation and coding unit 14 but also a modulated output from modulation unit 27.

In other words, in case of supplying an audio data from another mobile terminal by way of another base station, such audio data is supplied to coding unit 25 which encodes the data at a fixed coding rate. The resulting coded data is supplied to multiplexing unit 26.

The multiplexing unit 26 multiplexes the coded data from the coding unit 25 and a coded data supplied from coding unit 24 which will be described hereinafter. The resulting multiplexed data is supplied to the modulation unit 27. The modulation unit 27 modulates the multiplexed data from the multiplexing unit 26 at a fixed modulation factor and the resulting modulated signal is supplied to the spread unit 15.

In the above manner, the spread unit 15 receives the modulated signal from the adaptive modulation and coding unit 14, the modulated signal from the modulation unit 27 and a pilot signal. The spread unit 15 spreads spectrum the modulated signal from the adaptive modulation and coding unit 14, the modulated signal from the modulation unit 27 and the pilot signal respectively by different spread code within the same frequency bandwidth. The resulting spread spectrum signal is supplied to transmitter/receiver unit 16.

The transmitter/receiver unit 16 performs amplification and other necessary processing onto the spread spectrum signal from the spread unit 15 before being supplied to antenna 17 for transmission in a radio wave.

The antenna 17 also receives radio wave transmitted from the mobile terminals 1. And the resulting spread spectrum signal in form of radio wave is supplied to the transmitter/receiver unit 16. The transmitter/receiver unit 16 amplifies the spread spectrum signal from the antenna 17 and supplies to reverse spread unit 18. The reverse spread unit 18 performs reverse spectrum spreading the spread spectrum signal from the transmitter/receiver unit 16. The resulting modulated signal is supplied to demodulation unit 19.

The demodulation unit 19 demodulates the modulated signal from the reverse spectrum spread signal 18 to output various data such as the packet data, the audio data, etc. The various data derived from the demodulation unit 19 are transmitted to, e.g., another base station.

The data derived from the demodulation unit 19 by demodulation is also supplied to a receiving quality bit extraction unit 20.

As described above by reference to FIG. 2, the signal transmitted from the mobile terminals 1 contains the receiving quality message. The receiving quality bit extraction unit 20 extracts the bits corresponding to the receiving quality message contained in the data from the demodulator 19 and such data is supplied to receiving quality judgment unit 21.

The receiving quality judgment unit 21 makes judgment of the receiving quality of the radio wave from the base station 2, i.e., the quality of the transmission path of the mobile terminals 1 based on the receiving quality message from the receiving quality bit extraction unit 20. The judgment result is supplied to the control unit 22.

The control unit 22 sets the modulation coding mode based on the receiving quality judgment result from the receiving quality judgment unit 21. The modulation coding mode is supplied to both the adaptive modulation and coding unit 14 and control data generation unit 23.

As described hereinabove, the adaptive modulation and coding unit 14 performs adaptive modulation coding of the packet data supplied from the selection unit 13 in response to the modulation coding mode supplied from the control unit 22.

On the other hand, the control data generation unit 23 generates the modulation method corresponding to the modulation coding mode from the control unit 22, the message (the abovementioned transmission parameters) and other control data necessary to control the mobile terminal 1. And such data is supplied to coding unit 24. The coding unit 24 encodes the control data from the control data generation unit 23 at a fixed coding rate and provides the resulting coded data. The coded data from the coding unit 24 is supplied to the multiplexing unit 26 and is multiplexed with the coded data from the coding unit 25 as described hereinabove.

It is to be noted that the control unit 22 also controls the selection unit 13. As described hereinabove by reference to FIG. 7, the selection unit 13 selectively reads out the packet data stored in the buffer $12_n$ under control of the control unit 22 and the packet data is supplied to the adaptive modulation and coding unit 14. As a result, the read-out packet data from the selection unit 13 is transmitted to the mobile terminal of the addressed user of the packet data. Accordingly, since selection by the selection unit 13 corresponds to allocation of the communication resources to the mobile terminal of the addressed user of the packet data, the control unit 22 can be set to control allocation of the communication resources.

Figure 7:
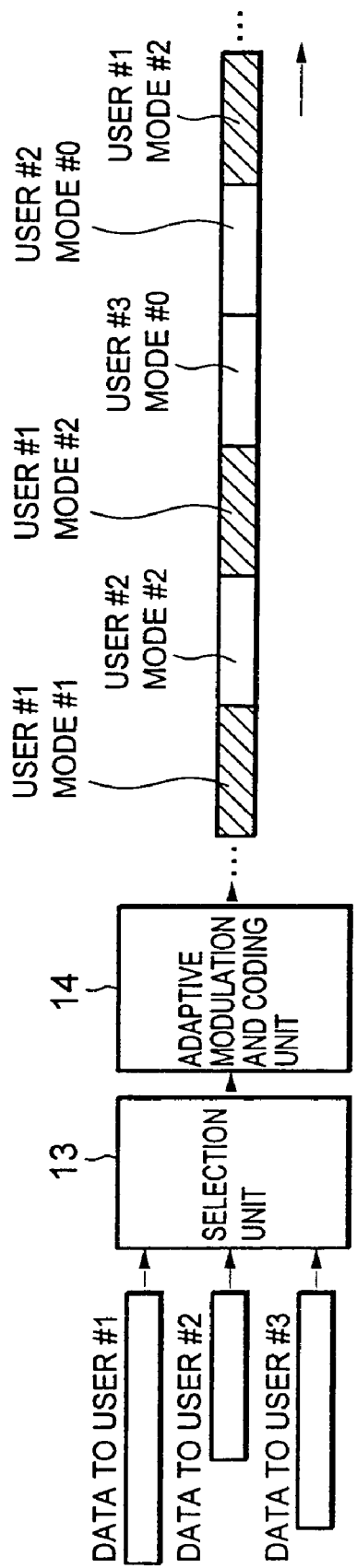
FIG. 7 is a diagram showing a way of allocating communication resources.

In FIG. 7 having a single channel as the downstream line for the packet data transmission of the base station 2, illustrated is allocation of the communication resources in a time sharing manner to the mobile terminals $1_1$ to $1_3$ (users #1 to #3) for transmission of the packet data addressed to the users #1 to #3 of the mobile terminals $1_1$ to $1_3$.

Figure 8:
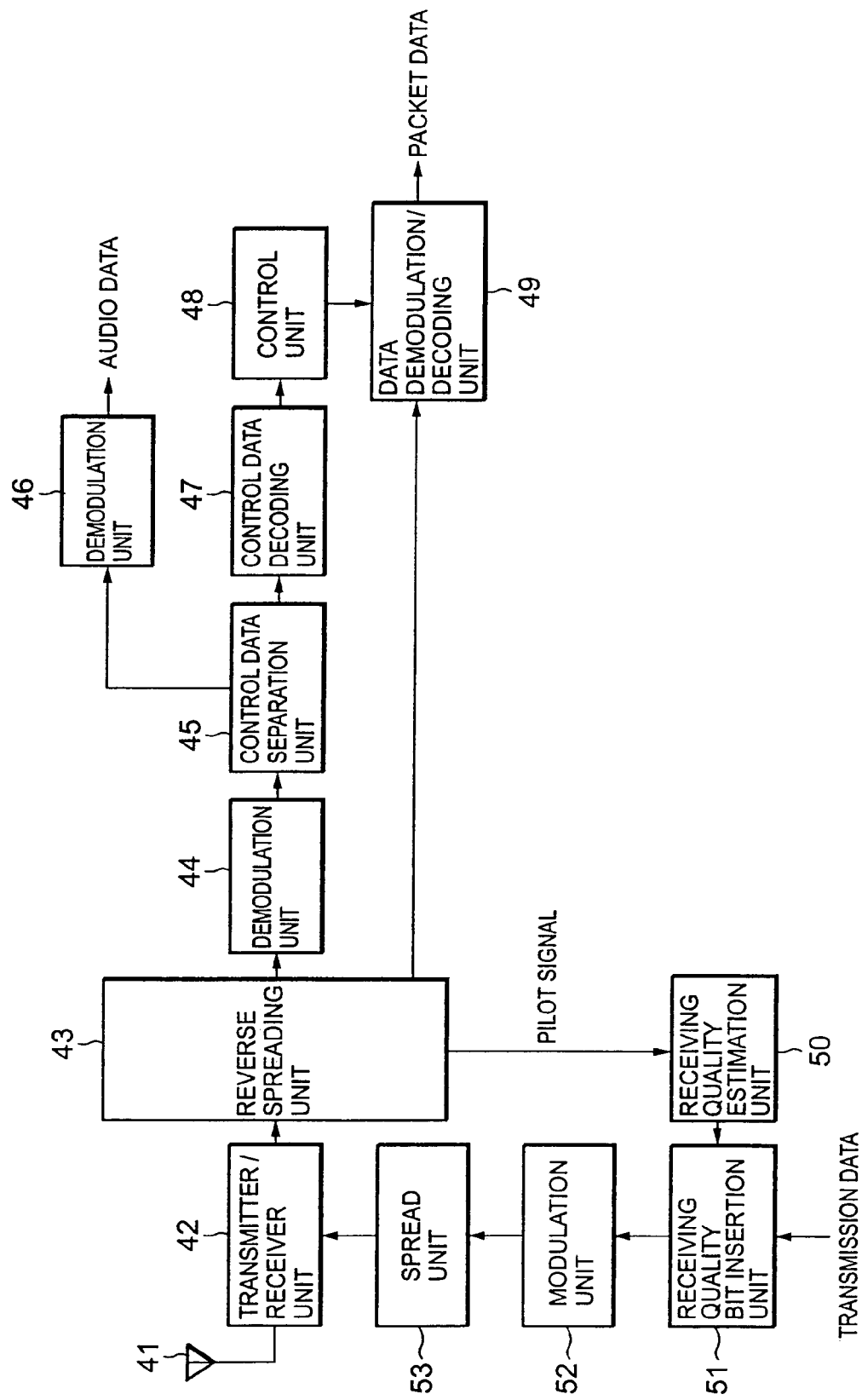
FIG. 8 is a block diagram showing an example of mobile terminal 1.

Next, illustrated in FIG. 8 is the construction of an example of the mobile terminal 1 in FIG. 8.

A radio wave from the base station 2 is received by antenna 41 and the received signal is supplied to transmitter/receiver unit 42. The transmitter/receiver unit 42 provides amplification and other necessary processing of the received signal from the antenna 41 before being supplied to reverse spread unit 43. The reverse spread unit 43 performs reverse spectrum spreading of the spread spectrum signal or the received signal from the transmitter/receiver unit 42. As a result, obtained are the pilot signal, the adaptive modulated and coded data (corresponding to the output data from the adaptive modulation and coding unit 14 in FIG. 3) and the data modulated by a fixed coding rate and a fixed modulation factor (corresponding to the output data from the modulation unit 27 in FIG. 3).

The pilot signal is supplied to a CPICH receiving quality estimation unit 50, the adaptively modulated and coded data is supplied to data demodulation unit 49. Also, the data modulated by a fixed coding rate and a fixed modulation factor is supplied to demodulation unit 44.

The demodulation unit 44 demodulates the data coded by a fixed coding rate and a fixed modulation factor from the reverse spread unit 43 and the resulting coded data is supplied to control data separation unit 45. The control data separation unit 45 separates the coded data of the control data from the coded data supplied from demodulation unit 44 to be supplied to control data demodulation unit 47 while supplying the remaining coded data to demodulation unit 46. The demodulation unit 46 demodulates the coded data from the control data separation unit 45 for providing the resulting signal such as, e.g., an audio signal.

The control data decoding unit 47 decodes the coded data supplied from the control data separation unit 45 to provide the control data which is supplied to control unit 48. The control unit 48 controls data demodulation/decoding unit 49 in accordance with the message indicating the modulation method and coding method included in the control data from the control data decoding unit 47.

In other words, the data demodulation/decoding unit 49 demodulates the adaptively modulated and coded data from the reverse spread unit 44 by the demodulation method in accordance with the control from the control unit 48. Additionally, the data resulting from the demodulation is decoded by the decoding method in accordance with the control from the control unit 48. And the data demodulation/decoding unit 49 outputs the packet data obtained as a result of the decoding.

On the other hand, a CPICH receiving quality estimation unit 50 estimates the receiving quality of the adaptively modulated and coded data based on the pilot signal (the pilot signal from the CPICH channel which will be described hereinafter) from the reverse spread unit 43. The receiving quality message indicating the receiving quality is supplied to a receiving quality bit insertion unit 51.

Supplied to the receiving quality bit insertion unit 51 are the receiving quality message from the CPICH receiving quality estimation unit 50, the packet data to be transmitted from the mobile terminal 1 and other transmission data such as the audio data. The receiving quality bit insertion unit 51 inserts a series of bits corresponding to the receiving quality message into a predetermined position in the transmission data to be supplied to modulation unit 52 after necessary encoding.

The modulation unit 52 modulates the data from the receiving quality bit insertion unit 51 by a fixed modulation factor. And the modulation unit 52 supplies the resulting modulated signal to the spread unit 53.

The spread unit 53 performs spectrum spreading on the modulated signal from the modulation unit 52 to obtain the spread spectrum signal which is supplied to the transmitter/receiver unit 42. The transmitter/receiver unit 42 performs amplification and other necessary processing on the spread spectrum signal from the spread unit 53 for transmission from the antenna 41 as a radio wave.

Incidentally, the communication by adaptive modification and coding is achieved by the base station 2 that determines the modulation coding mode based on the receiving quality message transmitted from the mobile terminal 1 as described hereinabove.

However, there is a considerable delay time from the time when the mobile terminal 1 determines the receiving quality until the base station 2 recognizes the receiving quality because the base station 2 must receive the receiving quality message indicating the receiving quality as well as demodulating and decoding the message.

As a result, when the base station 2 recognized the receiving quality indicated by the receiving quality message, the current receiving quality of the mobile terminal 1 might have changed, thereby disabling to select the optimum modulation coding mode and degrading the transmission efficiency.

This problem is particularly significant when the transmission path characteristic varies suddenly in such a case as, e.g., the user of the mobile terminal 1 moving at a high speed in a train or the like.

On the other hand, from the transmission efficiency point of view, it is preferable to increase the interval of transmitting the receiving quality message from the mobile terminal 1. However, in such case, the current receiving quality of the mobile terminal may largely differ from the receiving quality message indicated by the receiving quality message, thereby preventing the transmission efficiency by the adaptive modulation and coding from being improved.

Figure 9:
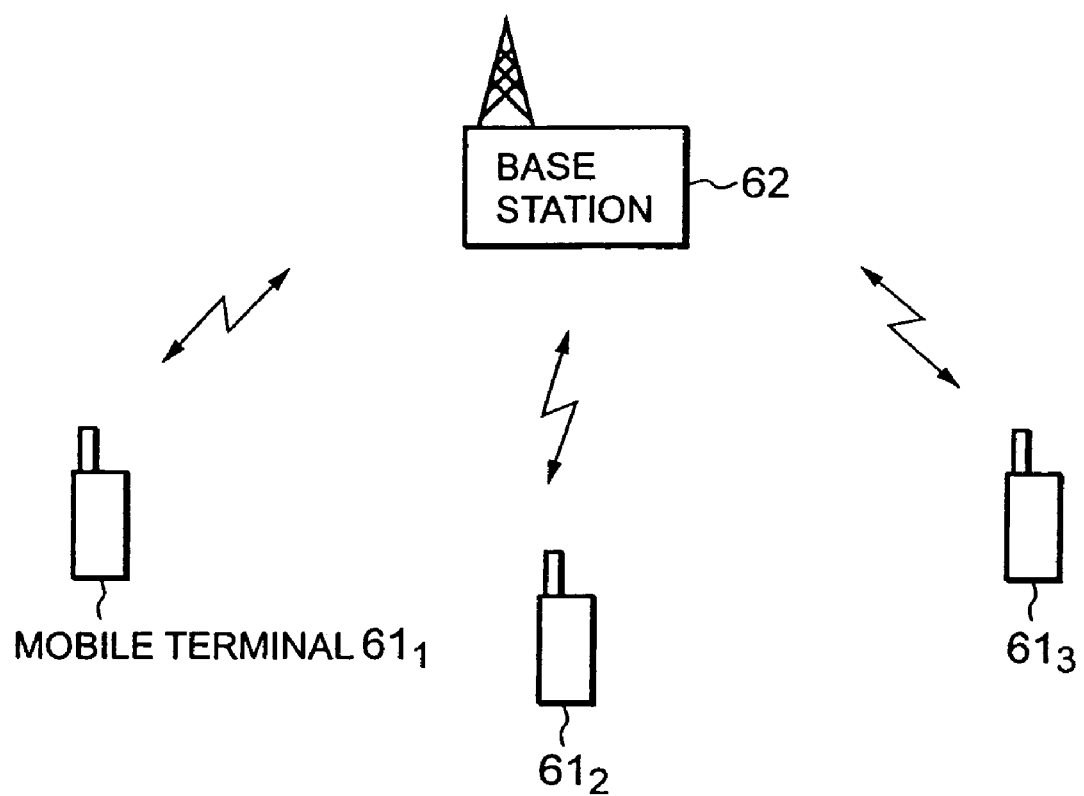
FIG. 9 is a diagram showing the construction of one embodiment of the communication system to which the present invention is applied.

Now, illustrated in FIG. 9 is the construction of an embodiment of the communication system to which the present invention is applied.

The communication system in FIG. 9 comprises 3 mobile terminals $61_1$ to $61_3$ and base station 62. Communication between the mobile terminals $61_1$ to $61_3$ and the base station 62 is performed by the AMCS communication system, e.g., W-CDMA system.

The mobile terminals $61_1$ to $61_3$ are, e.g., cellular phones or other PDAs similar to the mobile terminal 1 in FIG. 1 and communicate with the base station 62 by the W-CDMA communication utilizing the AMCS communication system.

In FIG. 9, only 3 mobile terminals $61_1$ to $61_3$ are shown, but it is to be noted that the number of mobile terminals is not restricted.

Note that the mobile terminals $61_1$ to $61_3$ are referred to as the mobile terminals 61 hereunder if individual mobile terminals need not to be distinguished.

The base station 62 controls the mobile terminals 61 within the area covered thereby (cell) by the W-CDMA communication employing the AMCS communication system. In other words, the communication bandwidth and other communication resources for performing communication are allocated to the mobile terminals 61 for receiving data transmitter from, e.g., another mobile terminal (not shown) through another base station, Web page data from the internet www server, or mails from a mail server. Also, the base station 2 receives the data transmitted from, e.g., mobile terminals 61 for transmission to another base station or a predetermined network such as the Internet.

Figure 10:
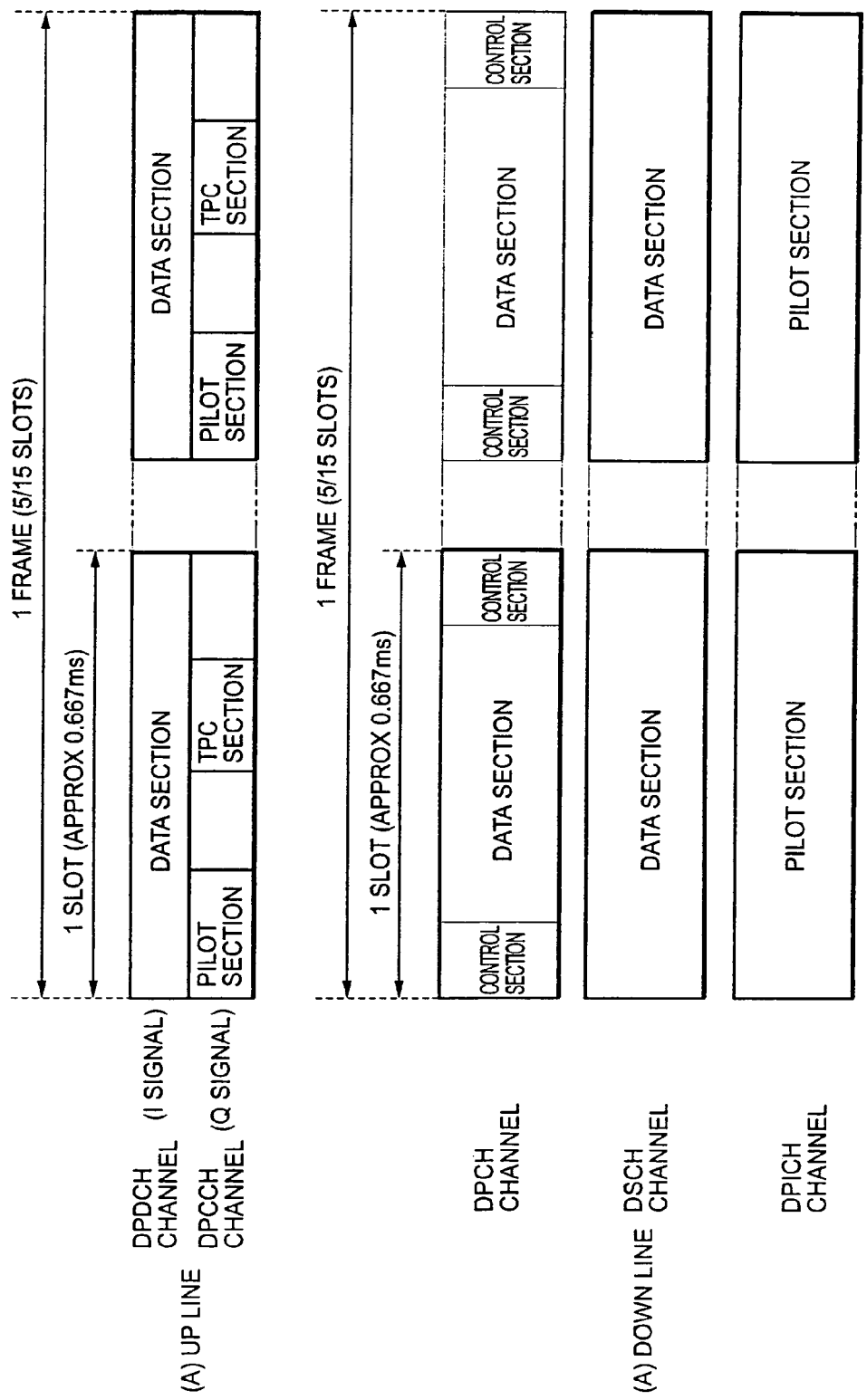
FIG. 10 is a diagram showing data formats for upstream and downstream.

Now, illustrated in FIG. 10 is the data format of the communication between the mobile terminals 61 and the base station 62.

It is to be noted that the communication between the mobile terminals 61 and the base station 62 is performed by the W-CDMA system. Illustrated in FIG. 10 is a part of channel as specified by the 3GPP (3rd Generation Partnership Project) of the W-CDMA system.

The upstream line used for data transmission from the mobile terminals 61 and the base station 62 has DPDCH (Dedicated Physical data Channel) channel and DPCCH (Dedicated Physical Control Channel) channel as illustrated in FIG. 10 (A).

DPDCH channel and DPCCH channel consist of slots each having a minimum unit of approximately 0.667 ms. For example, 5 or 15 slots (approximately 3.33 ms or 10 ms) constitute a frame.

DPDCH channel has data sections in which actual data of the packet data and the audio data to be transmitted form the mobile terminal 61 to the base station 62 are disposed. Furthermore, disposed in the data section in the DPDCH channel is the receiving quality message.

DPCCH channel includes a pilot section and a TPC section. The pilot signal is disposed in the pilot section while a power control information which will be described hereinafter is disposed in the TPC (Transmit Power Control) section.

The data disposed in DPDCH channel is allocated to the I signal while the data disposed in DPCCH channel is allocated to the Q signal.

The downstream line used for data transmission from the base station 62 to the mobile terminals 61 has DPCH (Dedicated Physical Channel) channel, DSCH (Down link Shard Channel) channel and CPICH (Common Pilot Channel) channel as illustrated in FIG. 10 (B). Similar to DPDCH channel and DPCCH channel as described hereinabove in FIG. 10 (A), DPCH channel, DSCH channel and CPICH channel consist of slots each having the minimum unit of approximately 0.667 ms. For example, 5 or 15 slots constitute 1 frame.

Although the frames to be transmitted in the upstream line channel and the downstream line channel need not comprise identical number of slots, it is assumed that the frames to be transmitted in the upstream line and the downstream line channels are identical in this embodiment for ease of description. In other words, the upstream line and the downstream line have identical frame length.

DPCH channel, DSCH channel and CPICH channel are transmitted in parallel (simultaneously) by spectrum spreading of different spread coding.

DPCH channel includes a control section and a data section. Disposed in the control section are the modulation coding mode and other control data while disposed in the data section is the audio data or the like. Also disposed in the control section in DPCH channel is the pilot signal as the control data.

DSCH channel has a data section in which the adaptively modulated and coded data is disposed.

CPICH channel has a pilot section in which the pilot signal is disposed.

Note that the pilot signal disposed in CPICH channel is spectrum spread by different spread coding from DPCH channel so as to be transmitted in parallel with the data disposed in the data section in DPCH channel. On the contrary, the pilot signal disposed in the control section in DPCH channel is transmitted by time multiplexing with the data disposed in the data section in DPCH channel.

In order to distinguish the pilot signal disposed in the CPICH channel from the pilot signal disposed in the control section in DPCH channel, the pilot signal disposed in CPICH channel is referred to as the common pilot signal and the pilot signal disposed in the control section in DPCH channel is referred to as the individual pilot signal hereunder. In FIG. 3 (similarly to FIGS. 14, 24, 28 and 42 described hereinafter), the pilot signal applied to the spread unit 15 is the common pilot signal.

Figure 11:
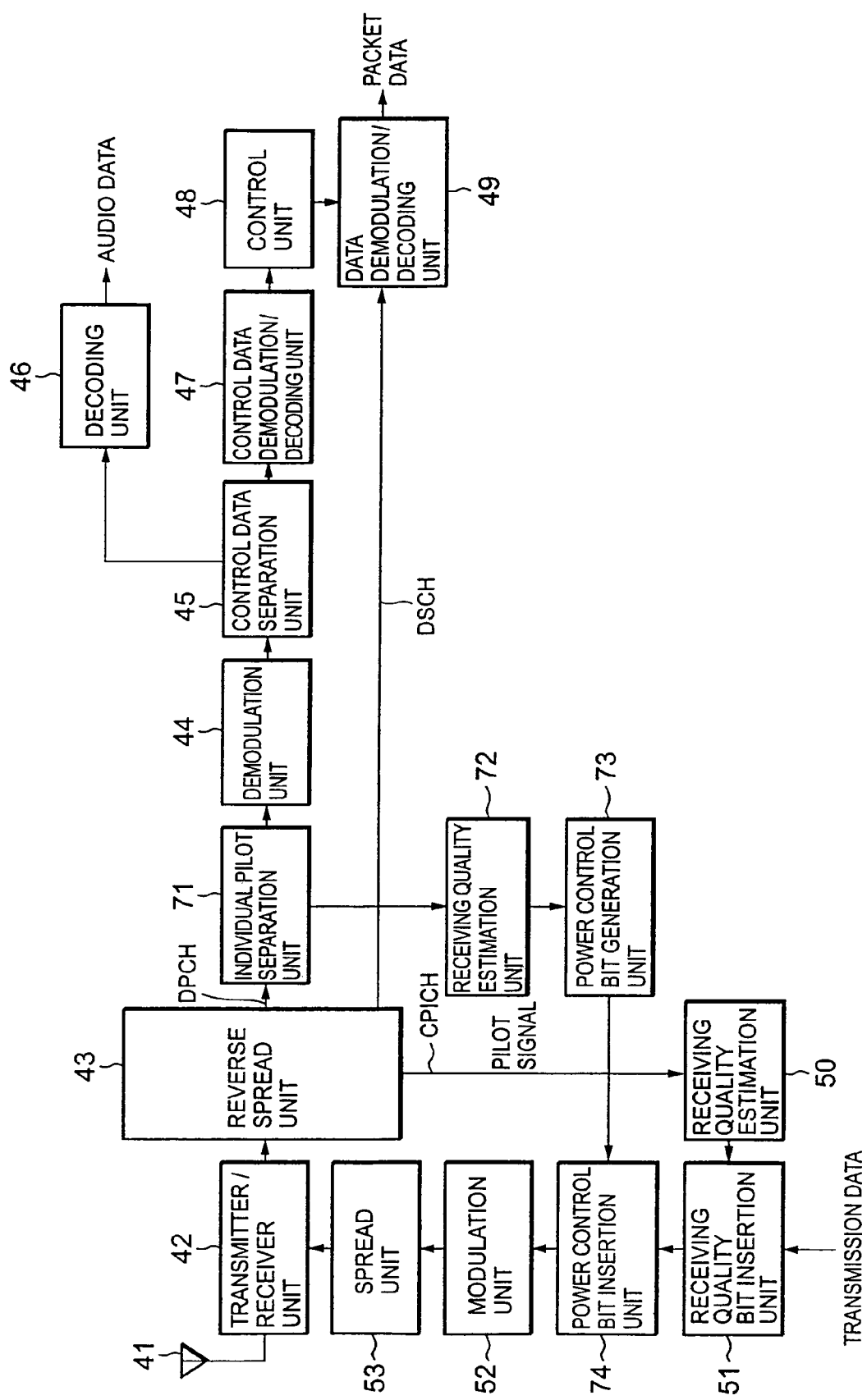
FIG. 11 is a block diagram of one example of mobile terminal 61.

Now, illustrated in FIG. 11 is the construction of the mobile terminal 61 in FIG. 9. In FIG. 11, the units corresponding to those in FIG. 1 have the same reference numerals and their descriptions will be omitted. In other words, the mobile terminal 61 in FIG. 11 comprises individual pilot separation unit 71, DPCH receiving quality estimation unit 72, power control bit generation unit 73 and power control bit insertion unit 74 in addition to the mobile terminals 1 in FIG. 8.

Supplied to the individual pilot separation unit 71 is a signal in DPCH channel from the reverse spread unit 43. The individual pilot separation unit 71 supplies the signal in DPCH channel to the demodulation unit 44 and also separates the individual pilot signal from the signal in DPCH channel to supply it to the DPCH receiving quality estimation unit 72.

The DPCH receiving quality estimation unit 72 estimates the receiving quality of the signal in DPCH channel for, e.g., every slot based on the individual pilot signal from the individual pilot separation unit 71.

Assuming that symbols of the individual pilot signal included in 1 slot in DPCH channel are p[1], p[2], ..., p[N], the DPCH receiving quality estimation unit 72 calculates a signal component S and an interference component I, e.g., in accordance with the following expressions and also calculates the receiving quality of the signal in DPCH channel SIRdpch:

$$S = P_{ave}^2$$

$$I = 1/N \times \Sigma(p[n] - P_{ave})^2$$

$$P_{ave} = 1/N \times \Sigma p[n]$$

$$SIR_{DPCH} = S/I \qquad (1)$$

It is to be noted that the symbol $\Sigma$ means summation by varying the variable n from 1 to N.

In the above manner, the signal quality estimation unit 72 calculates the receiving quality $SIR_{DPCH}$ of the signal in DPCH channel in every slot and supplies the receiving quality to the power control bit generation unit 73.

The power control bit generation unit 73 generates the power control information for requesting the transmission power adjustment in DPCH channel of the base station 62 based on the receiving quality $SIR_{DPCH}$ from the DPCH receiving estimation unit 72.

In other words, the power control bit generation unit 73 compares the receiving quality $SIR_{DPCH}$ with a predetermined threshold value ∈. If the receiving quality $SIR_{DPCH}$ is greater than the threshold value ∈, the power control bit generation unit 73 sets the 1 bit flag TPC to, e.g., 0 as the power control information for requesting to reduce the transmission power in DPCH channel by 1 dB. On the other hand, if the receiving quality $SIR_{DPCH}$ is lower than a predetermined threshold value ∈, the power control bit generation unit 73 sets the 1 bit flag TPC to 1 as the power control information for requesting the transmission power of DPCH channel by 1 dB.

In the above manner, the power control bit generation unit 73 sets the value to the power control information TPC that is supplied to the power control bit insertion unit 74.

The power control bit insertion unit 74 is designed to receive the power control information TPC from the power control bit generation unit 73 as well as a transmission data from the receiving quality bit insertion unit 51. The power control bit insertion unit 74 inserts 1 bit corresponding to the power control information TPC at a predetermined location in the transmission data from the receiving quality bit insertion unit 51 before being supplied to the modulation unit 52. In other words, the power control bit insertion unit 74 places the power control information TPC at the TPC section in DPCCH channel of DPDCH channel and DPCCH channel as shown in FIG. 10 (A) and such signal is supplied to the modulation unit 52.

The mobile terminals 61 having the above construction execute the receiving procedure upon receiving the data from the base station 62 and the transmission procedure for transmitting the data to the base station 2.

In other words, in the receiving procedure, the radio wave from the base station 62 is received at the antenna 41 and the received signal is supplied to the reverse spread unit 43 through the transmitter/receiver unit 42. The reverse spread unit 43 executes the spectrum reverse spreading procedure on the received signal supplied thereto, thereby obtaining signals in DPCH channel, DSCH channel and CPICH channel (see FIG. 10 (B)).

The DPCH channel signal is then supplied to the individual pilot separation unit 71 and the DSCH channel signal is supplied to the data demodulation/decoding unit 49. On the other hand, the CPICH channel signal is supplied to the CPICH receiving quality estimation unit 50.

The individual pilot separation unit 71 separates the individual pilot signal from the DPCH channel signal supplied from the reverse spread unit 43 and the signal is supplied to the DPCH receiving quality estimation unit 72. Also, the individual pilot separation unit 71 supplies the DPCH channel signal supplied from the reverse spread unit 43 to the demodulation unit 44.

The demodulation unit 44, the control data separation unit 45, the decoding unit 46, the control data decoding unit 47, the control unit 48 and the data demodulation/decoding unit 49 execute the same procedure as those in the mobile terminal 1 in FIG. 8. In this manner, the DSCH channel signal, i.e., adaptively modulated and coded data is demodulated and decoded in accordance with the modulation coding mode (adaptive modulation and coding).

On the other hand, in the transmission processing, the transmission data such as the packet data to be transmitted from the mobile terminals 61 and the audio data are supplied to the receiving quality bit insertion unit 51. Also supplied to the receiving quality bit insertion unit 51 is the receiving quality message, e.g., at frame rate for indicating the receiving quality obtained by the receiving quality estimation procedure of the DSCH channel signal in the CPICH receiving quality estimation unit 50 which will be described hereinafter.

The receiving quality bit insertion unit 51 inserts the receiving quality message into the transmission data, i.e., disposing the receiving quality message in the data section in DPDCH channel (FIG. 10 (A)) as the transmission data and performs the necessary encoding in frame rate before being supplied to the power control bit insertion unit 74.

The power control bit insertion unit 74 inserts into the transmission data from the receiving quality bit insertion unit 51 the power control information supplied thereto, e.g., in every slot from the power control bit generation unit 73 by performing the power control information generation procedure of the DPCH channel signal as described hereinafter. In other words, the power control information is dispose in the TPC section (FIG. 10 (A)) in DPCCH channel as the transmission signal before being supplied to the modulation unit 52.

Subsequently, the modulation unit 52, the spread unit 53 and the transmitter/receiver unit 42 execute the same procedure as those in the mobile terminal 1 in FIG. 8. And a radio wave corresponding to the transmission data is transmitted from the antenna 41 to the base station 62.

Then, in the mobile terminals 61 in FIG. 11, the aforementioned receiving quality estimation procedure of the DSCH channel signal and the power control information generation procedure are performed in addition to the receiving and transmission procedure.

Now, the receiving quality estimation procedure of the DSCH channel signal will be described first by reference to the flowchart in FIG. 12.

In the receiving quality estimation procedure of the DSCH channel signal, in a first step S1, the CPICH receiving quality estimation unit 50 acquires the common pilot signal disposed in CPICH channel from the reverse spread unit 43. Then, it moves to the next step S2 in which the CPICH receiving quality estimation unit 50 estimates the receiving quality of the DSCH channel signal based on the common pilot signal.

In other words, assuming that symbols of the common pilot signal included in one frame in CPICH channel are c[1], c[2], . . . , c[M], the CPICH receiving quality estimation unit 50 calculates the signal component S and the interference component I and calculates the receiving quality of the DSCH channel signal $SIR_{DPCH}$ in accordance with the following expression:

$$S = C_{ave}^2$$

$$I = 1/M \times \Sigma (c[m] - C_{ave})^2$$

$$C_{ave} = 1/N \times \Sigma c[m]$$

$$SIR_{DPCH} = S/I \times P_{offset} \qquad (2)$$

It has to be noted that Σ in the expression (2) means summation by varying the variable m from 1 to M. $P_{offset}$ represents the ratio $P_{DPCH}/P_{CPICH}$ of the transmission power $P_{DPCH}$ in CPICH channel and the transmission power $P_{CPICH}$ in CPICH channel. For example, it is possible that $P_{offset}$ is a fixed value preset in the mobile terminals 61. Alternatively, it is also possible, e.g., to transmit $P_{offset}$ from the base station 62 to the mobile terminals 61 immediately after the communication link is established between the mobile terminals 61 and the base station 62.

In the above manner, the CPICH receiving quality estimation unit 50 calculates the receiving quality (estimated value) of the DSCH channel signal $SIR_{DPCH}$ which is supplied to the receiving quality bit insertion unit 51 before completing the procedure.

Figure 12:
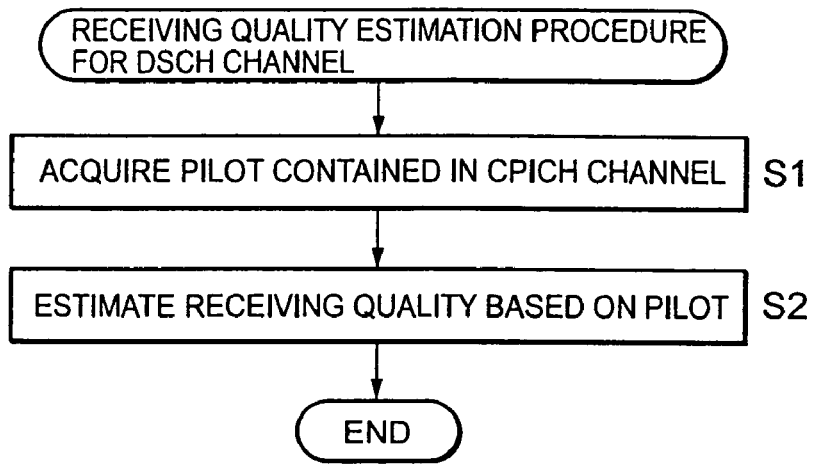
FIG. 12 is a flowchart for describing receiving quality estimation procedure in DSCH channel.

The CPICH receiving quality estimation unit 50 executes the receiving quality estimation procedure in FIG. 12 at every frame and the receiving quality bit insertion unit 51 disposes the receiving quality in DSCH channel $SIR_{DSCH}$ from the CPICH receiving quality estimation unit 50 in the (part of) data section of DPDCH channel (FIG. 10 (A)) as the receiving quality message. As a result, the receiving quality message indicating the receiving quality of DSCH channel $SIR_{DSCH}$ is transmitted from the mobile terminals 61 to the base station 62 in DPDCH channel at the frame rate.

Now, the power control information generation procedure of the DPCH channel signal will be described by reference to the flowchart in FIG. 13.

In the power control information generation procedure of the DPCH channel signal, in the first step S11, the individual pilot separation unit 71 extracts the individual pilot signal in the slots in DPCH channel from the reverse spread unit 43. And the extracted individual pilot signal is supplied to the DPCH receiving quality estimation unit 72.

In the next step S12, the DPCH receiving quality estimation unit 72 calculates the receiving quality in DPCH channel $SIR_{DPCH}$ in accordance with the above expression (1) using the individual pilot signal supplied from the individual pilot separation unit 71 at frame rate and the calculated receiving quality is then supplied to the power control bit generation unit 73.

In the subsequent step S13, the power control bit generation unit 73 compares the receiving quality $SIR_{DPCH}$ from the DPCH receiving quality estimation unit 72 with the predetermined threshold $\epsilon$ for making judgment of their relative magnitude.

If the receiving quality $SIR_{DPCH}$ is determined to be smaller than a predetermined threshold $\epsilon$ in step S13, it goes to the step S14 for setting 1 as the power control information TPC which is the information for requesting the transmission power in DPCH channel to increase by 1 dB. Such information is supplied to the power control bit insertion unit 74 before completing the procedure.

On the other hand, if the receiving quality $SIR_{DPCH}$ is determined not to be smaller than the predetermined threshold $\epsilon$ in step S13, it goes to the step S15 in which the power control bit generation unit 73 sets 0 as the power control information TPC for requesting the transmission power in DPCH channel to decrease by 1 dB. And such information is supplied to the power control bit insertion unit 74 before completing the procedure.

Figure 13:
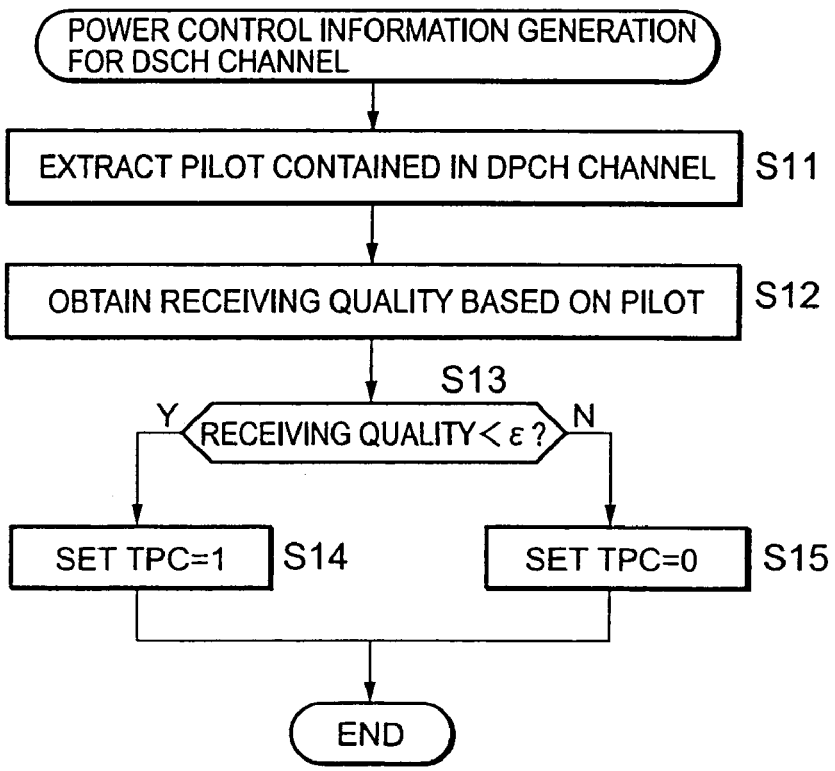
FIG. 13 is a flowchart for describing power control information generation procedure in DPCH channel.

The individual pilot separation unit 71, the DPCH receiving quality estimation unit 72 and the power control bit generation unit execute the power control information generation procedure of the DPCH channel signal in FIG. 13 at the slot rate. As a result, the power control information TPC is transmitted from the mobile terminal 61 to the base station 62 at the slot rate.

In other words, in the particular example, the receiving quality message indicating the receiving quality $SIR_{DPCH}$ in DSCH channel from the mobile terminals 61 to the base station 62 is transmitted at the frame rate. However, the power control information TPC in DPCH channel is transmitted at the slot rate that is shorter than the frame rate.

It is to be noted that, e.g., the receiving quality message is transmitted in a coded manner but the power control information TPC is transmitted without being coded.

Figure 14:
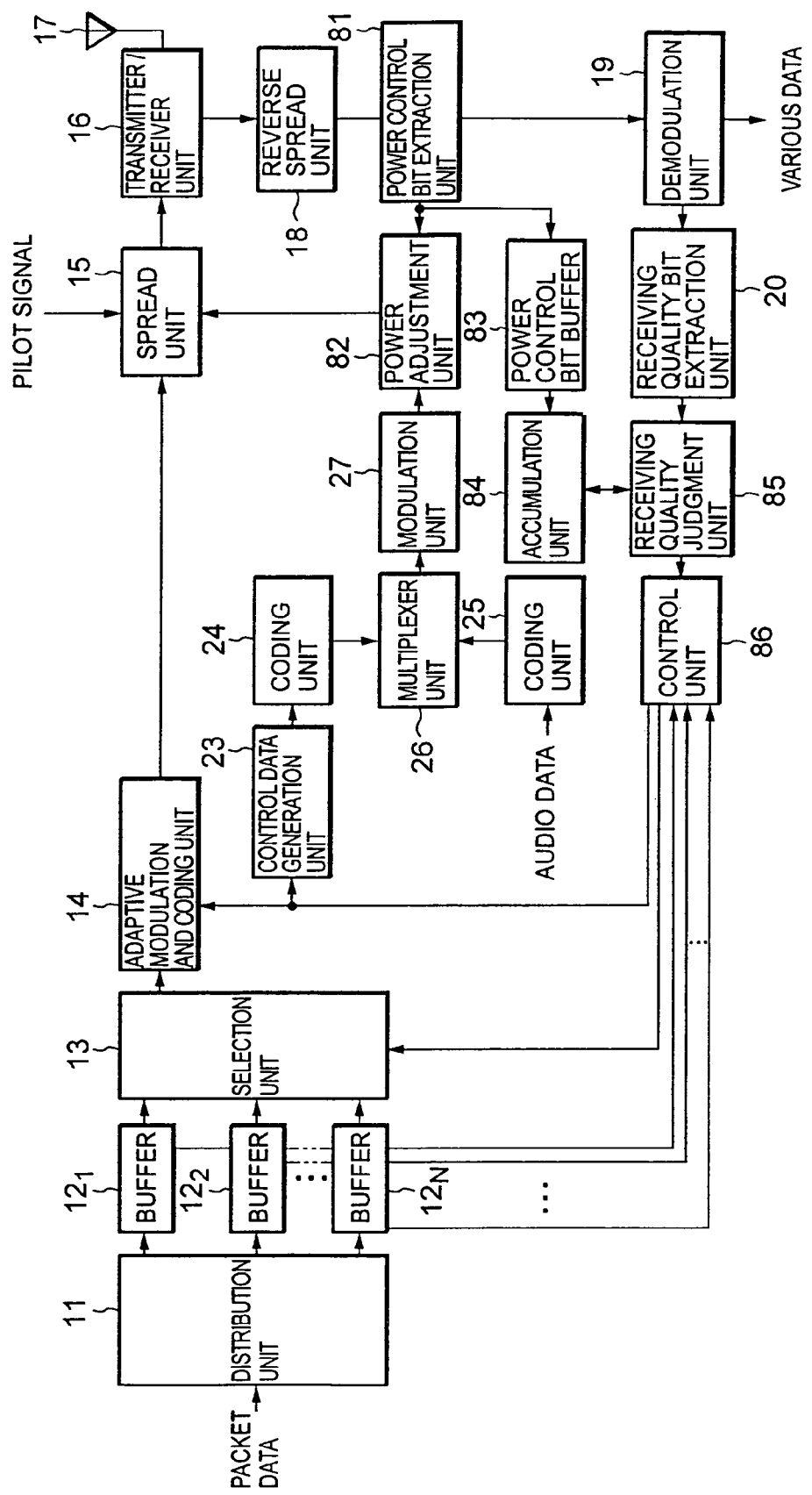
FIG. 14 is a block diagram of one example of base station 62.

Next, illustrated in FIG. 14 is the construction of the base station 62 in FIG. 14. Note that the corresponding units to those in FIG. 3 use the same reference numerals and their descriptions may be omitted. In other words, the base station 62 in FIG. 14 is basically the same as the base station 2 in FIG. 3 except the addition of power control bit extraction unit 81, power adjustment unit 82, power control bit buffer 83 and accumulation unit 84 and replacing the receiving quality judgment unit 21 and the control unit 22 by receiving quality judgment unit 85 and control unit 86.

The power control bit extraction unit 81 supplies the signal from the reverse spread unit 18 to the demodulation unit 19 and extracts the power control information TPC disposed in the TPC section in DPCCH channel (FIG. 10 (A)) from the signal. The power control information TPC is supplied to the power adjustment unit 82 and the power control bit buffer 83.

The power adjustment unit 82 adjusts the transmission power of the modulated signal from the modulation unit 27 in accordance with the power control information TPC from the power control bit extraction unit 81 to be supplied to the spread unit 15. In other words, if the power control information TPC is 1, the power adjustment unit 82 power amplifies the modulated signal from the modulation unit 27 by the amplification factor higher than the current value by 1 dB before being supplied to the spread unit 15. On the other hand, if the power control information TPC is 0, the power adjustment unit 82 power amplifies the modulated signal from the modulation unit 27 by the amplification factor lower than the current value by 1 dB before being supplied to the spread unit 15.

In the base station 62, the modulated signal with adjusted transmission power in the power adjustment unit 82 is transmitted to DPCH channel (FIG. 10 (B)). As described hereinabove, the mobile terminals 61 set the power control information TPC in response to the receiving quality in DPCH channel $SIR_{DPCH}$. As a result, in the base station 62, the DPCH channel signal is transmitted after adjusting the transmission power so as to obtain a predetermined receiving quality $SIR_{DPCH}$ by the mobile terminals 61.

The power control bit buffer 83 temporarily stores the 1 bit power control information TPC from the power control bit extraction unit 81. It is to be noted that the power control bit buffer 83 has a sufficient memory capacity to store the power control information TPC transmitted from the mobile terminals 61 for at least the report delay time that will be described hereinafter. The power control bit buffer 83 is comprised of, e.g., a so called ring buffer so that the current power control information overwrites the oldest power control information when no vacant capacity is available.

The accumulation unit 84 accumulates one part or all of the power control information stored in the power control bit buffer 83 which will be described hereinafter and the accumulated value is supplied to the receiving quality judgment unit 85.

The receiving quality judgment unit 85 controls the accumulation unit 84 to acquire the accumulated value of the power control information. Also, the receiving quality judgment unit 85 uses the receiving quality message supplied from the receiving quality bit extraction unit 20 and the accumulated value of the power control information from the accumulation unit 84 for accurately estimating the current receiving quality of DSCH channel (FIG. 10 (B)) in the mobile terminals 61 and the estimated value is supplied to the control unit 86.

The control unit 86 executes the resource allocation procedure to be described hereinafter based on the receiving quality from the receiving quality judgment unit 85, thereby determining the buffer $12_n$ to be selected by the selection unit 13. The selection unit 13 is controlled in accordance with the determination. It is to be noted that the control unit 86 is designed to supply respective data storage amount in the buffers $12_1$ to $12_n$. The control unit 86 executes the resource (communication resources) allocation procedure based not only on the receiving quality from the receiving quality judgment unit 85 but also the respective data storage amount in the buffers $12_1$ to $12_n$ or the like.

The base station 62 having the above construction executes the transmission procedure for transmitting data to the mobile terminals 61 and the receiving procedure for receiving the data from the mobile terminals 61.

In other words, in the transmission procedure, the packet data transmitted from other mobile terminals through, e.g., another base station is supplied to and stored in a predetermined buffer $12_n$ by way of the distribution unit 11. And the selection unit 13 selects either one of the buffers $12_1$ to $12_n$ under control of the control unit 86 as described hereinafter. The packet data stored in the selected buffer $12_n$ is read out for supplying to the adaptive modulation and coding unit 14. The adaptive modulation and coding unit 14 adaptively modulates and encodes the packet data from the selection unit 13 in accordance with the modulation coding mode supplied from the control unit 86. And the resulting modulated signal is supplied to the spread unit 15.

On the other hand, the audio data from other mobile terminals transmitted from another base station is supplied to the multiplexer unit 26 through the coding unit 25. The control data generated by the control data generation unit 23 is supplied to the multiplexer unit 26 through the coding unit 24.

The multiplexer unit 26 and the modulation unit 27 process the audio data and the control data in the similar manner to the case in FIG. 3. And the resulting modulated signal is supplied from the modulation unit 27 to the power adjustment unit 82.

As described hereinabove, the power adjustment unit 82 adjusts the transmission power of the modulated signal in accordance with the current power control information from the power control bit extraction unit 81 and supplies to the spread unit 15.

The spread unit 15 is designed to receive the common pilot signal together with the modulated signal from the adaptive modulation and coding unit 14 and the modulated signal from the power adjustment unit 82. The spread unit 15 provides a spread spectrum signal by spectrum spreading the modulated signal from the adaptive modulation and coding unit 14, the modulated signal from the power adjustment unit 82 and the common pilot signal into the same frequency bandwidth using respectively different spread coding. The spread spectrum signal is then supplied to the transmitter/receiver unit 16 and transmitted from the antenna 17 in a radio wave.

It is to be noted that the modulated signal from the adaptive modulation and coding unit 14, the modulated signal from the power adjustment unit 82 and the common pilot signal are transmitted in DSCH channel (FIG. 10 (B)), DPCH channel and CPICH channel, respectively.

On the other hand, in the receiving procedure, the radio wave transmitted form the mobile terminal 61 is received by the antenna 17 and the received signal is then supplied to the power control bit extraction unit 81 through the transmitter/receiver unit 16 and the reverse spread unit 81.

The power control bit extraction unit 81 not only supplies the signal from the reverse spread unit 18 to the demodulation unit 19 and extracts from such signal the power control information TPC disposed in the TPC section in DPCCH channel (FIG. 10 (A)) for supplying to the power adjustment unit 82 and the power control bit buffer 83.

As described in the above transmission procedure, the power adjustment unit 82 adjusts (increases or decreases by 1 dB) the transmission power of the modulated signal transmitted in DPCH channel from the modulation unit 27 in accordance with the recent power control information TPC from the power control bit extraction unit 81 and such signal is supplied to the spread unit 15. As described hereinabove, the power control information TPC is transmitted from the mobile terminal 61 by being disposed in the slots. As a result, the modulated signal transmitted in DPCH channel is transmitted with adjusted transmission power for each slot.

The power control buffer 83 sequentially stores the 1 bit power control information TPC from the power control bit extraction unit 81. It is to be noted that the power control information TPC stored in the power control bit buffer 83 is used to execute the receiving quality judgment procedure, which will be described hereinafter. In this manner, the receiving quality in DSCH channel in the mobile terminals 61 is accurately estimated.

On the other hand, the demodulation unit 19 demodulates the signal from the power control bit extraction unit 81 to obtain various data such as the packet data and the audio data. Among the data obtained by demodulation of the demodulation unit 19, the data disposed in DPDCH channel (FIG. 10 (A)) is also supplied to the receiving quality bit extraction unit 20.

As described hereinabove, the receiving quality message indicating the receiving quality $SIR_{DSCH}$ in DSCH channel is disposed in DPDCH channel at the frame rate and transmitted to the base station 62 from the mobile terminal 61.

The receiving quality bit extraction unit 20 extracts the receiving quality message included in the data in DPDCH channel (FIG. 10 (A)) from the demodulation unit 19 and such message is supplied to the receiving quality judgment unit 85.

The receiving quality judgment unit 85 uses both the receiving quality message from the receiving quality bit extraction unit 20 and the power control information stored in the power control bit buffer 83 for accurately estimating the current receiving quality in DSCH channel SIR (Signal to Interference Ratio) in the mobile terminal 61.

Figure 15:
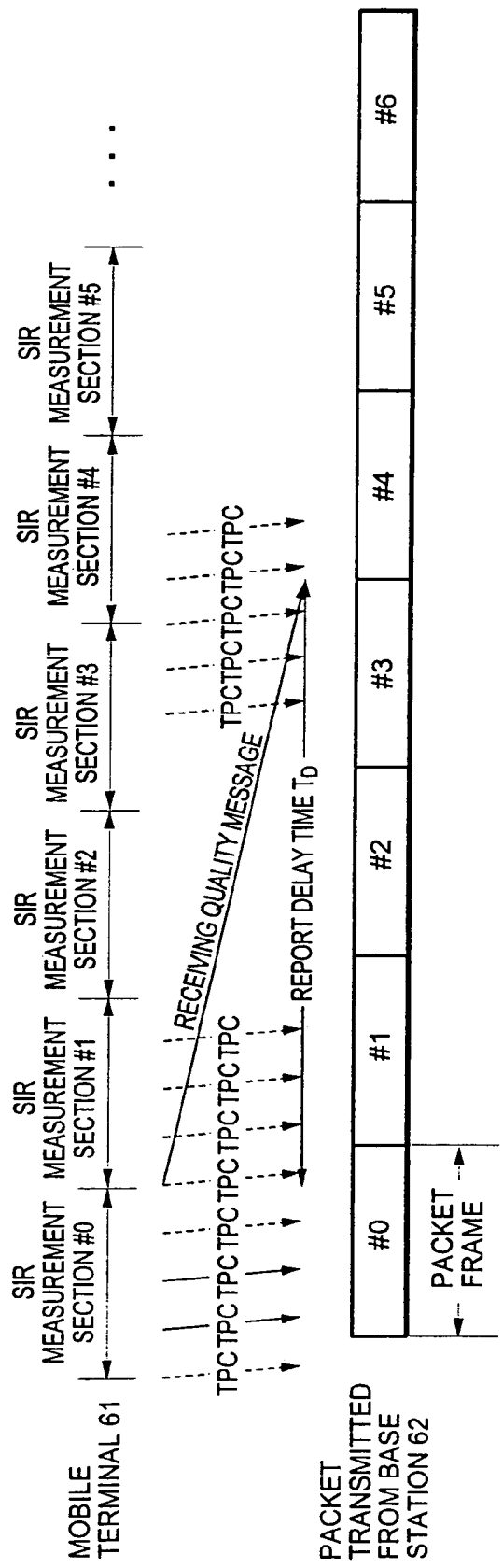
FIG. 15 is an illustration for describing the processing in receiving quality judgment unit 85.

In other words, in the mobile terminal 61, 1 frame of CPICH channel (FIG. 10 (B)) is chosen as an interval (SIR measurement section) for measurement of the receiving quality in CPICH channel as illustrated in FIG. 15. The common pilot signal in such SIR measurement section is monitored and calculates the receiving quality in DSCH channel $SIR_{DSCH}$ in accordance with the above expression (2). The receiving quality message indicating the receiving quality $SIR_{DSCH}$ is disposed in the data section in DPDCH channel (FIG. 10 (A)) and is transmitted at the frame rate. However, since the receiving quality message is coded, it must be decoded. Furthermore, the decoding cannot be made until after receiving the entire data in the frame in which the receiving quality message is disposed.

For this reason, the receiving quality in DSCH channel is recognized in the base station 2 from only the receiving quality message transmitted from the mobile terminal 61. The modulation coding mode is selected in response to the receiving quality to perform the adaptive modulation and coding in the modulation coding mode. As illustrated in FIG. 15, adaptive modulation and coding in the modulation coding mode in response to the receiving quality is performed in the base station 62 at a substantially delayed timing from the time when the receiving quality in DSCH channel is observed in the mobile terminal 61.

It has to be noted that in the particular example illustrated in FIG. 15, the adaptive modulation and coding in the modulation coding mode in response to the receiving quality is performed in the base station after the delay time equal to 4 frames since the receiving quality in DSCH channel is monitored in the mobile terminal 61. In other words, in FIG. 15, let say the frame in DSCH channel to perform the adaptive modulation and coding an interested frame, the receiving quality indicating the current receiving quality message usable for determining the modulation coding mode for the interested frame has been calculated past the delay time equal to 4 frames in the mobile terminal 61.

Now, the time difference between the timing of the interested frame and the timing when the mobile terminal 61 calculated the receiving quality indicating the receiving quality message used for determining the modulation coding mode for the interested frame is referred to as a report delay time $T_D$.

In the base station 62, in case of recognizing the receiving quality in DSCH channel based only the receiving quality message, the adaptive modulation and coding for the interested frame is performed based on the old receiving quality calculated by the mobile terminal 61 by the report delay time $T_D$. As a result, if the current receiving quality of the mobile terminal 61 has changed during the report delay time $T_D$, an optimum adaptive modulation and coding cannot be performed for the interested frame, thereby resulting in degradation in the transmission efficiency.

In order to overcome this problem, the receiving quality judgment unit 85 accurately estimates the current receiving quality in DSCH channel SIR in the mobile terminal 61 using not only the receiving quality message in DSCH channel but also the power control information TPC for transmission power control in DPCH channel.

In other words, as described hereinabove, the power control information TPC from the mobile terminal 61 is chosen at the slot rate shorter period than the rate when the receiving quality message is transmitted (⅕ or ¹⁄₁₅ according to the data format as illustrated in FIG. 10). Also, the power control information TPC is transmitted without being coded, thereby enabling to acquire the power control information TPC disposed in the slots immediately. Furthermore, since the power control information TPC requests transmission power adjustment in order to maintain the receiving quality in DPCH channel in the mobile terminal 61, the value indicates whether the receiving quality in DPCH channel has been improved or degraded as compared to the receiving quality in the past. Although DPCH and DSCH channels are different from each other, they are spectrum spread in the same frequency bandwidth and transmitted at the same time. Change of the receiving quality in DPCH channel may be considered to basically indicate changes of the receiving quality in DSCH channel.

Based on the above assumption, the receiving quality judgment unit 85 takes in consideration of the accumulated value of the power control information TPC received in the time preceding the report delay time $T_D$ for the receiving quality message from the interested frame for which the modification coding mode is going to determine (set) based on the receiving quality message. In this manner, the current receiving quality in DSCH channel SIR for the mobile terminal 61 may be estimated accurately by the receiving quality judgment procedure.

Figure 16:
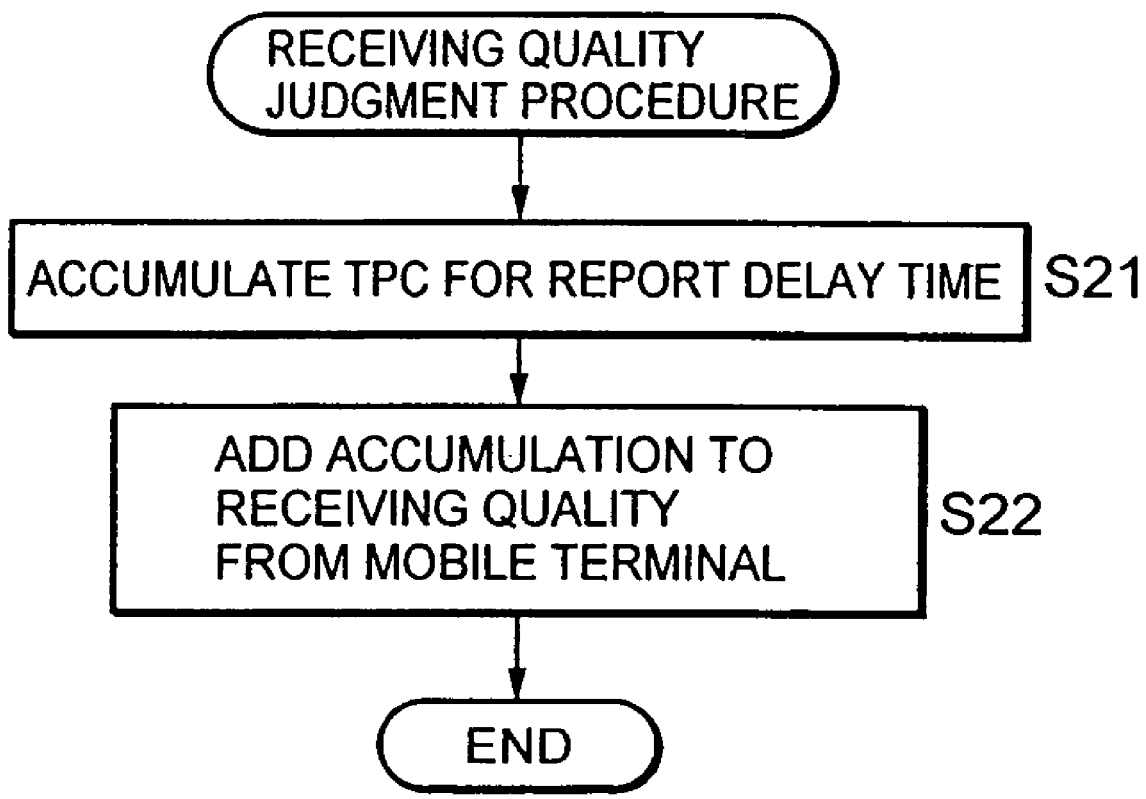
FIG. 16 is a flowchart for describing receiving quality judgment procedure.

In other words, illustrated in FIG. 16 is a flowchart describing such receiving quality judgment procedure.

In first step S21, the receiving quality judgment unit 85 controls the accumulation unit 84 in such a manner as to calculate the accumulation of the power control information TPC as received at the time preceding the report delay time $T_D$ corresponding to the recent receiving quality message.

In this manner, the accumulation unit 84 uses the power control information TPC stored in the power control bit buffer 83 and calculates the accumulated value ΔSIR [dB] in accordance with, e.g., the following expression:

$$\Delta SIR = \Sigma(1 - 2 \times TPC[k]) \quad (3)$$

It has to be noted that TPC [k] in the above expression (3) is the power control information received at the preceding time equal to k slots with respect to the interested frame and Σ means summation over the report delay time $T_D$.

Then, in the next step S22, the receiving quality judgment unit 85 estimates the current receiving quality in DSCH channel SIR in the mobile terminal 61 by adding the receiving quality in DSCH channel $SIR_{DSCH}$ indicating the current receiving quality and the accumulated value ΔSIR in accordance with the following expression before completing the procedure.

$$SIR = SIR_{DSCH} + \alpha \times \Delta SIR \quad (4)$$

However, α in the above expression (4) is a weighting factor to the accumulated value ΔSIR which is a real numerical value within the range of 0 or more and 1 or less.

In the above manner, the receiving quality judgment unit 85 accurately estimates the current receiving quality in DSCH channel SIR. And the receiving quality SIR is supplied to the control unit 86 that determines the modulation coding mode for the interested frame based on the accurate receiving quality SIR. Accordingly, the mobile terminal 61 performs the adaptive modulation and coding best suited for the current receiving quality for the interested frame, thereby improving the transmission efficiency.

It has to be noted that the report delay time $T_D$ can be set, e.g., to a fixed time in advance. Alternatively, the current time may be transmitted, e.g., by adding to the receiving quality message in the mobile terminal 61 for calculating the report delay time $T_D$ by the base station 62 based on the current time added to the receiving quality message.

Although the power control information TPC is transmitted at the slot rate from the mobile terminal 61 in the above case, it is possible to send the power control information TPC at an interval of several slots. However, in this case, estimation accuracy of the current receiving quality in DSCH channel SIR in the mobile terminal 61 is degraded as compared to the case of transmitting the power control information TPC in every slot.

Since the power control information TPC is not coded, it may include an error. It is therefore possible to estimate the current receiving quality in DSCH channel SIR with a certain degree of hysteresis, e.g., in accordance with the following expression:

$$SIR = SIR_{DSCH} + \alpha \times \Delta SIR \text{ (where } |\Delta SIR| > th)$$

$$SIR = SIR_{DSCH} \text{ (where } |\Delta SIR| \leq th) \quad (5)$$

According to the above expression (5), the absolute value of the accumulation |ΔSIR| is less than a predetermined threshold value th, such small absolute value of the accumulation ΔSIR is considered as an error and is not included in the estimation of the receiving quality in DSCH channel SIR.

Figure 17:
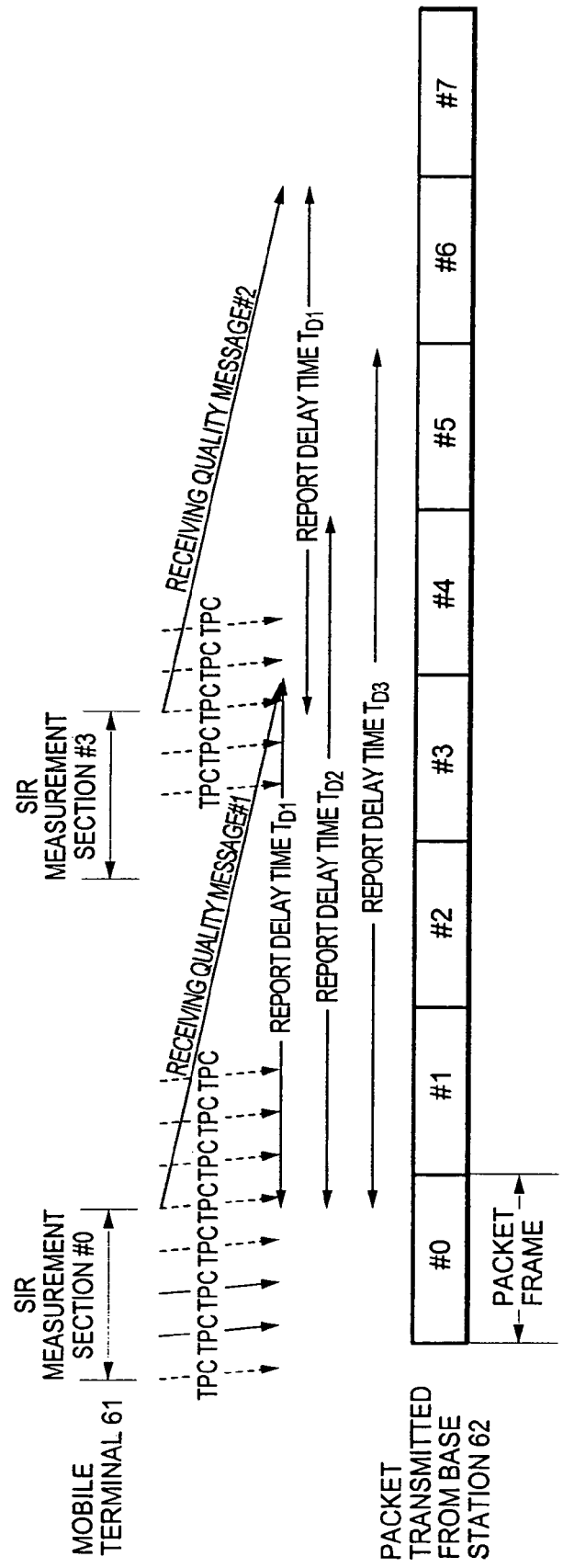
FIG. 17 is an illustration for describing the time interval of accumulating power control information in accumulation unit 84.

Next, although the receiving quality message is transmitted at the frame rate in the mobile terminal 61 in the above case, it is possible to transmit the receiving quality message at an interval of predetermined number of slots, e.g., as illustrated in FIG. 17. In other words, for example, if resources in the upstream line from the mobile terminal 61 to the base station 62 are insufficient, the frequency of transmitting the receiving quality message from the mobile terminal 61 may be decreased. In the particular case as illustrated in FIG. 17, the receiving quality message from the mobile terminal 61 is transmitted at an interval equal to 3 frames.

However, in such case of transmitting the receiving quality message at the interval of several frames, the report delay time varies depending on the interested frames. As a result, the interval of accumulating the power control information TPC must be modified depending on such changes.

In other words, in the case of transmitting the receiving quality message, e.g., at the interval of 3 frames as illustrated in FIG. 17, the timing of receiving the next receiving quality message #2 after receiving the receiving quality message #1 in the base station 62 is 3 frames after that time. As a result, what is transmitted in the base station 62 immediately after the timing of receiving the receiving quality message #1 is a fourth frame as illustrated in FIG. 17, the timing when the receiving quality message #2 is obtained is immediately before transmitting a seventh frame, that is 3 frames after the fourth frame.

As described hereinbefore, it is necessary to estimate the current receiving quality in DSCH channel SIR using the receiving quality message #1 for three frames from the fourth frame to immediately before the seventh frame.

In this case, the report delay time $T_{D1}$ for the fourth frame is equal to the report delay time $T_D$ in the case in FIG. 15. However, the report delay time $T_{D2}$ for the fifth frame and the report delay time $T_{D3}$ for the sixth frame are not equal to the report delay time $T_D$. In other words, the report delay time $T_{D2}$ for the fifth frame is equal to the report delay time $T_D$ plus the time for 1 frame. On the other hand, the report delay time $T_{D3}$ for the sixth frame is equal to the report delay time $T_D$ plus the time for 2 frames.

Accordingly, in the case where the receiving quality message is transmitted at an interval equal to several frames, it is necessary to accumulate the power control information TPC by changing the report delay time for each interested frame as described hereinabove in the accumulation unit 84 (it is necessary to change the interval for accumulating the power control information TPC).

As described hereinabove, in the case where the transmission frequency of the receiving quality message from the mobile terminal 61 is changed in response to the resources in the upstream line, the frequency of the resources in the upstream line becoming insufficient may be reduced.

It is to be noted that the interval of transmitting the receiving quality message from the mobile terminal 61 may be variable rather than fixed.

In addition, although the number of slots constituting the upstream line and the downstream line are identical in the above embodiment, in the case where the number of slots differ in the upstream line and the downstream line, the receiving quality of the mobile terminal 61 when transmitting the frames may be accurately estimated by varying the report delay time in the similar manner as described hereinabove.

Next, although the current receiving quality in DSCH channel SIR in the mobile terminal 61 is estimated by adding the receiving quality $SIR_{DSCH}$ indicating the current receiving quality message and the accumulated value $\Delta SIR$ of the power control information TPC in the above case, the current receiving quality in DSCH channel SIR may be estimated using the receiving quality SIR indicating receiving quality messages that have been received in the past, i.e., using a plurality of receiving quality messages.

Figure 18:
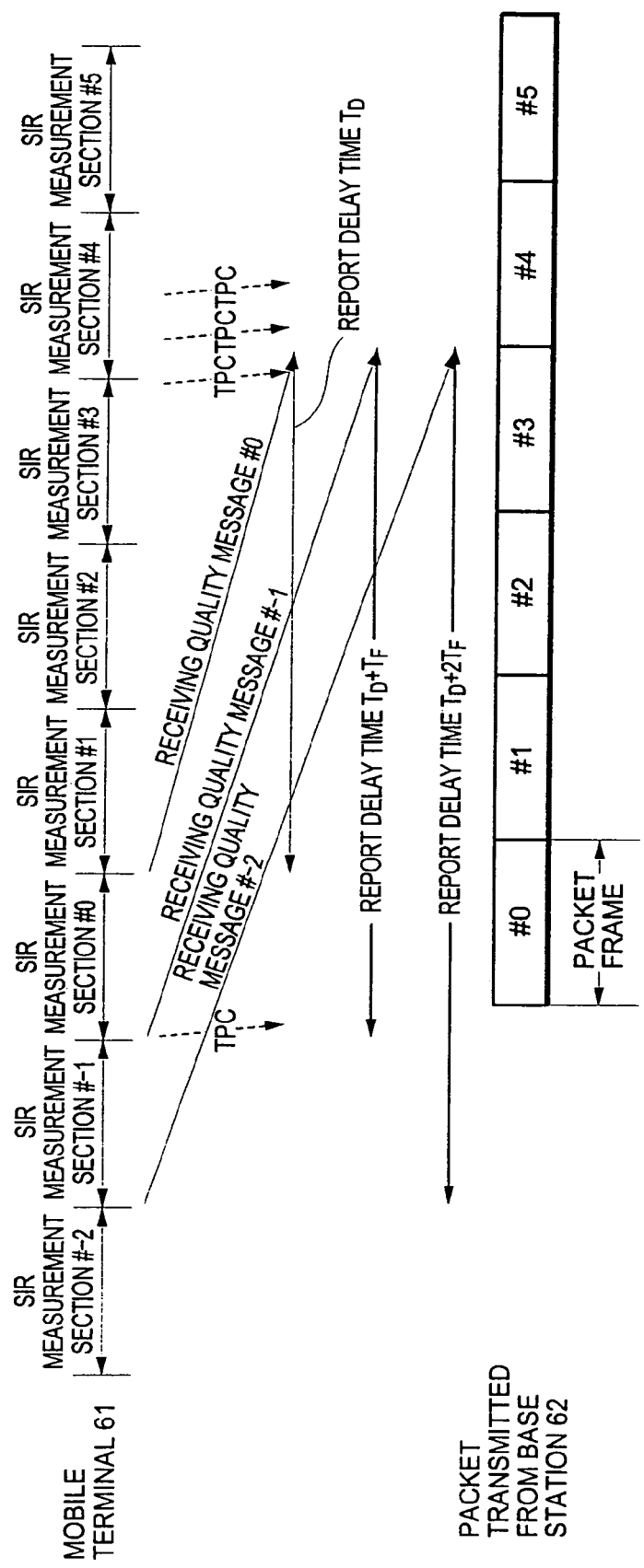
FIG. 18 is an illustration for describing the processing in receiving quality judgment unit 85.

In other words, for example, as illustrated in FIG. 18, it is possible to estimate the current receiving quality in DSCH channel SIR using the recent receiving quality message #0 together with the receiving quality message #−1 received 1 frame before the message #0 and the receiving quality message #−2 received further 1 frame before the message #−1.

In this case, the power control information TPC is accumulated by varying the report delay time for each receiving quality message.

In other words, in the embodiment as illustrated in FIG. 18, the power control information TPC is accumulated over the time interval of the report delay time $T_D$ similar to the case in FIG. 15 for the current receiving quality message #0 and the accumulated value is added to the receiving quality indicating the receiving quality message #0 for calculation of the current first receiving quality in DSCH channel SIR [1].

For the receiving quality message #−1 received 1 frame before, the accumulation of the power control information TPC is performed over the time interval of the report delay time $T_D$ plus the time $T_F$ for 1 frame and the accumulated value is added to the receiving quality indicating the receiving quality message #−1 for calculating the current second receiving quality in DSCH channel SIR [2]. For the receiving quality message #−2 received 2 frame before, the power control information TPC is accumulated over the time interval of the report delay time $T_D$ plus the time for 2 frames $2T_F$ and the accumulated value is added to the receiving quality indicating the receiving quality #−2 for calculating the current third receiving quality in DSCH channel SIR [3].

In addition, the first through third receiving quality SIR [1] to SIR [3] are averaged, for example, with or without weighting for estimating the current receiving quality in DSCH channel SIR in the mobile terminal 61.

Now, in estimating the current final receiving quality in DSCH channel in the mobile terminal 61 using the recent receiving quality message through receiving quality message before N frames, estimation can be made in accordance with the following expression:

$$SIR=\Sigma(w[i] \times SIR_{DSCH}[i]+\alpha[i]\Delta SIR[i]) \qquad (6)$$

In the above expression (6), $SIR_{DSCH}$ [i] represents the receiving quality indicating the receiving amount i frame before the recent receiving quality message. And $\Delta SIR[i]$ represents the accumulated value of the power control information TPC over the time interval of the report delay time for the receiving quality message. $\alpha[i]$ is a weighting factor for the accumulated value $\Delta SIR[i]$ Furthermore, w[i] is the weighting factor for the current receiving quality in DSCH channel that can be calculated from the receiving quality $SIR_{DSCH}[i]$ indicating the receiving quality message from the current receiving quality message to the receiving quality message for i frames therebefore. Finally, $\Sigma$ represents the summation by varying the i from 0 to N.

Here, the weighting factor w[i] is equal to 1 when i is summed and is preferable to satisfy the expression, e.g., $w[i] \leq w[i-1]$.

It has to be noted that, although all receiving quality messages from the recent receiving quality message to the N frames before according to the above expression (6), it is possible to estimate the current receiving quality in DSCH channel SIR for the mobile terminal 61 using receiving quality messages for a plurality of skipping frames rather than the receiving quality for a plurality of consecutive frames.

In addition, the receiving quality estimation method as described hereinabove in FIG. 18 is applicable to the case for transmitting the receiving quality messages from the mobile terminal 61 in skipping frame manner.

Figure 19:
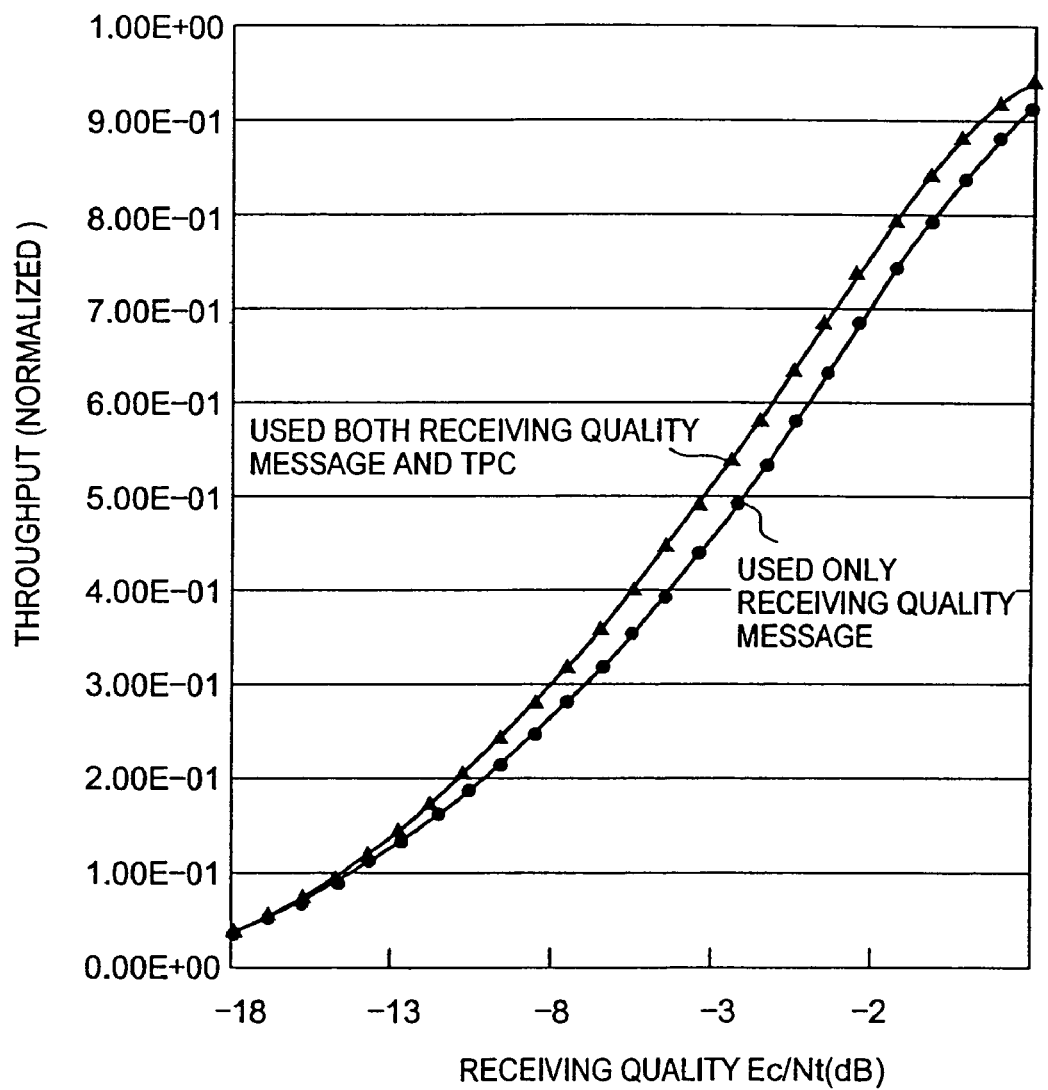
FIG. 19 is a graph illustrating the simulation result.

Next, FIG. 19 shows a graph of simulation results of estimating the receiving quality in DSCH channel based only on the receiving quality message and on both the receiving quality message and the power control information as described hereinabove in FIG. 15.

In FIG. 19, the horizontal axis represents the receiving quality in DSCH channel and the vertical axis represents the normalized throughput of the base station 62.

In FIG. 19, ● shows the throughput of the receiving quality in DSCH channel estimated by only the receiving quality message while ▲ shows the throughput of the receiving quality in DSCH channel estimated by the receiving quality message and the power control information. The report delay time $T_D$ is equal to the time for 4 frames.

As it is apparent from FIG. 19, estimation of the receiving quality in DSCH channel by the receiving quality message and the power control information improves the throughput as compared to estimation by only the receiving quality message.

It has to be noted that, under the so-called soft hand-off (software handover) condition when the mobile terminal 61 communicates with not only the base station but also with other base stations, the receiving quality in DSCH channel is preferably estimated without using the power control information or with very small weighting for the power control information. The reason is given as follows.

In other words, since it is necessary for DPCH channel transmitting the control data to regularly allocate to users, in the mobile terminal 61 under the soft hand-off condition, signals from a plurality of base stations are combined (e.g., performing the RAKE receiving for combining the outputs from so-called fingers), thereby improving the receiving quality. However, since, user allocation is carried out irregularly for DSCH channel transmitting adaptively modulated and coded packet data, data transmission is most likely to be performed from only one base station even if data transmission from a plurality of base stations is possible. Accordingly, under the soft hand-off condition, although the receiving quality in DPCH channel may be improved by the RAKE receiving, the receiving quality in DSCH channel is not improved.

In addition, in the mobile terminal 61, when the signals in DPCH channel are combined (when RAKE received), the power control information TPC is generated based on the combined signal.

As a result, changes in the receiving quality in DPCH channel indicating the power control information TPC cannot be recognized as changes in the receiving quality in DSCH channel. As a result, accuracy of the receiving quality in DSCH channel may deteriorate if estimated by taking the power control information TPC into consideration.

In the case where the mobile terminal 61 is communicating with a plurality of base stations, the receiving quality in DSCH channel is preferably estimated without the power control information or with very small weighting factor for the power control information. Note that such estimation can be made by setting the weighting factor α in the above expression (4) to 0 or close to 0.

Figure 20:
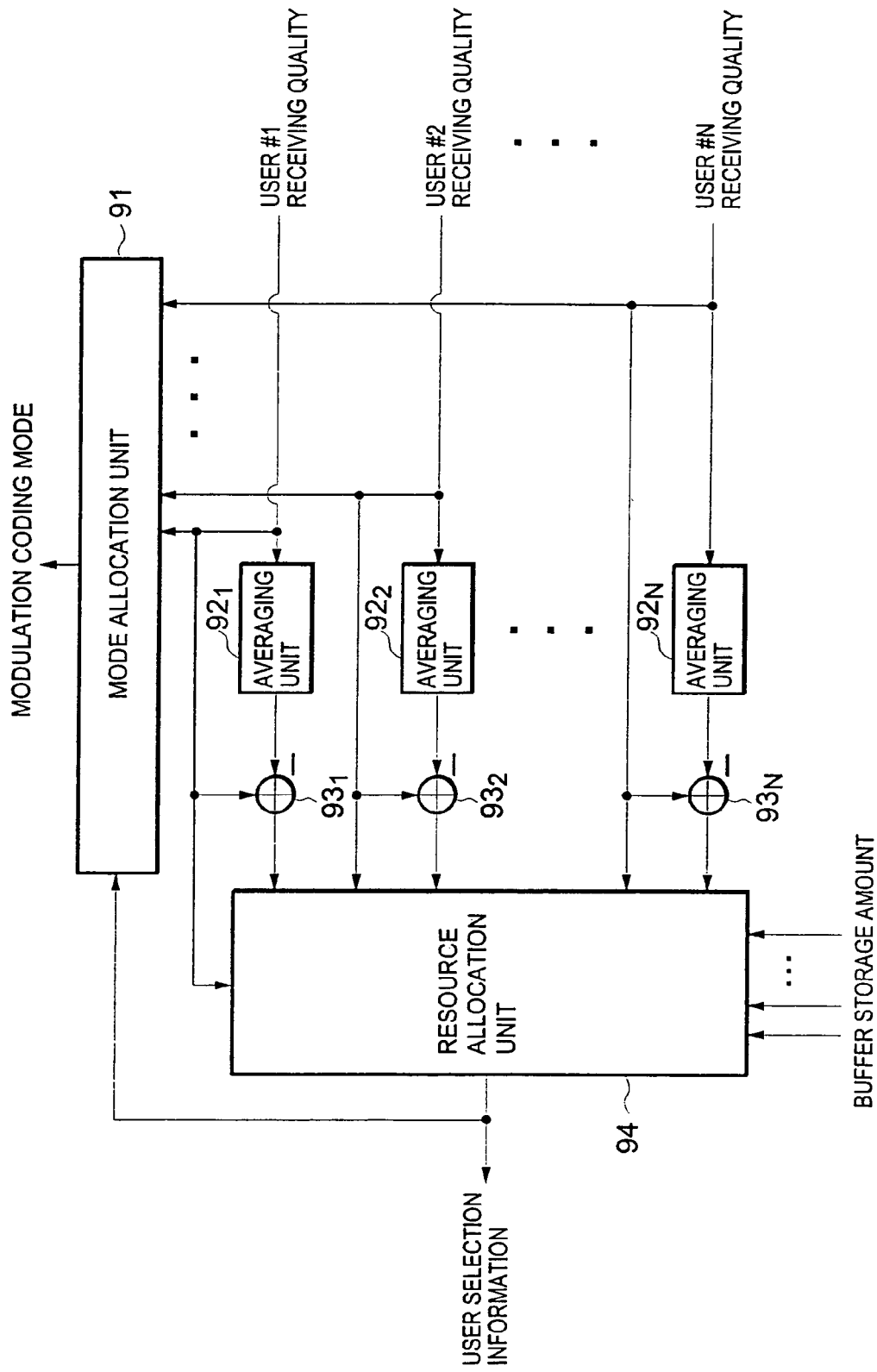
FIG. 20 is a block diagram of an example of control unit 86.

Next, illustrated in FIG. 20 is the construction of an example of the control unit 86 in FIG. 14.

The control unit 86 includes averaging units $92_1$ to $92_n$ and arithmetic devices $93_1$ to $93_n$ each having the same number N as the buffers $12_1$ to $12_n$ in FIG. 14 as well as one each of mode allocation unit 91 and resource allocation unit 94.

Supplied to the mode allocation unit 91 from the receiving quality judgment unit 85 is the receiving quality (estimated value) in DSCH channel in the mobile terminal 61 of the user to which the communication channel is established. Also supplied to the mode allocation unit 91 is a user selection information to be obtained by executing a resource allocation procedure in the resource allocation unit 94 which will be described hereinafter.

Here, the user selection information indicates one of the user mobile terminal 61 establishing the communication link to which DSCH channel is allocated. Concretely, it means one of the buffers $12_1$ to $12_n$ storing the packet data addressed to the user to which DSCH channel is allocated.

The mode allocation unit 91 determines the modulation coding mode for transmitting the packet data stored in the buffer $12_n$ indicating the user selection information to the mobile terminal 61 of the user to which the packet data is addressed based on the receiving quality in DSCH channel, thereby outputting the modulation coding mode. The modulation coding mode is supplied to the adaptive modulation and coding unit 14 and the control data generation unit 23 as described hereinabove by reference to FIG. 14.

The receiving quality in DSCH channel in the mobile terminal 61 of the user who has established the communication link is supplied not only to the mode allocation unit 91 but also to the averaging unit $92_n$ corresponding to the buffer $12_n$ allocated to the user.

The averaging unit $92_n$ calculates the receiving quality of the mobile terminal 61 of the user to which the buffer $12_n$ is allocated, e.g., the average value since the communication link of the mobile terminal 61 is established as the represented value of the receiving quality in the mobile terminal 61. And such calculated value is supplied to the arithmetic device $93_n$.

It has to be noted that, since the receiving quality of the mobile terminal 61 is supplied, e.g., at the frame rate from the receiving quality judgment unit 85, the averaging unit $92_n$ calculates the new average upon receiving the receiving quality at the frame rate and supplies such new averaged value to the arithmetic device $93_n$.

By calculating the receiving quality of the mobile terminal 61 over a certain long time interval in the averaging unit $92_n$ in the above manner, it is possible to remove from the receiving quality any temporary change in the transmission path quality such as fading.

In addition, although a simple average is calculated as a representative receiving quality of the mobile terminal 61, it is possible to use other calculations such as moving average, weighted average, etc. In case of calculating the weighted average as the representative value of the receiving quality for the mobile terminal 61, the receiving quality, e.g., closer to the current time should have a larger weighting factor.

Supplied to the arithmetic device $93_n$ are not only the average value of the receiving quality in the mobile terminal 61 of the user allocated to the corresponding buffer $12_n$ from the averaging unit $92_n$ but also the current receiving quality in the mobile terminal 61. And the arithmetic device $93_n$ calculates the difference between the current receiving quality and the averaged receiving quality (referred to as receiving quality difference hereunder) and supplies it to the resource allocation unit 94.

Supplied to the resource allocation unit 94 are not only the receiving quality differences from the averaging units $92_1$ to $92_n$ but also the current receiving quality of the mobile terminal 61 of the user to which the buffers $12_1$ to $12_n$ is allocated.

Also supplied to the resource allocation unit 94 is the data storage amount (or buffer storage amount) from the buffers $12_1$ to $12_n$.

The resource allocation unit 94 executes the resource allocation procedure based on the above receiving quality difference, the current receiving quality and the buffer storage amount, thereby determining the user of the mobile terminal 61 to which DSCH channel is allocated. And the resource allocation unit 94 supplies the user selection information indicating the buffer $12_n$ to which the user is allocated to the mode allocation unit 91 and the selection unit 13 in FIG. 14.

In the above manner, the selection unit 13 in FIG. 14 selects the buffer $12_n$ indicating the user selection information supplied from the resource allocation unit 94 for reading out the packet data stored therein and the read-out data is supplied to the adaptive modulation and coding unit 14.

Figure 21:
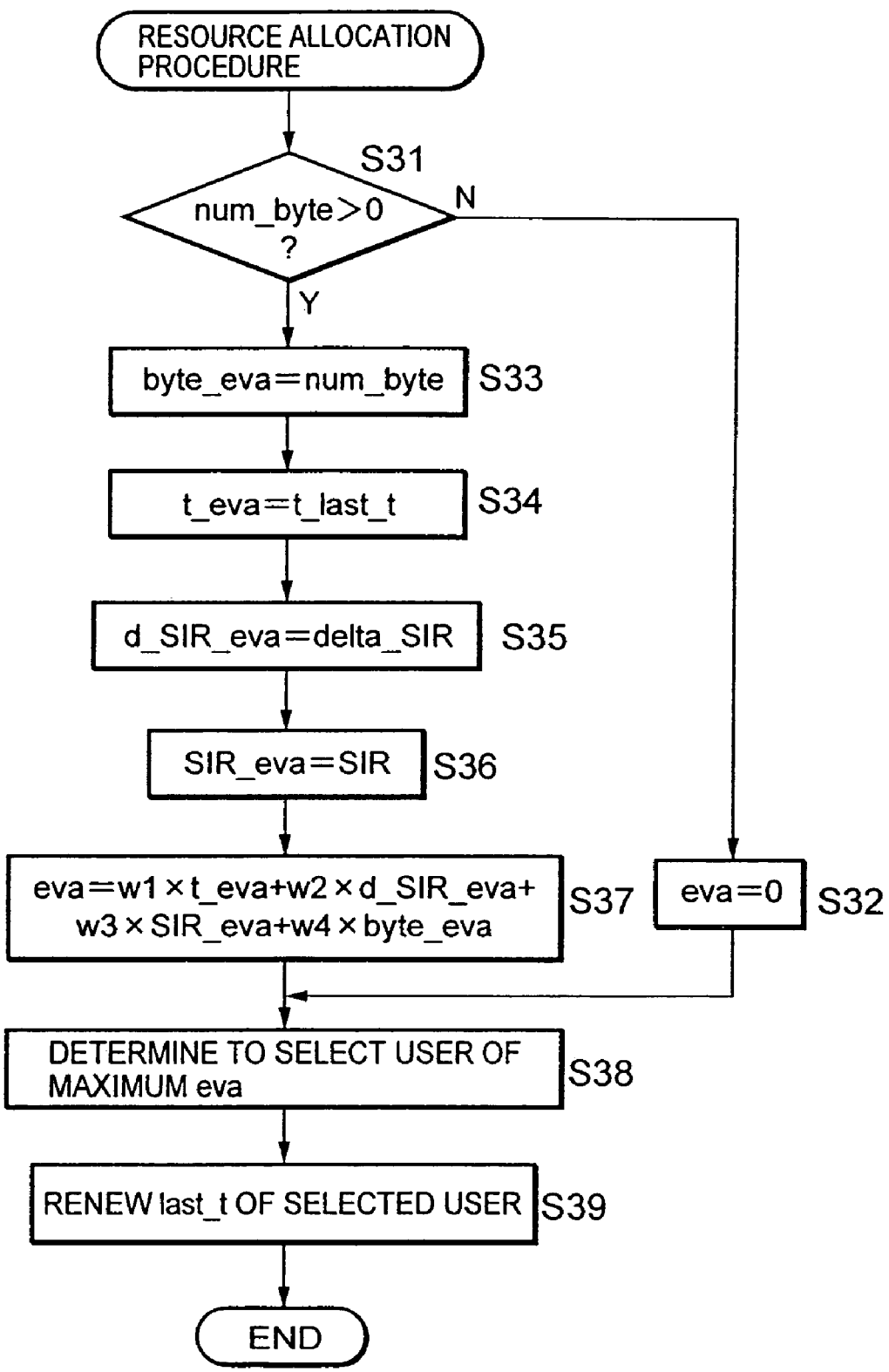
FIG. 21 is a flowchart for describing the resource allocation procedure.

Next, reference is made to the flowchart in FIG. 21 to describe the operation of the resource allocation unit 94 in FIG. 20, which executes a resource allocation procedure.

In a first step S31 of the resource allocation procedure, judgment is made by the resource allocation unit 94 to determine if the buffer storage amount num_byte in the buffer $12_n$ is greater than 0 byte, i.e., if any packet data is stored in the buffer $12_n$.

If the buffer storage amount num_byte in the buffer $12_n$ is determined not greater than 0 byte in step S31, i.e., if there is no packet data to be transmitted to the mobile terminal 61 of the user allocated to the buffer $12_n$, it goes to step S32 and the resource allocation unit 94 sets the evaluation value eva for evaluating the allocation of DSCH channel for the user to 0 before moving to step S38.

On the other hand, if the buffer storage amount num_byte of the buffer $12_n$ is determined greater than 0 byte, i.e., if there is packet data to be transmitted to the mobile terminal 61 of the user allocated to the buffer $12_n$ in step S31, it goes to step S33 in which the resource allocation unit 94 sets the buffer storage amount num_byte to a first argument byte_eva for calculating the evaluation value eva before moving to step S34.

In step S34, the resource allocation unit 94 subtracts from the present time t the last time last_t when DSCH channel is allocated to the mobile terminal 61 of the user to which the buffer $12_n$ is allocated. This gives the waiting time for the use of DSCH channel as the DSCH channel allocation frequency to the user and sets to a second argument t_eva for calculating the evaluation value eva.

Then, the resource allocation unit 94 moves to step S35 in which the receiving quality difference delta_SIR from the averaging unit $92_n$ is set to a third argument d_SIR_eva for calculating the evaluation value eva before moving to step S36. In step S36, the resource allocation unit 94 sets the latest receiving quality SIR of the user mobile terminal 61 to which the buffer $12_n$ is allocated to a fourth argument SIR_eva for calculation of the evaluation value eva before moving to step S37.

In step S37, the resource allocation unit 94 calculates the evaluation value eva, e.g., in accordance with the following expression before moving to step S38.

$$eva = w1 \times t\_eva + w2 \times d\_SIR\_eva + w3 \times SIR\_eva + w4 \times byte\_eva \quad (7)$$

In the above expression (7), w1, w2, w3 and w4 are weighting factors.

The resource allocation unit 94 executes the procedure in steps S31 to S38 for all of the users allocated to the buffers $12_1$ to $12_N$ and calculates the evaluation value eva for each user.

In addition, it goes to step S38 in which the resource allocation unit 94 seeks for the user having the maximum evaluation value eva and determines to allocate DSCH channel to the user. Also, the resource allocation unit 94 generates the user selection information indicating the buffer $12_n$ allocated to the user.

It is assumed that there is only one DSCH channel in this particular case. If there are, e.g., plural (L) DSCH channels, top L users in the evaluation value eva are determined for allocation of such L DSCH channels. However, even if there are L DSCH channels, it is possible to allocate all of the L DSCH channels to the user having the maximum evaluation value eve, thereby increasing the data transmission rate by L times. Alternatively, in an event that plural DSCH channels are available, it is possible to allocate one each of DSCH channel to some of the users while allocating plural DSCH channels to each of the remaining users.

After that, it goes to step S39 in which the resource allocation unit 94 renews the above mentioned variable last_t to the current time for the users (selected users) to which DSCH channel is determined to be allocated in the previous step S38.

It has to be noted that the resource allocation procedure is executed, e.g., at the frame rate in DSCH channel.

As described hereinabove, allocation of DSCH channel to users is determined based on the receiving quality difference, it is possible to allocate DSCH channel or channels to the mobile terminals within the cell or the service area of the base station 62 as fairly as possible and to maintain the throughput of the base station 62 as high level as possible.

In other words, in case of allocating DSCH channel based on the receiving quality difference, DSCH channel is allocated to a given mobile terminal 61 only when the receiving quality of the given mobile terminal 61 is larger than the averaged value. As a result, in this case, users locating near the base station 62 to have a relatively high averaged value in the receiving quality and users locating far from the base station 62 to have relatively low averaged value in the receiving quality are treated equally.

Furthermore, in case of paying attention to a certain user having relatively high receiving quality, since DSCH channel is allocated to such user when the latest receiving quality is larger than its averaged value, data transmission efficiency is largely improved. On the other hand, in case of paying attention to a certain user having relatively low averaged value in the receiving quality, DSCH channel is allocated to such user when the latest receiving quality is larger than its averaged value. In other words, DSCH channel is allocated to such user when the receiving quality is relatively good, thereby improving the transmission efficiency rather than being allocated when the most recent receiving quality is lower than its averaged value.

It has to be noted that in the embodiment in FIG. 21, since DSCH channel allocation is determined based on the evaluation value eva using not only the receiving quality difference but also the buffer storage amount, the waiting time and the latest receiving quality with respective weighting, it is possible to achieve DSCH channel allocation most suitable for various purposes (or applications) depending on the way of weighting.

In other words, in the case of emphasizing the throughput of the base station 62, for example, relatively large weighting factors are used for the receiving quality difference and the latest receiving quality but using relatively small weighting factors for the others. On the other hand, in case of emphasizing, e.g., fairness in service to all users in the cell or the service area of the base station 62, relatively large weighting factors are used for the receiving quality difference and the waiting time but using relatively small weighting factor for the others. Additionally, in case of emphasizing, e.g., overflow prevention of the buffers $12_n$, relatively large weighting factors are used for the receiving quality difference and the buffer storage amount but using relatively small weighting factors for the others.

In addition, it is also possible to use variable weighting factors for the receiving quality difference, the buffer storage amount, the waiting time and the latest receiving quality rather than fixed value. In this case, it is possible to optionally change the weighting factors by the operator of the base station 62 or automatically changing them depending on cases. In other words, in case of storing packet data of highly real-time nature in the buffers $12_n$, it is possible to use a large weighting factor for the buffer $12_n$ storage amount as long as such packet data is in existence.

It has to be noted that, although the highly accurate receiving quality calculated by the receiving quality judgment unit 85 is used as the receiving quality for the resource allocation procedure in the resource allocation unit 94 in the embodiment in FIG. 20, it is possible to use the receiving quality derived only from the receiving quality message in the resource allocation procedure.

Next, although the embodiment in FIG. 9 is described about the present invention applied to the communication system in which the mobile terminals transmit to the base station the receiving quality message indicating the receiving quality, it is possible to apply the present invention to a communication system in which, e.g., the mobile terminals transmit directly to the base station the mode request message for requesting a predetermined modulation coding mode.

Figure 22:
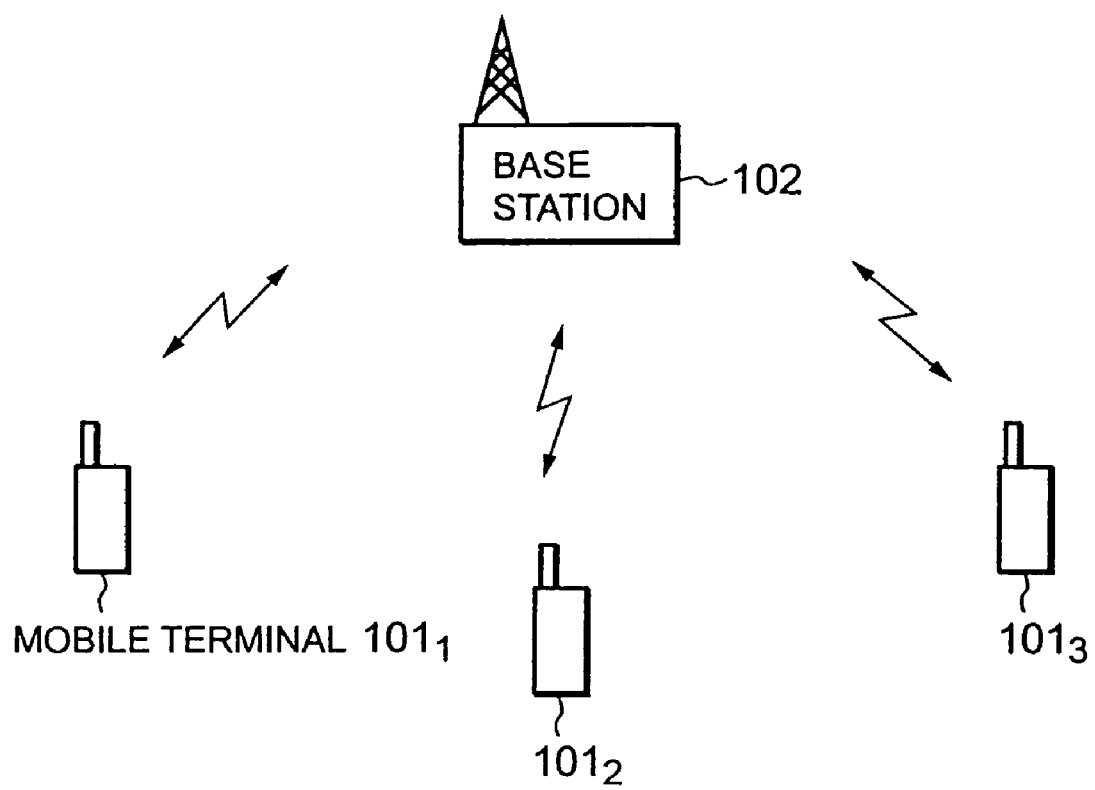
FIG. 22 is an illustration of the communication system for transmitting mode request messages from mobile terminals to base station.

In other words, FIG. 22 illustrates the construction of a communication system in which the mobile terminals transmit to the base station the mode request message for requesting the modulation coding mode instead of the receiving quality message.

Mobile terminal $101_1$ to $101_3$ are, e.g., cellular phones or other PDAs (Personal Digital Assistances) similar to the mobile terminal 1 in FIG. 1 or the mobile terminal 61 in FIG. 9 and communicate with base station 102 by the W-CDMA communication using the AMCS communication system.

Although 3 mobile terminal $101_1$ to $101_3$ are shown in FIG. 22 similar to the embodiments in FIG. 1 and FIG. 9, the number of mobile terminals are not limited.

It is to be noted that the mobile terminal $101_1$ to $101_3$ are referred to as the mobile terminal 101 hereinafter unless individual mobile terminals need to be distinguished from one another.

The base station 102 controls the mobile terminal 101 within the area (cell) covered by the base station 102 by the W-CDMA communication using the AMCS communication system. In other words, the base station 102 allocates communication bandwidth and other communication resources necessary for communication with the mobile terminal 101, thereby receiving, e.g., data from other mobile terminals (not shown) transmitted through another base station (not shown), Web page data from a WWW server of internet, mails from a mail server, etc. and transmits them to the mobile terminal 101. Alternatively, the base station 102 receives, e.g., data transmitted from the mobile terminal 101 for transmission to another base station or a predetermined network such as Internet or the like.

Figure 23:
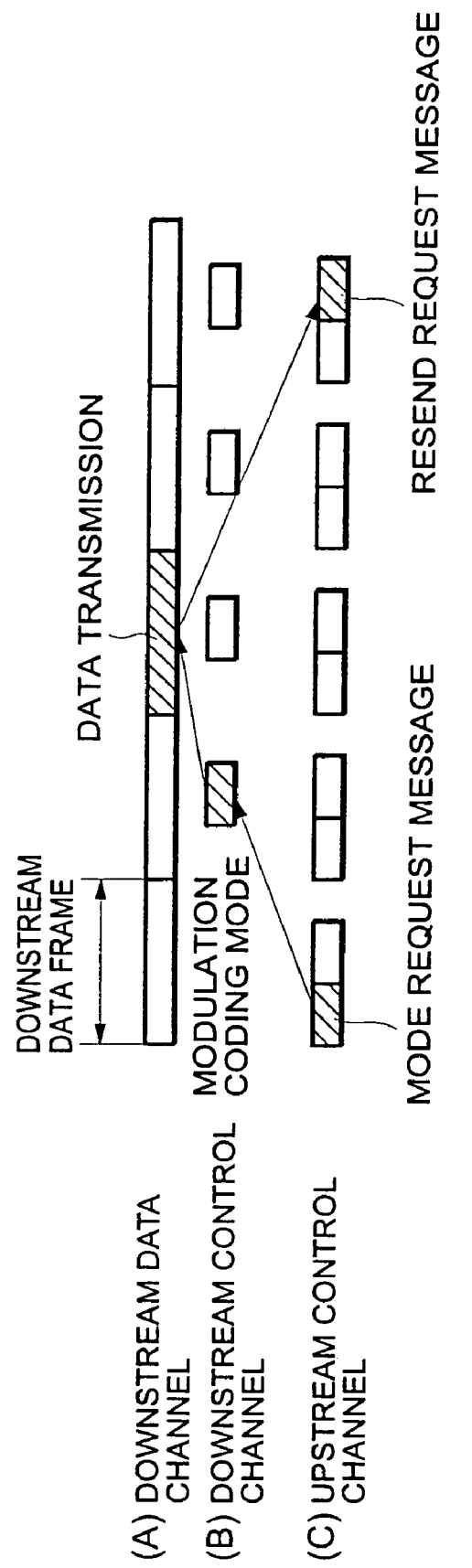
FIG. 23 is an illustration of data between mobile terminal 101 and base station 102.

The AMCS communication between the mobile terminal 101 and the base station 102 is performed in the manner as shown in FIG. 23.

In other words, the base station 102 performs adaptive modulation and coding on the mobile terminal 101, e.g., at a predetermined frame rate as illustrated in FIG. 23 (A) and transmits data through a certain downstream line (data channel). Since coding rate and multi-level modulation factor vary at frame rate in the AMCS communication system, the base station 102 transmits to the mobile terminal 101 the modulation coding mode as transmission parameters indicating the coding rate and the multi-level modulation factor for the immediately preceding frame through another downstream channel (control channel) coded by a fixed coding rate and multi-level modulation factor as illustrated in FIG. 23 (A) in the similar manner to FIG. 2 (B) which has been described hereinabove. By receiving the modulation coding mode as the transmission parameters, the mobile terminal 101 recognize the coding rate and the multi-level modulation factor for the next subsequent frame for demodulation and decoding the next subsequent frame transmitted from the base station 102.

Although the base station 102 notifies the modulation coding mode to the mobile terminal 101 in the above manner, in the base station 102 in the communication system in FIG. 22, setting (decision) of the modulation coding mode is made based on the mode request message transmitted from the mobile terminal 101.

In other words, the mobile terminal 101 obtain the receiving quality of the signal transmitted from the base station 102 and recognize the modulation coding mode suitable for the mobile terminal 101 based on the receiving quality, thereby generating a mode requesting message for requesting such modulation coding mode. And the mobile terminal 101 transmit to the base station 102 the mode request message through the upstream channel (control channel) as illustrated in FIG. 23 (C). The base station 102 sets the modulation coding mode (transmission mode) corresponding to the mode request message and transmits the modulation coding mode to the mobile terminal 101 as illustrated in FIG. 23 (B).

It has to be noted that the base station 102 sets the modulation coding mode for the mobile terminal 101 based on the mode request message from the mobile terminal 101 and the resources in the downstream data channel (FIG. 23 (A)).

In addition, as illustrated in FIG. 23 (A), the base station 102 performs adaptive modulation and coding of the coding rate and multi-level modification factor corresponding to the modulation coding mode set for the next subsequent frame before being transmitted to the mobile terminal 101.

On the other hand, the mobile terminal 101 receive the data included in the frame transmitted from the base station 102 through the data channel in the manner as described hereinabove. If the data from the base station 102 is normally received, the mobile terminal 101 transmit to the base station 102 a message for requesting the next data together with the necessary mode request message. On the other hand, if the data from the base station 102 could not be received normally, the mobile terminal 101 transmit a resend request message asking for resending the data to the base station 102 (FIG. 23 (C)).

It is to be noted that, in the embodiment as shown in FIG. 23, transmission of the mode request message (FIG. 23 (C)), transmission of the modulation coding mode set based on the mode request message (FIG. 23 (B)) and transmission of the data in the modulation coding mode (FIG. 23 (A)) are performed at the frame rate. However, it is possible to perform transmission of the mode request message (FIG. 23 (C)), transmission of the modulation coding mode (FIG. 23 (B)) and data transmission (FIG. 23 A)) at any other rate.

In addition, since the data format in the communication between the mobile terminal 101 and the base station 102 is the same as that in FIG. 10, no description is given herein.

Figure 24:
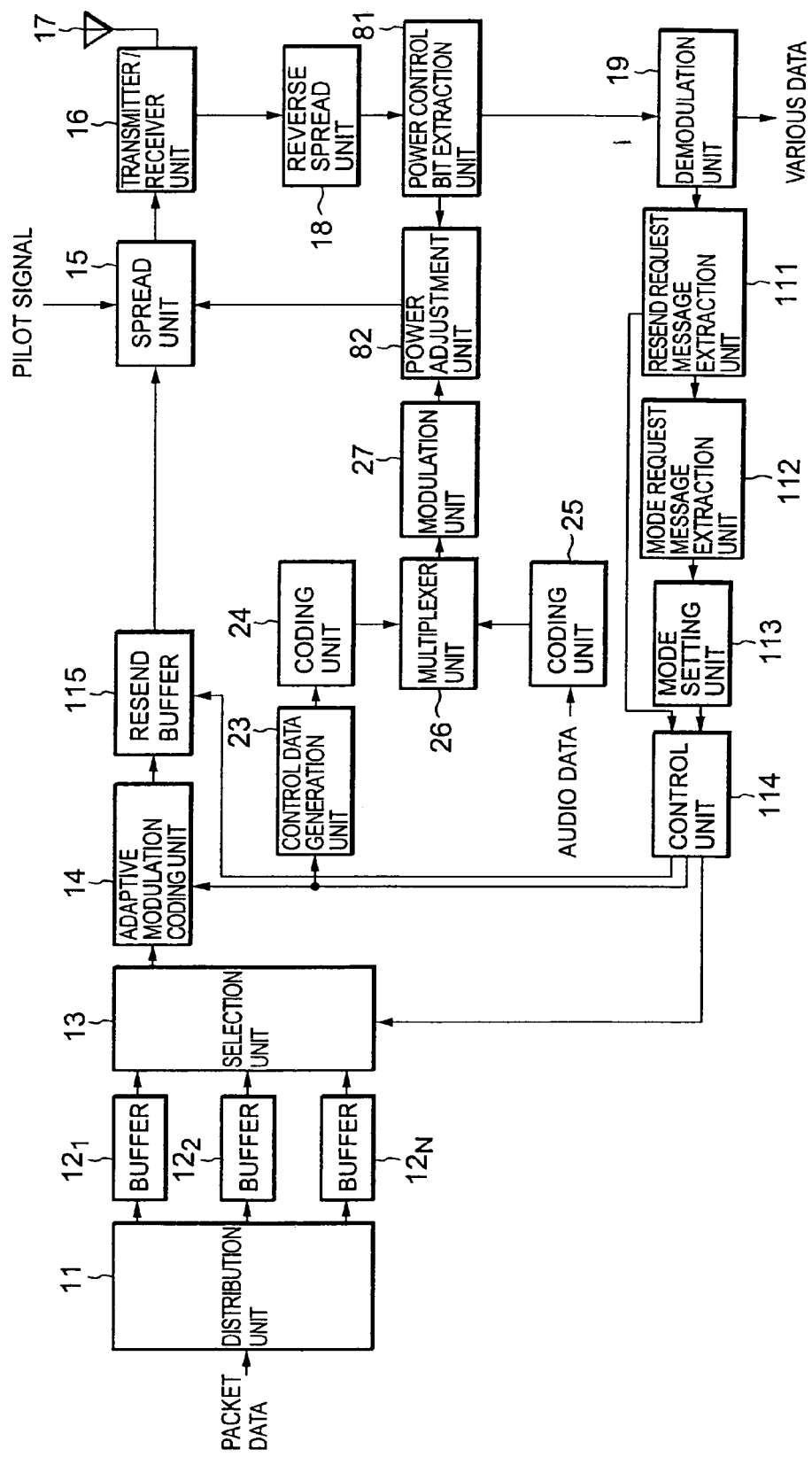
FIG. 24 is a block diagram of an example of base station 102.

Now, FIG. 24 is the construction of an example of the base station 102. Note that the units in FIG. 24 corresponding to those in either the base station 2 in FIG. 3 or the base station 62 in FIG. 14 have the same reference numerals and there descriptions may be omitted hereinafter.

Resend request message extraction unit 111 extracts any resend request message, which may be included in the signal from the demodulation unit 19 and supplies such message to control unit 114. Also, the resend request message extraction unit 111 supplies the signal from the demodulation unit 19 to mode request message extraction unit 112.

The mode request message extraction unit 112 extracts the mode request message in the signal supplied from the resend request message extraction unit 111 and supplies such message to mode setting unit 113.

It has to be noted that the resend request message and the mode request message are disposed, e.g., at the frame rate in the same manner as the above described receiving quality message and are disposed in the data section in DPDCH channel (FIG. 10 (A)). And they are designed to be transmitted from the mobile terminal 101 to the base station 102. As a result, the resend request message and the mode request message are extracted from the data disposed in PDCH channel in the resend request message extraction unit 111 and the mode request message extraction unit 112, respectively.

The mode setting unit 113 sets the modulation coding mode for the mobile terminal 101 based on the mode request message from the mode request message extraction unit 112 and the resources in the base station 102 and transmits such mode to the control unit 113.

In other words, if the resources are sufficient, for example, the mode setting unit 113 sets the modulation coding mode indicated by the mode request message from the mode request extraction unit 112. On the other hand, if the resources are insufficient, the mode setting unit 113 sets the modulation coding mode capable of setting within the available resource.

The control unit 114 supplies the modulation coding message set by the mode setting unit 113 to the adaptive modulation and coding unit 14 and the control data generation unit 23. In addition, the control unit 114 controls the selection unit 13 to select the buffer 12$_n$ storing the packet data to be transmitted in the modulation coding mode set by the mode setting unit 113, e.g., in the same manner as the control unit 22 in FIG. 3.

The packet data stored in the buffer 12$_n$ selected by the selection unit 13 is supplied to the adaptive modulation and coding unit 14 where the packet data from the selection unit 13 is adaptively modulated and coded in accordance with the modulation coding mode supplied from the control unit 114. And the resulting modulated signal is supplied to a resend buffer 115.

The resend buffer 115 temporarily stores the modulated signal supplied from the adaptive modulation and coding unit 14 and then supplies the modulated data to the spread unit 15. The subsequent procedure is the same as the case in the base station 62 in FIG. 14.

It has to be noted that, if the resend request message is received from the resend message extraction unit 111, the control unit 114 neglects the modulation coding mode from the mode setting unit 113. The control unit 114 controls the resend buffer 115 and resends to the spread unit 15 the modulated signal including the packet data that is requested to resend by the resend request message from the resend request message extraction unit 111. In this way, the packet data requested to resend by the resend request message is resent.

In addition, if the resend request message is received, the control unit 114 controls the control data generation unit 23 to include in the control data the same modulation coding mode as transmitted at the previous time and a resend flag indicating resend. In the above manner, if the resend request message for the data is received from the mobile terminal 101, the base station 102 sends the data in the same modulation coding mode as transmitted in the previous time.

It has to be noted that, the control unit 114 controls the adaptive modulation and coding unit 14 and stops sending the next packet data to the mobile terminal 101, e.g., until resending of the data requested to resend is completed.

Figure 25:
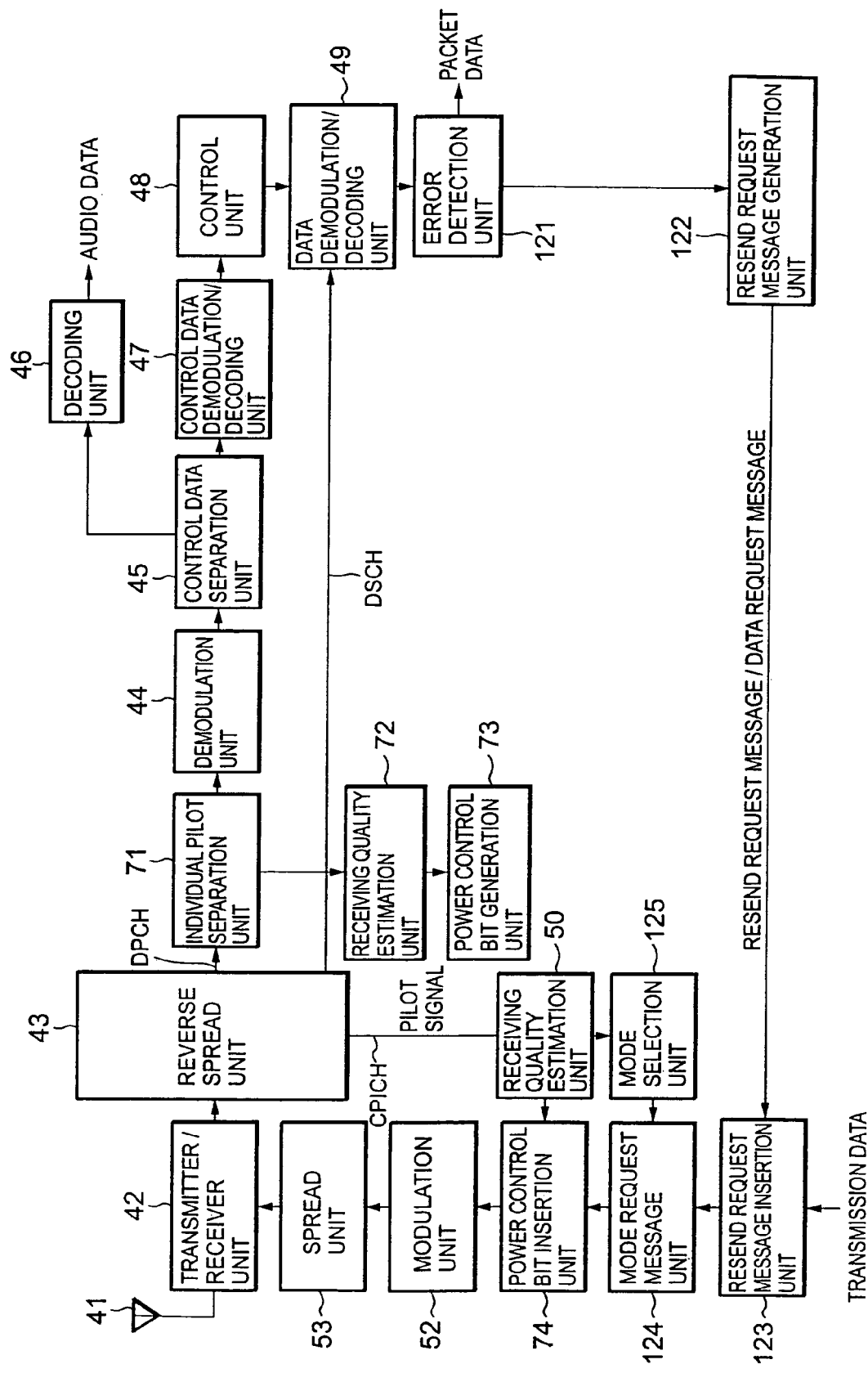
FIG. 25 is a block diagram of an example of mobile terminal 101.

Next, reference is made to FIG. 25 illustrating the construction of an example of the mobile terminal 101 in FIG. 22. It is to be noted in FIG. 25 that units corresponding to those in the mobile terminals 1 in FIG. 8 and the mobile terminals 61 in FIG. 11 have the same reference numerals and no descriptions may be given hereinafter.

In the embodiment in FIG. 25, the packet data from the data demodulation/decoding unit 49 is supplied to error detection unit 121.

The error detection unit 121 performs error detection by, e.g., CRC (Cyclic Redundancy Check) code on the data supplied from the data demodulation/decoding unit 49.

In other words, the CRC code is included in the packet data and the error detection unit 121 performs parity check of the packet data supplied from the data demodulation/decoding unit 49 using the CRC code for error detection. And the error detection unit 121 supplies the result of the error detection of the packet data to resend request message generation unit 122.

The resend request message generation unit 122 generates a data request message or a resend request message in accordance with the error detection result from the error detection unit 121 and such message is supplied to resend request message insertion unit 123.

In other words, if an error detection result indicating that an error is detected in the packet data is received, i.e., if the packet data is not normally received, the resend request message generation unit 122 generates the resend request message to request resending the packet data and such resend request message is supplied to the resend request message insertion unit 123. On the other hand, if the error detection result of not detecting any error in the packet data, i.e., if the packet data is normally received, the resend request message generation unit 122 generates the data request message for requesting transmission of the next packet data and such message is supplied to the resend request message insertion unit 123.

Here, a single bit flag may be used for example as the resend request message and the data request message. In this case, for example, the flag having the value 1 indicates the resend request message while the flag having the value 0 indicates the data request message.

In addition, the error detection unit 121 detects any error in the packet data at the frame rate. As a result, the resend request message generation unit 122 generates either resend request message or data request message at the frame rate.

Supplied to the resend request message insertion unit 123 are the resend request message or the data request message from the resend request message generation unit 122 and the transmission data.

The resend request message insertion unit 123 disposes the transmission data in the data section (FIG. 10 (A)) in DPDCH channel for outputting to the mode request message 124. Also, the resend request message or the data request message supplied from the resend request message generation unit 122 at the frame rate is disposed in predetermined location in the frame in DPDCH channel for outputting to the mode request message 124.

Supplied to the mode request message insertion unit 124 are the output from the resend request message insertion unit 123 and the mode request message from mode selection unit 125 to be described hereinafter, e.g., at the frame rate timing.

The mode request message insertion unit 124 disposes the mode request message supplied from the mode selection unit 125 at the frame rate in the data section (FIG. 10 (A)) in the corresponding frame in DPDCH channel supplied from the resend request message insertion unit 123 and performs necessary coding at the frame rate before being supplied to the power control bit insertion unit 74.

On the other hand, the mode selection unit 125 selects the modulation coding mode suitable for the mobile terminal 101 based on the output from the CPICH receiving quality estimation unit 50 and generates the mode request message for requesting data transmission in the modulation coding mode. And such message is supplied to the mode request message insertion unit 124.

In other words, the CPICH receiving quality estimation unit 50 calculates the receiving quality of the signal in DSCH channel $SIR_{DSCH}$ at the frame rate as described in the receiving quality estimation procedure in FIG. 12 and supplied to the mode selection unit 125.

The mode selection unit 125 selects one of the 3 modulation coding modes #0, #1 and #2 based on the receiving quality $SIR_{DSCH}$ supplied from the CPICH receiving quality estimation unit 50 to achieve, e.g., the error rate FER (Frame Error Rate) less than a predetermined value and good transmission efficiency.

Figure 26:
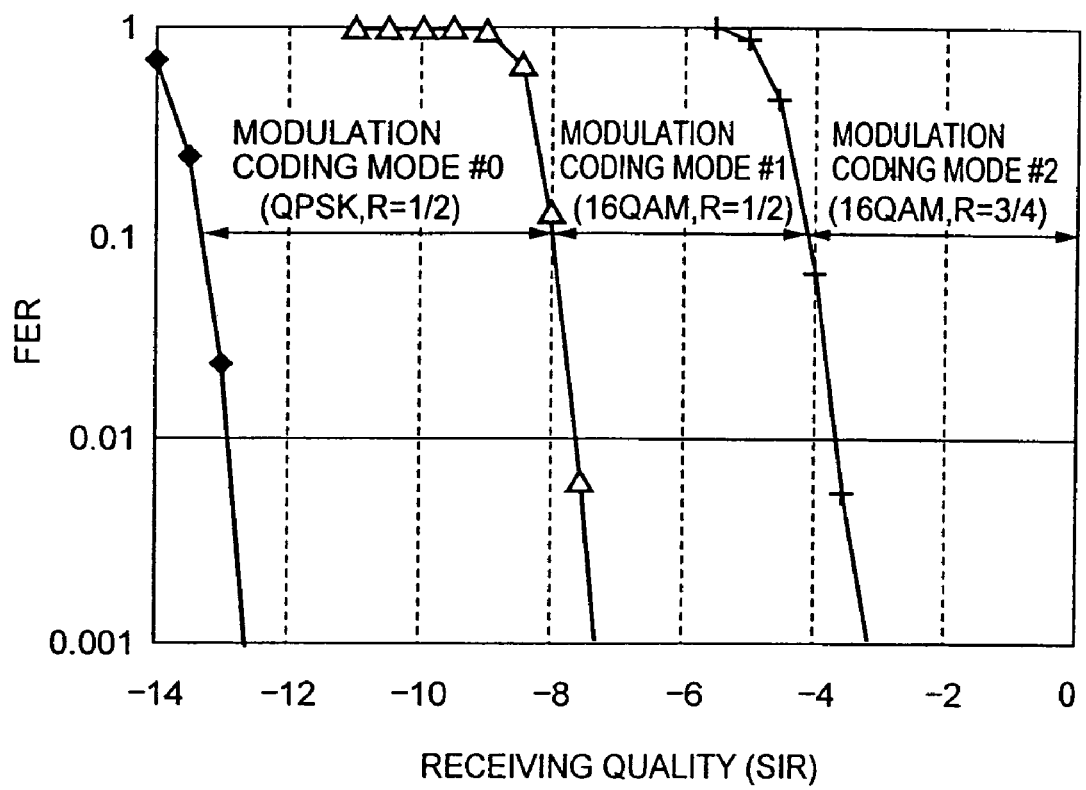
FIG. 26 is a graph showing the relationship between modulation coding modes and receiving quality error rate (FER).

More specifically, the mode selection unit 125 stores, e.g., the relationship between each of the modulation coding mode #0, #1 and #2 and the error rate as illustrated in FIG. 26 and selects one of the modulation coding modes, e.g., 10% or less error rate and good transmission efficiency based on the receiving quality $SIR_{DSCH}$ from the CPICH receiving quality estimation unit 50.

As a result, according to the embodiment in FIG. 26, the modulation coding mode #0 is selected, if the receiving quality SIRsdch is, e.g., −8 dB or less. The modulation coding mode #1 is selected, if the receiving quality $SIR_{DSCH}$ is, e.g., larger than −8 dB but less than −4 dB. And the modulation coding mode #2 is selected, if the receiving quality $SIR_{DSCH}$ is, e.g., equal to or greater than −4 dB.

As a matter of fact, as in the communication system in FIG. 22 described hereinabove, the communication system for transmitting the mode request message instead of the receiving quality message also encounters a certain delay like the communication system in FIG. 1 from the time of calculating the receiving quality $SIR_{DSCH}$ by the mobile terminal 101 until recognizing by the base station 102 the mode request message selected based on the receiving quality $SIR_{DSCH}$.

As a result, at the time when the base station 102 recognizes the mode request message from the mobile terminal 101 and starts sending the data by the modulation coding mode set based on the mode request message, there is a possibility where the receiving quality $SIR_{DSCH}$ in the mobile terminal 101 has largely changed and disabling to transmit data in the optimum demodulation coding mode, thereby degrading transmission efficiency.

Similar to the communication system in FIG. 1, this problem is specifically significant when the user of the mobile terminal 101 moves at a high speed in a train or the like, thereby rapidly changing the transmission path characteristic.

On the other hand, from the transmission efficiency point of view, it is preferable that the transmission interval of the mode request message by the mobile terminal 101 is long. However, in this case, the current receiving quality $SIR_{DSCH}$ in the mobile terminal 101 may differ largely from the receiving quality $SIR_{DSCH}$ when the modulation coding mode represented by the mode request message is selected. This prevents the transmission efficiency by the adaptive modulation and coding from being improved.

Figure 27:
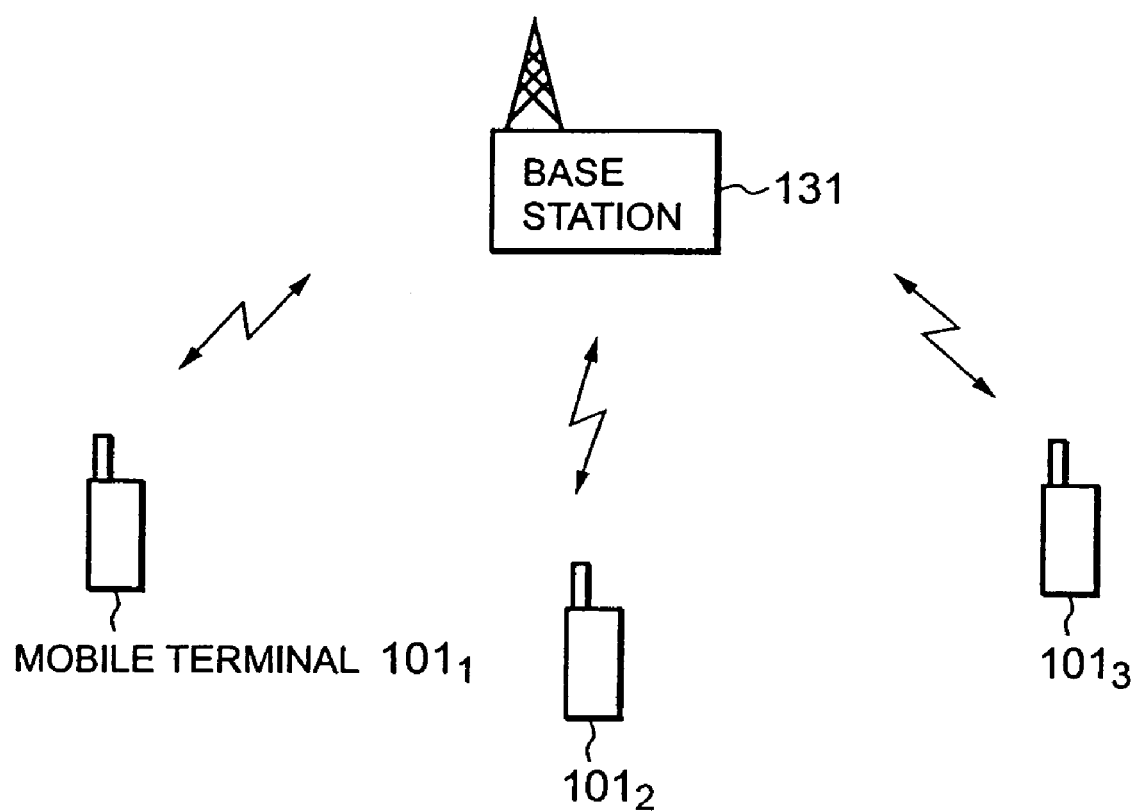
FIG. 27 is diagram illustrating another communication system to which the present invention is applied.

In view of that, illustrated in FIG. 27 is the construction of one embodiment of the communication system for preventing (reducing) the above mentioned degradation in transmission efficiency in the case where the mode request message is transmitted from the mobile terminals to the base station and the modulation coding mode is set in the base station based on the mode request message.

It has to be noted in the figure that sections corresponding to those in FIG. 22 have the same reference numerals and no descriptions may be given hereinafter. In other words, the communication system in FIG. 27 has basically the same construction as the system in FIG. 22 except provision of base station 131 instead of the base station 102.

Figure 28:
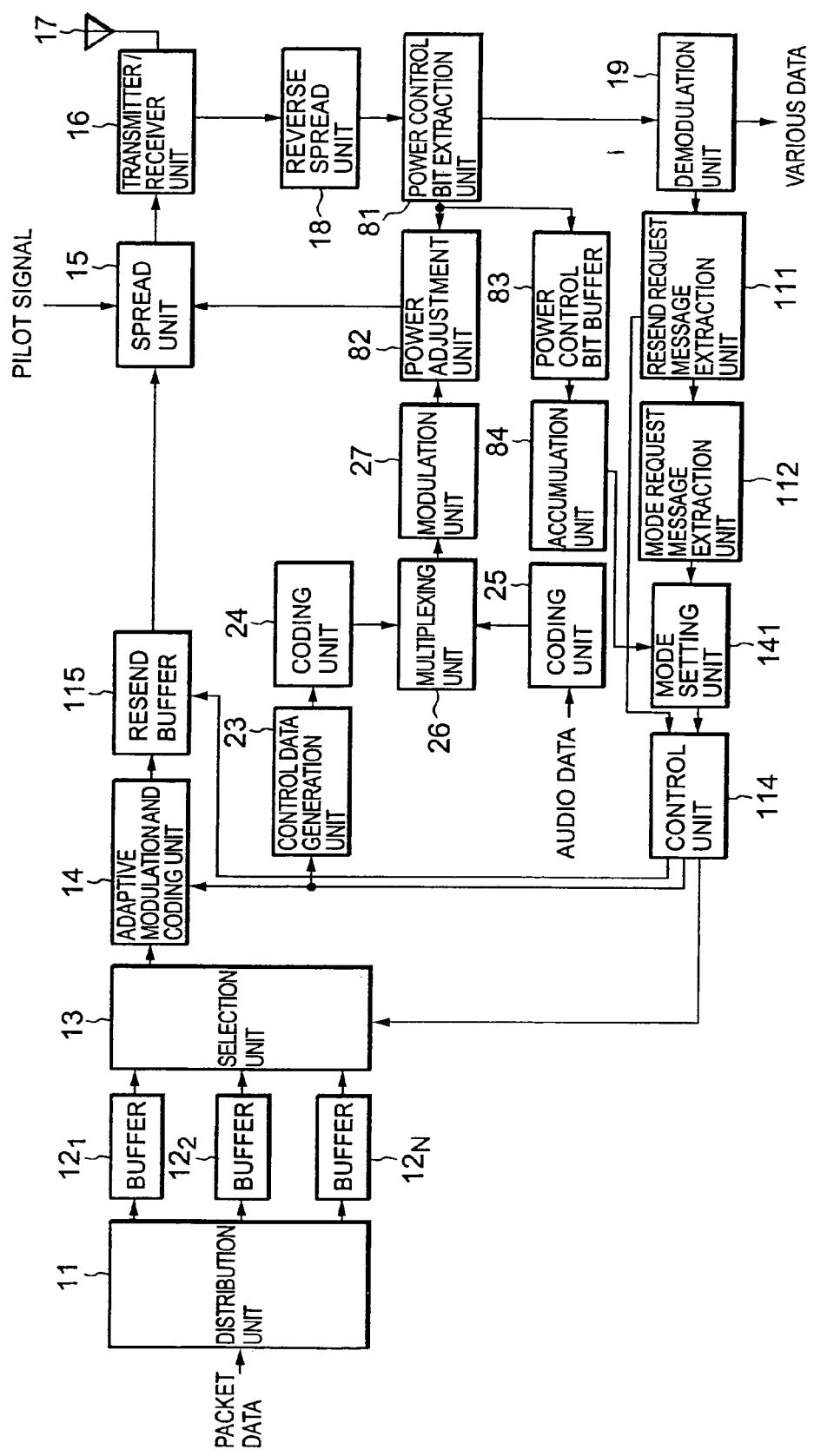
FIG. 28 is a block diagram of an example of base station 131.

Illustrated in FIG. 28 is the construction of an example of the base station 131 in FIG. 27. It is to be noted in FIG. 28 that the sections corresponding to those in the base station 62 in FIG. 14 or the base station 102 in FIG. 24 use the same reference numerals and their descriptions may be omitted hereinafter. In other words, the base station 131 is provided with mode setting unit 141 replacing the mode setting unit 113 in the base station 102 in FIG. 24. Additionally, the base station 131 is provided with the power control bit buffer 83 and the accumulation unit 84 in the base station 62 in FIG. 14 as compared to the base station 102 in FIG. 24.

In addition, in the embodiment in FIG. 28, supplied to the mode setting unit 141 are the mode request message from the mode request message extraction unit 112 and the accumulation value ΔSIR calculated in the accumulation unit 84 in accordance with the expression (3) using the power control information TPC stored in the power control bit buffer 83.

In addition, the mode setting unit 141 sets the modulation coding mode suitable for the current receiving quality $SIR_{DSCH}$ in the mobile terminal 101 based on both the mode request message supplied form the mode request message extraction unit 112 and the accumulation value ΔSIR of the power control information TPC supplied from the accumulation unit 84.

Figure 29:
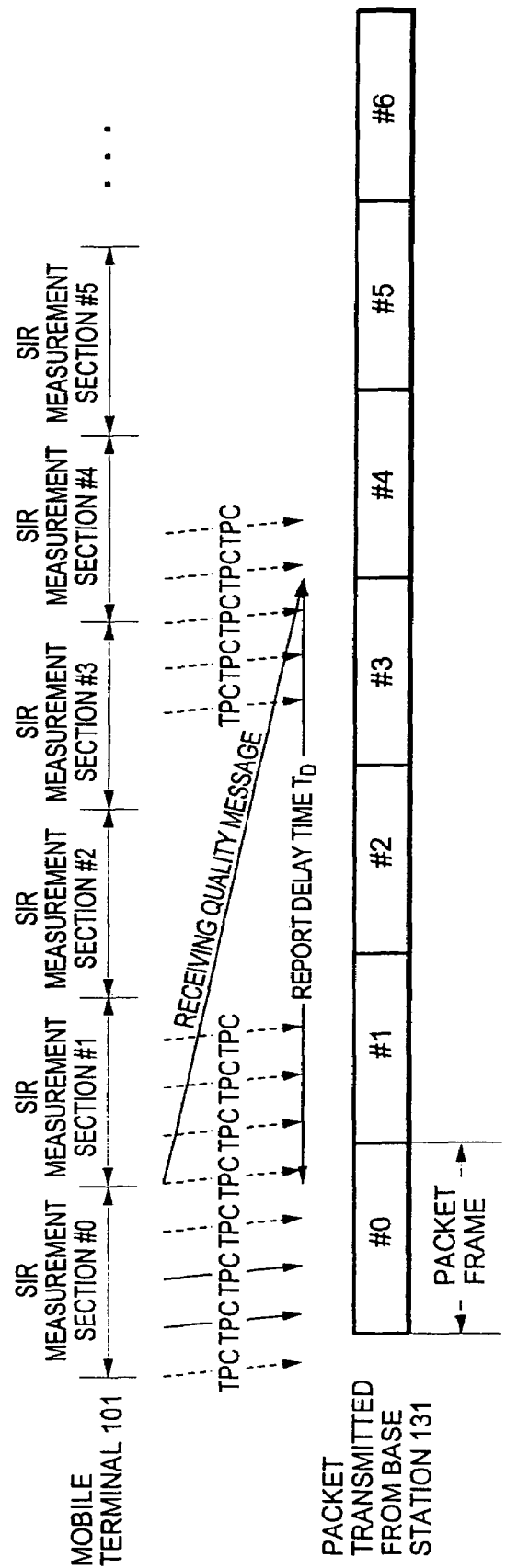
FIG. 29 is a chart describing the processing in mode setting unit 141.

In other words, in the mobile terminal 101, the common pilot signal in each SIR measurement section or 1 frame of CPICH channel (FIG. 10 (B)) for measurement of the receiving quality in DSCH channel is monitored to calculate the receiving quality in DSCH channel $SIR_{DSCH}$ in accordance with the expression (2) as illustrated in FIG. 29. And the modulation coding mode suitable for the receiving quality $SIR_{DSCH}$ is selected as described hereinabove by reference to FIG. 26. The mode request message indicating the selected modulation coding mode is, then, disposed in the data unit in DPDCH channel (FIG. 10 (A)) in the mobile terminal 101 and is transmitted at the frame rate. However, since the mode request message is coded, it must be decoded and such decoding cannot be carried out until after complete receiving of the frame in which the mode request message is disposed.

For the above reason, the modulation coding mode represented by the mode request message transmitted from the mobile terminal 101 is set in the base station 131 and the adaptive modulation and coding is performed in the modulation coding mode. As illustrated in FIG. 29, the adaptive modulation and coding will be performed in the selected modulation coding mode based on the receiving quality $SIR_{DSCH}$ in the base station 131 at considerably delayed timing from the time when the receiving quality in DSCH channel $SIR_{DSCH}$ is measured in the mobile terminal 101.

It has to be noted that in FIG. 29, similar to the case in FIG. 15, the adaptive modulation and coding in the selected modulation coding mode based on the receiving quality $SIR_{DSCH}$ is performed in the base station 131 after the delay time corresponding to 4 frames with respect to the time of measurement of the receiving quality in DSCH channel in the mobile terminal 101. In other words, FIG. 29 illustrates that the modulation coding mode indicated by the current mode request message to be used for setting the modulation coding mode for an interested frame of the DSCH channel frames which is going to perform the adaptive modulation and coding is selected past the delay time corresponding to 4 frames in the mobile terminal 101.

Here, the time difference between the timing of the interested frame and the time when the receiving quality $SIR_{DSCH}$ is calculated in the mobile terminal 101 to be used for generating the mode request message for setting the modulation coding mode for the interested frame is referred to as the report delay time Td hereinafter.

As for the base station 131, if the modulation coding mode indicated by the mode request message is set for the interested frame without considering the report delay time, the adaptive modulation and coding for the interested frame will be performed on the modulation coding mode selected based on the receiving quality $SIR_{DSCH}$ calculated in the mobile terminal 101 after passing the report delay time $T_D$. If the receiving quality $SIR_{DSCH}$ in the mobile terminal 101 has changed in the report delay time $T_D$, the adaptive modulation and coding for the interested frame cannot be made properly, thereby degrading the transmission efficiency.

In view of this situation, the mode setting unit 141 sets the modulation coding mode for the interested frame using not only the mode request message but also the power control information TPC for transmission power control of DPCH channel.

In other words, as described hereinabove, the power control information TPC is transmitted from the mobile terminal 101 in the slot rate, i.e., at a shorter interval than the transmission period for the mode request message (according to the data format as illustrated in FIG. 10, ⅕ or ¹⁄₁₅ of the transmission period for the mode request message). Additionally, since the power control information TPC is transmitted without being coded, the power control information TPC disposed in the slots can be acquired immediately upon receiving the slots. Furthermore, since the power control information TPC is used to request transmission power adjustment for maintaining the receiving quality in DPCH channel in the mobile terminal 101, the value indicates if the receiving quality in DSCH channel is improved or degraded as compared to the last receiving quality. Although DPCH channel and DSCH channel are different channels, they are spectrum spread in the same frequency bandwidth and transmitted simultaneously. There is basically no problem in considering the change of the receiving quality in DPCH channel as the change of the receiving quality in DSCH channel.

In view of this situation, the mode setting unit 141 executes the mode setting procedure for setting the modulation coding mode for the interested frame based on the mode request message in addition to the accumulation value of the power control information TPC received in the time interval from the interested frame on which the modulation coding mode is going to set to the past corresponding to the report delay time Td.

Figure 30:
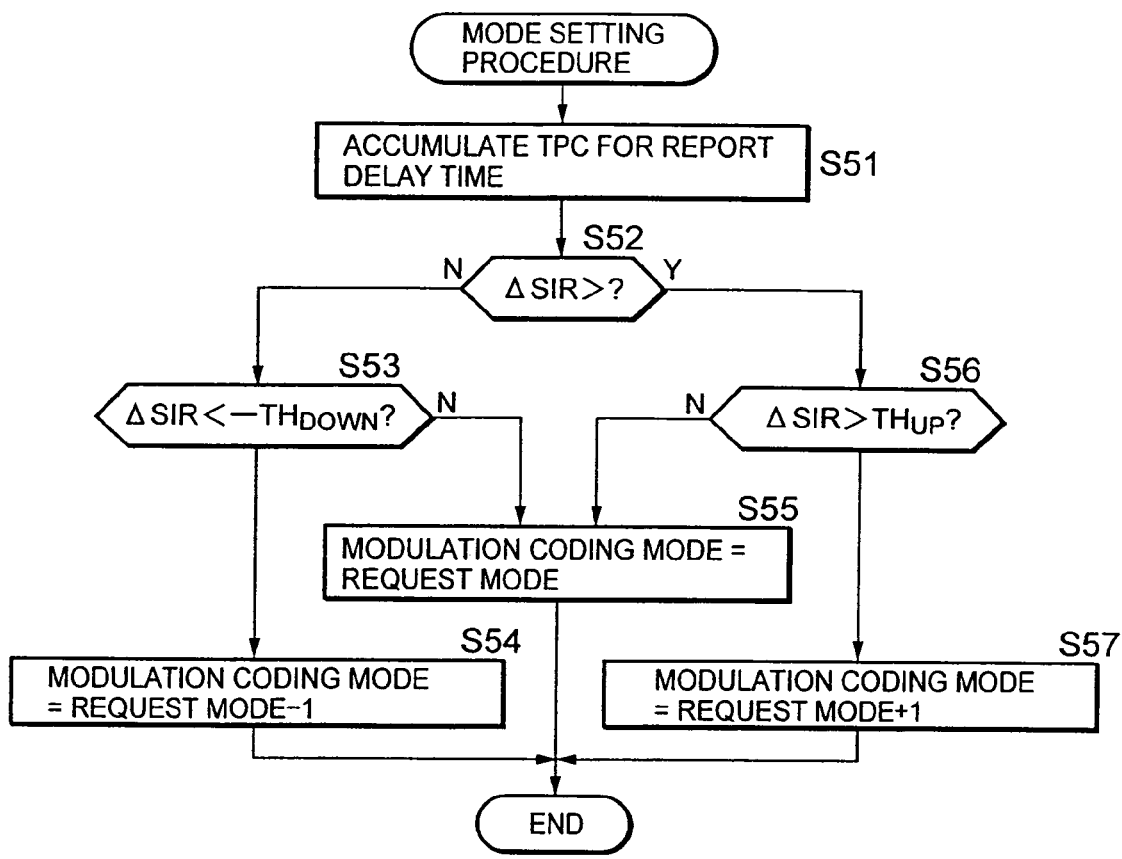
FIG. 30 is a flowchart describing mode setting processing in mode setting unit 141.

In other words, illustrated in FIG. 30 is a flowchart for describing the mode setting procedure executed by the mode setting unit 141.

In first step S51, the mode setting unit 141 controls the accumulation unit 84 to calculate the accumulation value of the power control information TPC received in the time from the interested frame to the past corresponding to the report delay time $T_D$ for the latest mode request message In this manner, the accumulation unit 84 calculates the accumulation value $\Delta SIR$ [dB] using the power control information TPC stored in the power control buffer 83 in accordance with the expression (3).

In addition, in step S52, the mode setting unit 141 judges whether the accumulation value $\Delta SIR$ is positive or not.

It goes to step S53 if the accumulation value $\Delta SIR$ is determined not positive in step S52, i.e., if the quality of the transmission path between the mobile terminal 101 and the base station 131 is degraded from the time retroactive to the report delay time Td corresponding to the latest mode request message. In other words, the current receiving quality $SIR_{DSCH}'$ in the mobile terminal 101 is degraded from the receiving quality at the time retroactive to the report delay time $T_D$ corresponding to the current mode request message (referred to as report receiving quality hereinafter), i.e., degraded from the receiving quality $SIR_{DSCH}$ as used for generating the latest mode request message in the mobile terminal 101. In step S53, the mode setting unit 141 judges whether or not the accumulation value $\Delta SIR$ is less than a predetermined negative threshold value $-TH_{down}$ ($TH_{down}>0$).

As for step S53, if the accumulation value $\Delta SIR$ is determined to be less than the negative threshold value $-TH_{down}$, i.e., the current receiving quality $SIR_{DSCH}'$ in the mobile terminal 101 is largely degraded as compared to the report receiving quality $SIR_{DSCH}$, it goes to step S54. In step S54, the mode setting unit 141 corrects the modulation coding mode indicated by the latest mode request message (referred to as request mode hereinafter) from # i to # i−1. And the corrected modulation coding mode # i−1 sets as the final modulation coding mode for the interested frame before completing the procedure.

In other words, if the current receiving quality $SIR_{DSCH}'$ in the mobile terminal is largely degrades as compared to the report receiving quality $SIR_{DSCH}$, transmission o the interested frame in the request mode #1 may increase the number of resend due to increased error rate FER, thereby degrading the transmission efficiency. In order to avoid this problem, the mode setting unit 141 sets to the modulation coding mode # i−1 which is lower in data rate but higher in resistance to noise than the request mode # i. As a result, degradation in transmission efficiency due to increased error rate FER and resend number will be avoided.

In addition, in step S53, if it is determined that the accumulation value $\Delta SIR$ is not less than a predetermined negative threshold value $-TH_{down}$, i.e., the current receiving quality $SIR_{DSCH}'$ in the mobile terminal 101 is degraded as compared to the report receiving quality $SIR_{DSCH}$ but the degradation is not significant, it goes to step S55 in which the mode setting unit 141 sets the request mode # i as the final modulation coding mode for the interested frame before completing the procedure.

In other words, if the current receiving quality $SIR_{DSCH}'$ in the mobile terminal 101 is not largely degraded as compared to the report receiving quality $SIR_{DSCH}$, there is no large influence in terms of error rate even if the interested frame is transmitted in the request mode # i. So the mode setting unit 141 sets the request mode # i as the modulation coding mode for the interested frame.

On the other hand, it goes to step S56 if the accumulation value ΔSIR is determined to be positive in step S52, i.e., quality of the transmission path between the mobile terminal 101 and the base station 131 is degraded from the time retroactive to the report delay time $T_D$ corresponding to the latest mode request message, thereby improving the current receiving quality $SIR_{DSCH}'$ in the mobile terminal 101 as compared to the report receiving quality $SIR_{DSCH}$. In step S56, the mode setting unit 141 makes judgment if the accumulation value ΔSIR is larger than a predetermined positive threshold value $TH_{up}$ ($TH_{up}>0$).

As for step S56, if the accumulation value ΔSIR is determined not larger than a predetermined positive threshold value $TH_{up}$, i.e., the current receiving quality $SIR_{DSCH}'$ in the mobile terminal 101 is improved as compared to the report receiving quality $SIR_{DSCH}$ but the improvement is not significant, it goes to step S55 in which the mode setting unit 141 sets the request mode # i as the final modulation coding mode for the interested frame and the procedure is completed.

In other words, this means that if the current receiving quality $SIR_{DSCH}'$ in the mobile terminal 101 is not largely improved as compared to the report receiving quality $SIR_{DSCH}$, transmission of the interested frame in the request mode # i does not significantly affect the error rate and thus the mode setting unit 141 sets the request mode # i as the modulation coding mode for the interested frame without any change.

In addition, if the accumulation value ΔSIR is determined to be larger than the predetermined positive threshold value $TH_{up}$, i.e., the current receiving quality $SIR_{DSCH}'$ is significantly improved as compared to the report receiving quality $SIR_{DSCH}$ in step S56, it goes to step S57. In step S57, the mode setting unit 141 corrects the request mode # i to # i+1 and the corrected modulation coding mode # i+1 is finally sets as the modulation coding mode for the interested frame and the procedure is completed.

In other words, if the current receiving quality $SIR_{DSCH}'$ in the mobile terminal 101 is significantly improved as compared to the report receiving quality $SIR_{DSCH}$, data transmission of the interested frame in the modulation coding mode having a higher data rate but lower resistance to noise than the request mode # i may be able to suppress the error rate FER to a certain low rate. So the mode setting unit 141 sets to the modulation coding mode # i+1 having lower resistance to noise but higher data rate than the request mode # i, thereby improving the data rate and thus transmission efficiency while suppressing the error rate FER.

It is to be noted that the mode setting procedure in FIG. 30 is executed for each frame to be adaptively modulated and coded in the adaptive modulation and coding unit 14.

In addition, since only 3 modulation coding modes #0, #1 and #2 are available in the above embodiment, if the request mode is #0 in FIG. 30, the modulation coding mode in step S54 remains in the request mode #0. Similarly, if the request mode is #2, the modulation coding mode in step S57 remains in the request mode #2.

As described hereinabove, correction of the modulation coding mode (request mode) represented by the mode request message available at the frame rate is made in the mode setting unit 141 based on the power control information TPC that is available at the shorter slot rate for setting the final modulation coding mode. This ensures that the interested frame is adaptively modulated and coded in the manner better suited for the current receiving quality in the mobile terminal 101, thereby preventing degradation in transmission efficiency or improving transmission efficiency.

It has to be noted that, although only 3 modulation coding modes #0, #1 and #2 are used in the above embodiment, it is possible to use 2 or more than 3 modulation coding modes.

In addition, although the correction is made in the embodiment in FIG. 30 to change the modulation coding mode by only 1 mode, it is possible to change the request mode by 2 modes or more.

Here, although the mode request message is transmitted in the mobile terminal 101 at the frame rate in the above case, it is possible to transmit the mode request message, e.g., at an interval of predetermined number of frames similar to the receiving quality message in FIG. 7. For example, if the resources in the upstream line from the mobile terminal 101 to the base station 102 are short, it is possible to decrease the transmission frequency of the mode request message from the mobile terminal 101.

Figure 31:
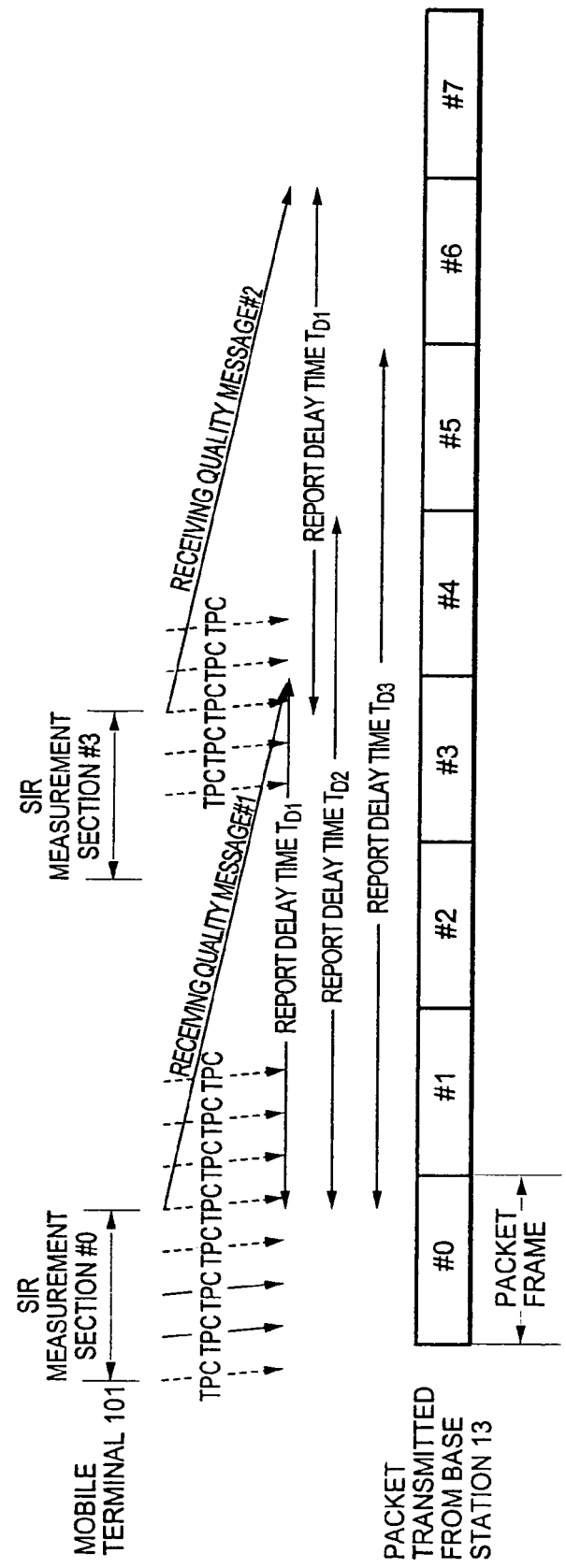
FIG. 31 is a chart describing the time interval of accumulating power control information in accumulation unit 84.

Now, illustrated in FIG. 31 is the way of transmitting the mode request message from mobile terminal 101 in the interval of 3 frames.

In case of transmitting the mode request message at the interval of several frames, the report delay time varies depending on the interested frames. It is necessary to modify the accumulation interval of the power control information TPC taking this into consideration.

In other words, as illustrated in FIG. 31, if the mode request message is transmitted, e.g., at every 3rd frame, the time when the next mode request message #2 is received in the base station 131 after receiving a certain mode request message #1 is after 3 frames. As a result, what is transmitted immediately after the timing of receiving the mode request message #1 is a fourth frame as illustrated in FIG. 31. And the timing to receive the mode request message #2 is 3 frames later than the 4th frame, or immediately before transmitting the 7th frame.

As apparent from the above, it is necessary to set the modulation coding mode for the mobile terminal 101 using the mode request message #1 for the time from the 4th frame and immediately before the 7th frame, or 3 frames up to the 6th frame.

In this case, the report delay time $T_{D1}$ for the 4th frame is equal to the report delay time $T_D$. However, the report delay time $T_{D2}$ for the 5th frame and the report delay time for the 6th frame $T_{D3}$ are not equal to the report delay time $T_D$. In other words, the report delay time $T_{D2}$ for the 5th frame is equal to the report delay time $T_D$ plus 1 frame time. And the report delay time for the 6th frame is equal to the report delay time $T_D$ plus 2 frame times.

As a result, in case of transmitting the mode request message at the interval of several frames, it is necessary to accumulate the power control information TPC in the accumulation unit 84 by varying the report delay time depending on interested frames. It is to be noted that the interested frames can be recognized by their packet frame numbers added to the frames.

As described hereinabove, in case of changing the transmission frequency of the mode request message from the mobile terminal 101 depending on the resources in the upstream line, the frequency of occurrence of shortage of resources in the upstream line can be reduced, thereby suppressing interference to other users. Furthermore, even if the frequency of transmitting the mode request message may be reduce, degradation in transmission efficiency can be prevented because the modulation coding mode for the interested frames is determined by the modulation coding mode (request mode) represented by the mode request message from the mobile terminal 101 corrected based on the accumulation value of the power control information TPC received in the report delay time for each interested frame.

It is to be noted that the transmission rate of the mode request message from the mobile terminal 101 can be variable rather than fixed.

In addition, in the case of the hand-off condition or soft hand-off condition when the mobile terminal 101 is communicating not only with the base station 102 but also other base stations, changes in the receiving quality in DSCH channel indicated by the power control information TPC cannot be considered as changes in the receiving quality in DSCH channel. So the transmission efficiency may be degraded if the request mode is corrected based on the power control information TPC.

In view of that, if the mobile terminal 101 is under the soft hand-off condition, it is preferable to suppress the correction of the request mode based on the power control information. It is to be noted that suppression of the request mode based on the power control information may be easily realized by, e.g., not referring to the accumulation value of the power control information TPC by the accumulation unit in the mode setting unit 141 or increasing the absolute value of the threshold value $-TH_{down}$ and $TH_{up}$ in the embodiment in FIG. 30.

It has to be noted that, since correction of the request mode may be inhibited in the base station 131 as described hereinabove under the soft hand-off condition, it is preferable that the mobile terminal 101 transmits the mode request message to the base station 131 as frequently (in shorter interval) as the resources permit in the mobile terminal 101.

In other words, under the soft hand-off condition, since correction of the request mode by the power control information is made in the mode setting unit 141 in the base station 131, i.e., the correction of the modulation coding mode corresponding to the change in the receiving quality during the report delay time is suppressed, it is possible that the current receiving quality of the mobile terminal 101 is largely changed from the receiving quality of the mobile terminal 101 used for generation of the mode request message referenced in the mode setting unit 141 in the base station 131. In addition, if adaptive modulation and coding is performed in such modulation coding mode may degrade the transmission efficiency.

In view of that, in the case of suppressing the correction of the request mode based on the power control information, it is preferable that the mobile terminal 101 transmits the mode request message to the base station 131 as frequently as possible, i.e., transmitting the mode request message in such a manner as to make the report delay time as shorter as possible and the base station 131 sets the modulation coding mode based on such mode request message.

It is to be noted that setting of the modulation coding mode by the mode setting unit 141 is performed by taking the available resources into consideration as is the case in the mode setting unit 113 in FIG. 23.

Now, descriptions on the hand-off will be given hereunder.

Although only mobile terminals 1 and the base station 2 are shown in the communication system in FIG. 1 (as well as the communication systems in FIG. 9, FIG. 22 and FIG. 27), there is a base station controlling station for managing and controlling the base station in an actual communication system.

Figure 32:
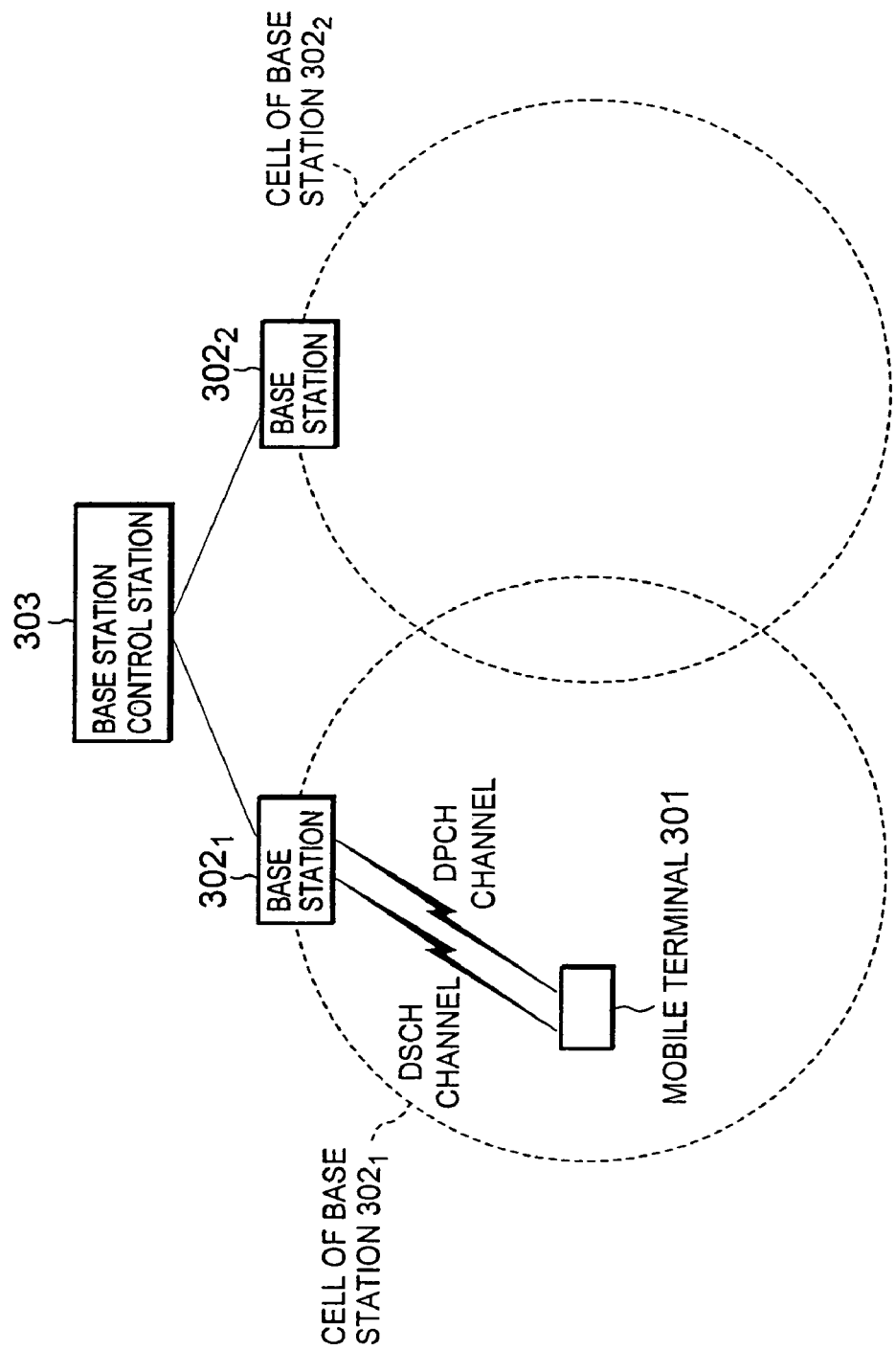
FIG. 32 is a diagram for describing soft hand-off condition.

FIG. 32 illustrates an example of a communication system including such base station controlling station.

Mobile terminal 301 has, e.g., the same construction as the mobile terminal 1 in FIG. 8 and communicates with base stations 302-1, 302-2 and receives data transmitted therefrom through DSCH channel (packet channel) and DPCH channel (individual channel).

It is to be noted that the mobile terminal 301 may have the same construction as the mobile terminal 61 in FIG. 8 or the mobile terminal 101 in FIG. 25 as well as the mobile terminal 1 in FIG. 8.

The base stations $302_1$ and $302_2$ may have the same construction as, e.g. the base station 2 in FIG. 3 and has a service area (cell) for providing services to the mobile terminals in the area with a predetermined strength of radio wave. In other words, the base stations can communicate with the mobile terminal 101 in their service areas.

It is to be noted that the base stations $302_1$ and $302_2$ may have the same construction as the base station 2 in FIG. 3 or the base station 62, 102 or 131 as illustrated in FIG. 14, FIG. 24 or FIG. 28, respectively.

It has to be noted that, in FIG. 32 (as well as FIG. 33~FIG. 38 which will be described hereinafter), the cells to which the base stations $302_1$ and $302_2$ provide services are shown by dotted lines.

The base station controlling station 303 communicates, e.g., over communication lines with the base stations $302_1$, $302_2$ and other base stations (not shown), thereby controlling the base stations $302_1$, $302_2$ and controls the mobile terminal 301 by way of the base stations $302_1$, $302_2$.

In the embodiment as illustrated in FIG. 32, the mobile terminal 301 is in the cell of only the base station $302_1$, thereby receiving communication services such as receiving data transmitted from the base station $302_1$ through DSCH channel and DSCH channel.

The base station controlling station 303 communicates with the base stations $302_1$ and $302_2$ to recognize the mobile terminals to which the base stations $302_1$ and $302_2$ provide services. As a result, the base station controlling station 303 in the embodiment in FIG. 32 recognizes the mobile terminal 301 to which the base station $302_1$ provides communication services.

Figure 33:
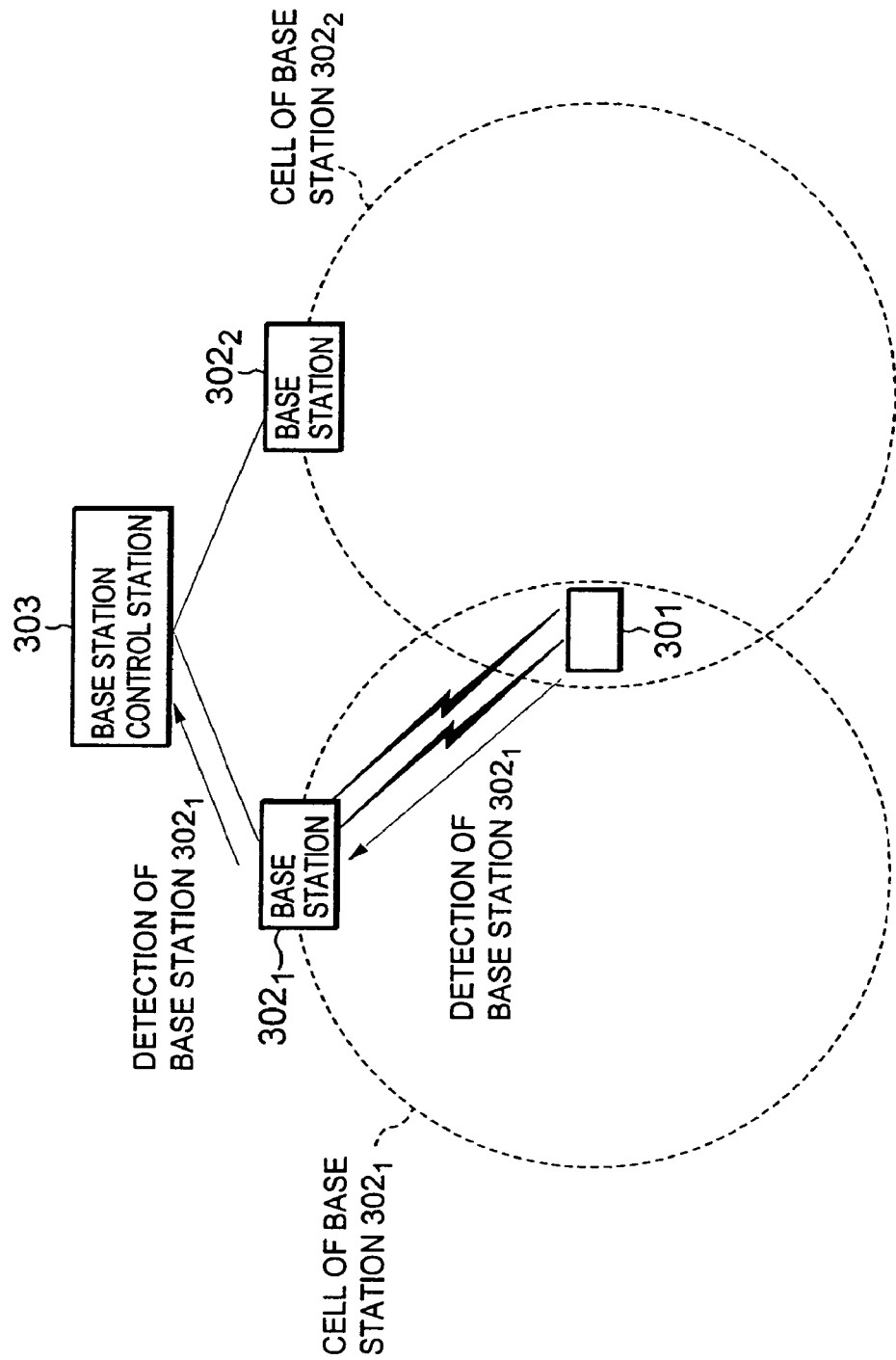
FIG. 33 is a diagram for describing soft hand-off condition.

Later, the user of the mobile terminal 301 is assumed to move to the location where the cells of the base stations $302_1$ and $302_2$ overlap as illustrated in FIG. 33. In this condition, the mobile terminal 301 can receive the radio waves not only from the base station $302_1$ but also from the base station $302_2$ with a level higher than a predetermined signal level. The mobile terminal 301 transmits a message including that the radio wave from the base station $302_2$ is received together with the signal strength of the radio wave to the base station $302_1$ from which the communication services are currently receiving. In this case, the base station $302_1$ transfers the message from the mobile terminal 301 to the base station controlling station 303.

The base station controlling station 303 makes a judgment of the need for the hand-off, i.e., switching the communication services to the mobile terminal 301 (from the base station $302_1$ to $302_2$ in this case) based on the signal strength from the base station $302_2$ to the mobile terminal 301 included in the message transferred to the base station $302_1$.

If the base station controlling station 303 made a judgment that the hand-off is not needed, i.e., the radio wave from the base station $302_2$ is less than a predetermined signal strength in the mobile terminal 301, the base station controlling station 303 instructs to the base station $302_1$ to continue the communication services.

Figure 34:
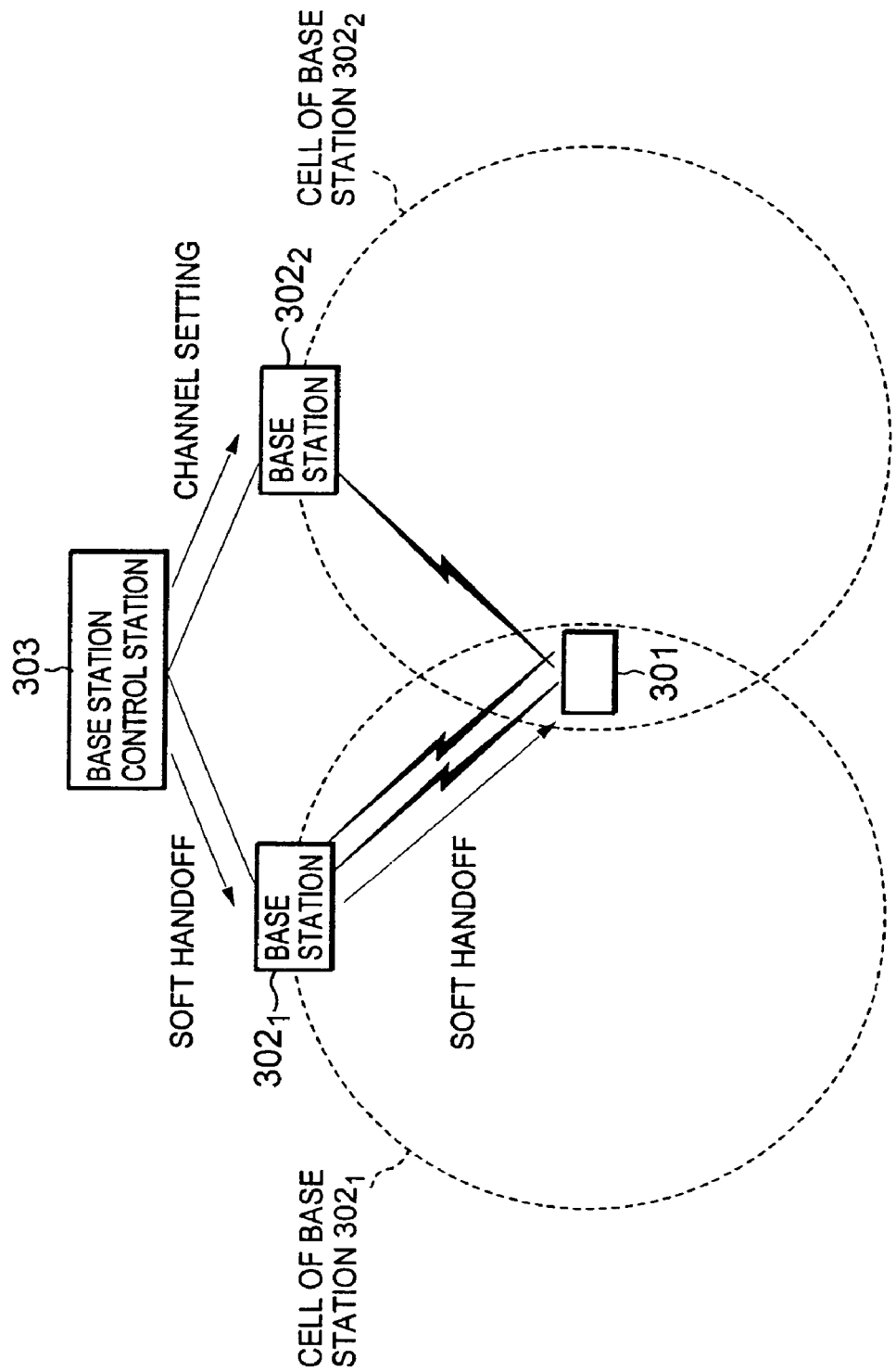
FIG. 34 is a diagram for describing soft hand-off condition.

On the other hand, if the base station controlling station 303 made a judgment of the need for the hand-off, e.g., the radio wave from the base station $302_2$ at the mobile terminal 301 is larger than a predetermined threshold value, the base station controlling station 303 instructs the base station $302_2$ to be switched setting of various parameters in DPCH channel as illustrated in FIG. 34. Then, the base station $302_2$ performs parameter setting in DPCH channel based on the instruction of the base station controlling station 303, thereby making the base station 302₂ capable of providing the communication services to the mobile terminal 301.

The DPCH channel parameters include, e.g., a frame (timing) to be used for providing communication services to the mobile terminal 301 and a spread factor in the spread spectrum. In this case, the base station controlling station 303 controls the base station 302₂ in the same parameter setting as the hand-off source base station 302₁. This is to achieve the soft hand-off in the mobile terminal 301 by combining DPCH channel from the base station 302₁ and DPCH channel from the base station 302₂ (RAKE receiving).

Thereafter, the base station controlling station 303 transmits to the mobile terminal 301 a message to instruct hand-off through the hand-off source base station 302₁ as illustrated in FIG. 34. Upon receiving the message from the base station controlling station 303 through the base station 302₁, the mobile terminal 301 is under the soft hand-off condition. As for DPCH channel, both DPCH channel from the base station 302₁ and DPCH channel from the base station 302₂ are received and combined for the RAKE receiving.

Although DPCH channel is the subject of soft hand-off herein, it is possible to make DSCH channel as the subject of soft hand-off.

It is to be noted that the base station controlling station 303 is also controlling the report frequency of the receiving quality message by the mobile terminal 301 (report interval) (the frequency of transmitting the receiving quality message from the mobile terminal 301 to the base station for providing the communication services to the mobile terminal 301). Such control is made onto the mobile terminal 301 from the base station controlling station 303 through the base station providing the communication services to the mobile terminal 301.

It is to be noted that the control of the report frequency of the receiving quality message is made, e.g., through DPCH channel. However, it is possible that the control can be made through DSCH channel.

If the mobile terminal 301 is not under the soft hand-off condition, i.e., the mobile terminal 301 is receiving communication services from only a single base station, the base station controlling station 303 controls the mobile terminal 301 in such a manner that the report interval of the receiving quality message is basically predetermined long interval, i.e., the receiving quality message is transmitted in a rate of a predetermined number of frames.

In this case, the mobile terminal 301 sends the receiving quality message to the base station providing the communication services to the mobile terminal 301, e.g., at the interval of a predetermined number of frames as illustrated in FIG. 17.

Figure 35:
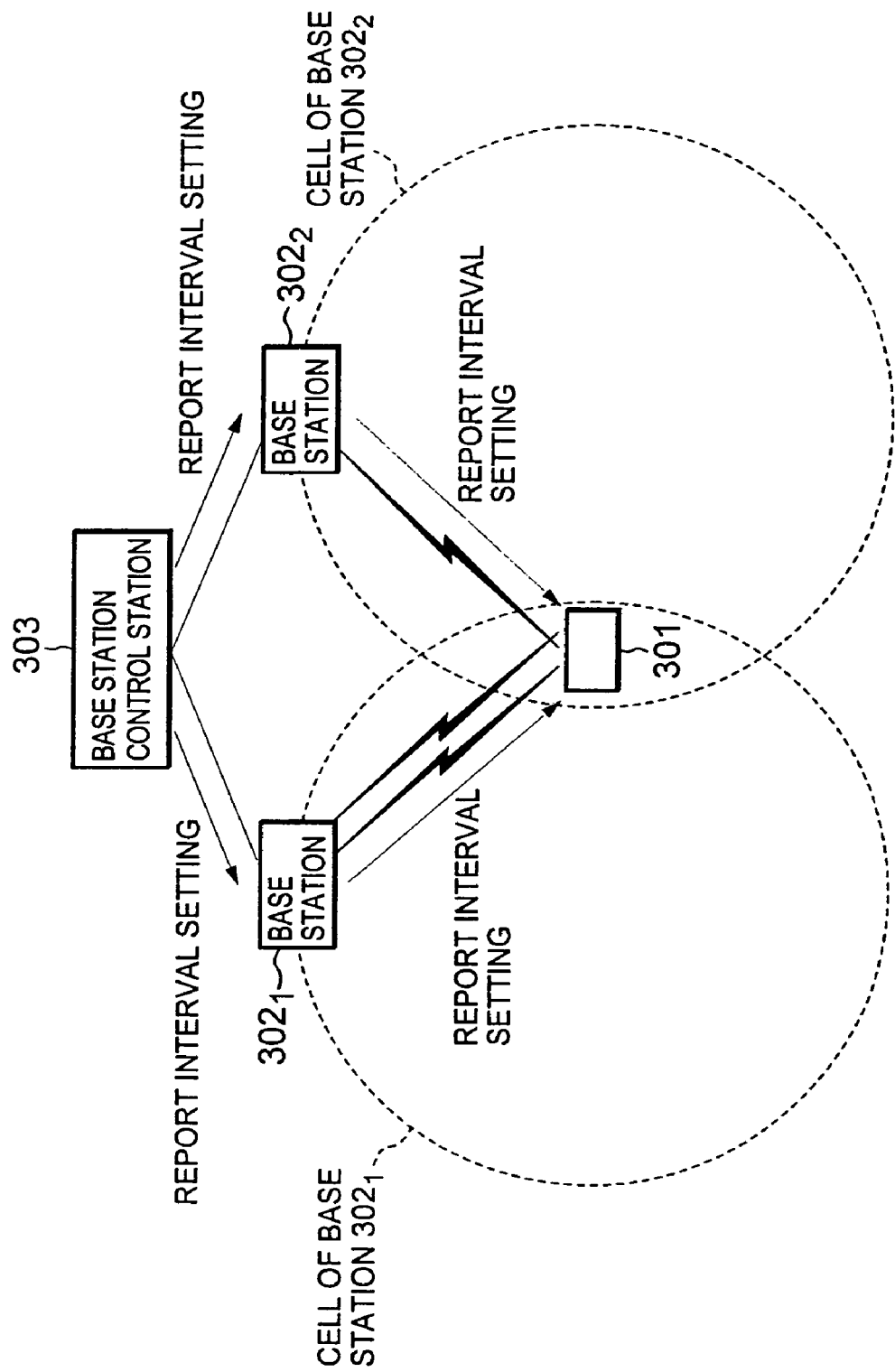
FIG. 35 is a diagram for describing report frequency setting of receiving quality message in case of soft hand-off condition.

On the other hand, if the mobile terminal 301 is under the soft hand-off condition, i.e., both base stations 302₁ and 302₂ are providing communication services to the mobile terminal 301, the base station controlling station 303 sets the report interval of the receiving quality message in the mobile terminal 301 through the base stations 302₁ and 302₂ as illustrated in FIG. 35.

In other words, in this case, the base station controlling station 303 basically controls the mobile terminal 301 so that the report frequency of the receiving quality message becomes high. In this manner, the mobile terminal 301 transmits the receiving quality message to the both base stations 302₁ and 302₂ providing communication services to the mobile terminal 301, e.g., at the frame rate as illustrated in FIG. 15 rather than at the interval of several frames as illustrated in FIG. 17.

Figure 36:
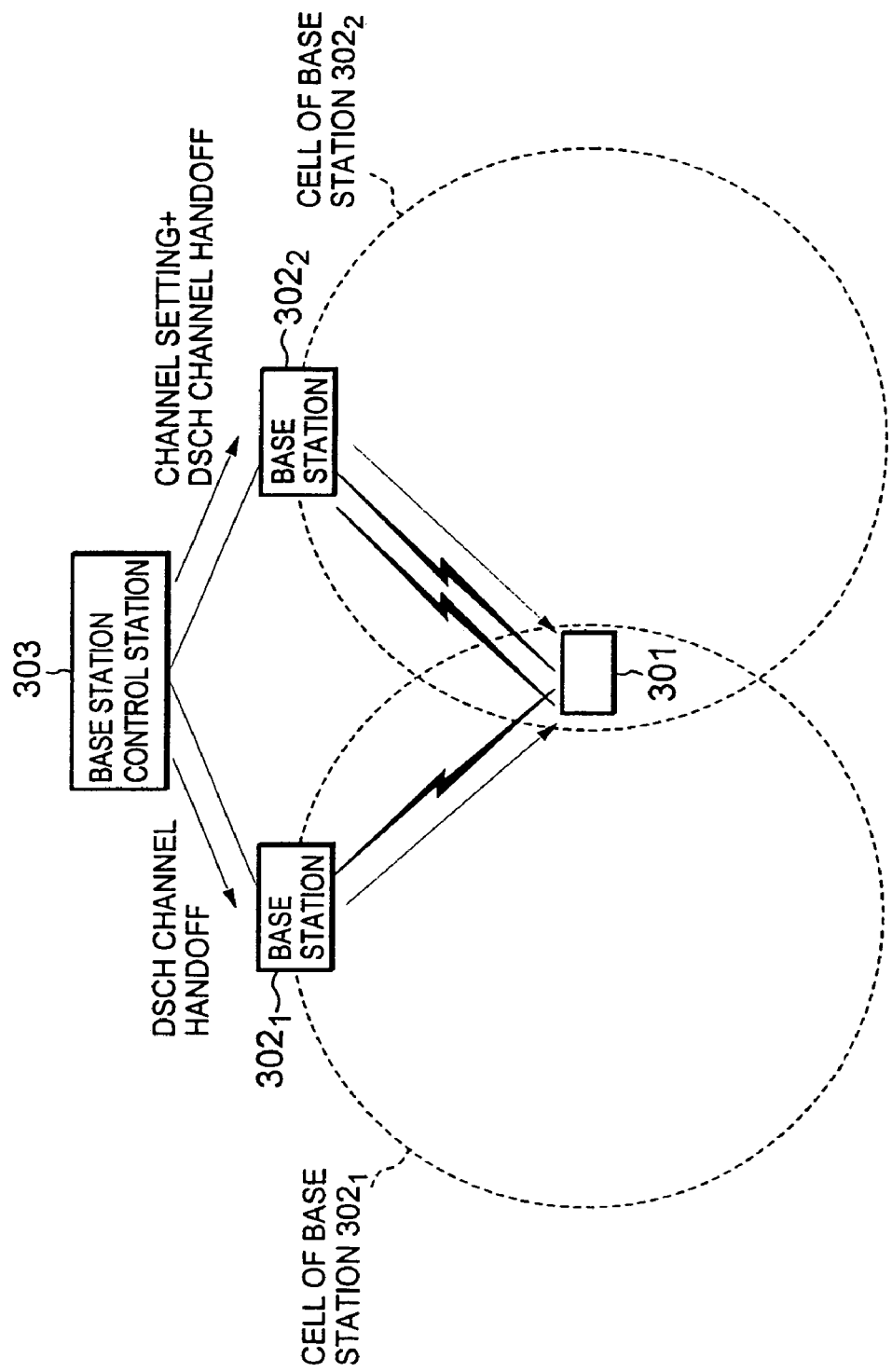
FIG. 36 is a diagram for describing soft hand-off condition.
Figure 37:
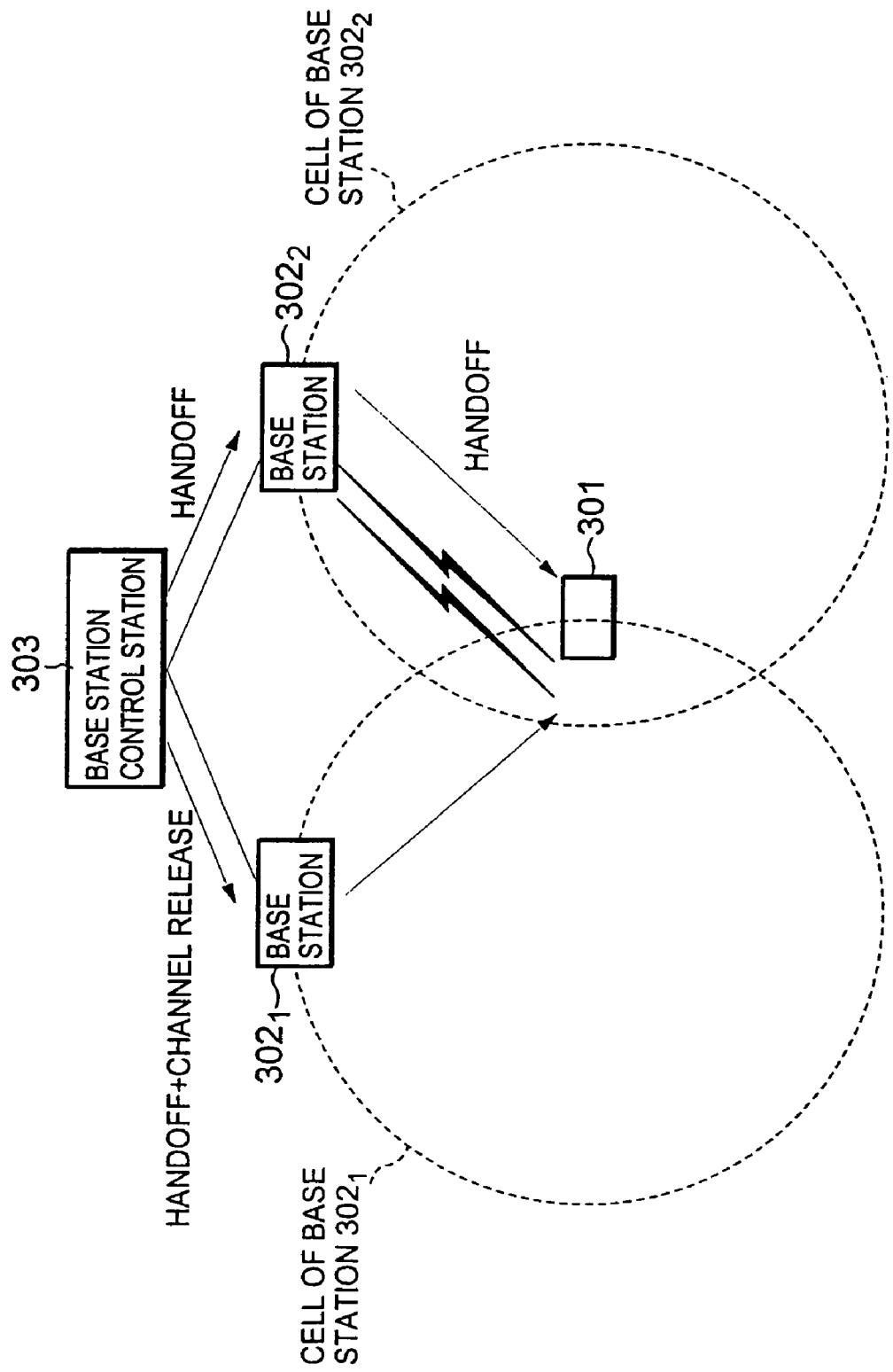
FIG. 37 is a diagram for describing soft hand-off conditions.

Assuming that the mobile terminal 301 is further moved after under the soft hand-off condition and the radio wave signal strength from the base station 302₂ increases while that from the base station 302₁ decreases, e.g., below a predetermined level at the mobile terminal 301, the base station controlling station 303 instructs the setting of various parameters to the base station 302₂ as illustrated in FIG. 36. According to the instructions of the base station controlling station 303, the base station 302₂ sets the DSCH channel parameters.

Furthermore, the base station controlling station 303 instructs hand-off of DSCH channel to the mobile terminal 301 through the hand-off source base station 302₁ and the base station 302₂. In response to the instructions, the mobile terminal 301 switches (hand-off) the DSCH channel receiving from DSCH channel of the base station 302₁ to DSCH channel of the base station 302₂.

After that, the mobile terminal 301 continues to move for further decreasing the radio wave signal strength from the base station 302₁ to the mobile terminal 301. The base station controlling station 303 instructs the hand-off from the base station 302₁ to the base station 302₂ and also instructs to the hand-off source base station 302₁ for releasing channel and other resources allocated to the mobile terminal 301. The base station 302₁ discontinues to provide communication services to the mobile terminal 301, which is now in the condition to receive communication services from only the base station 302₂.

Figure 38:
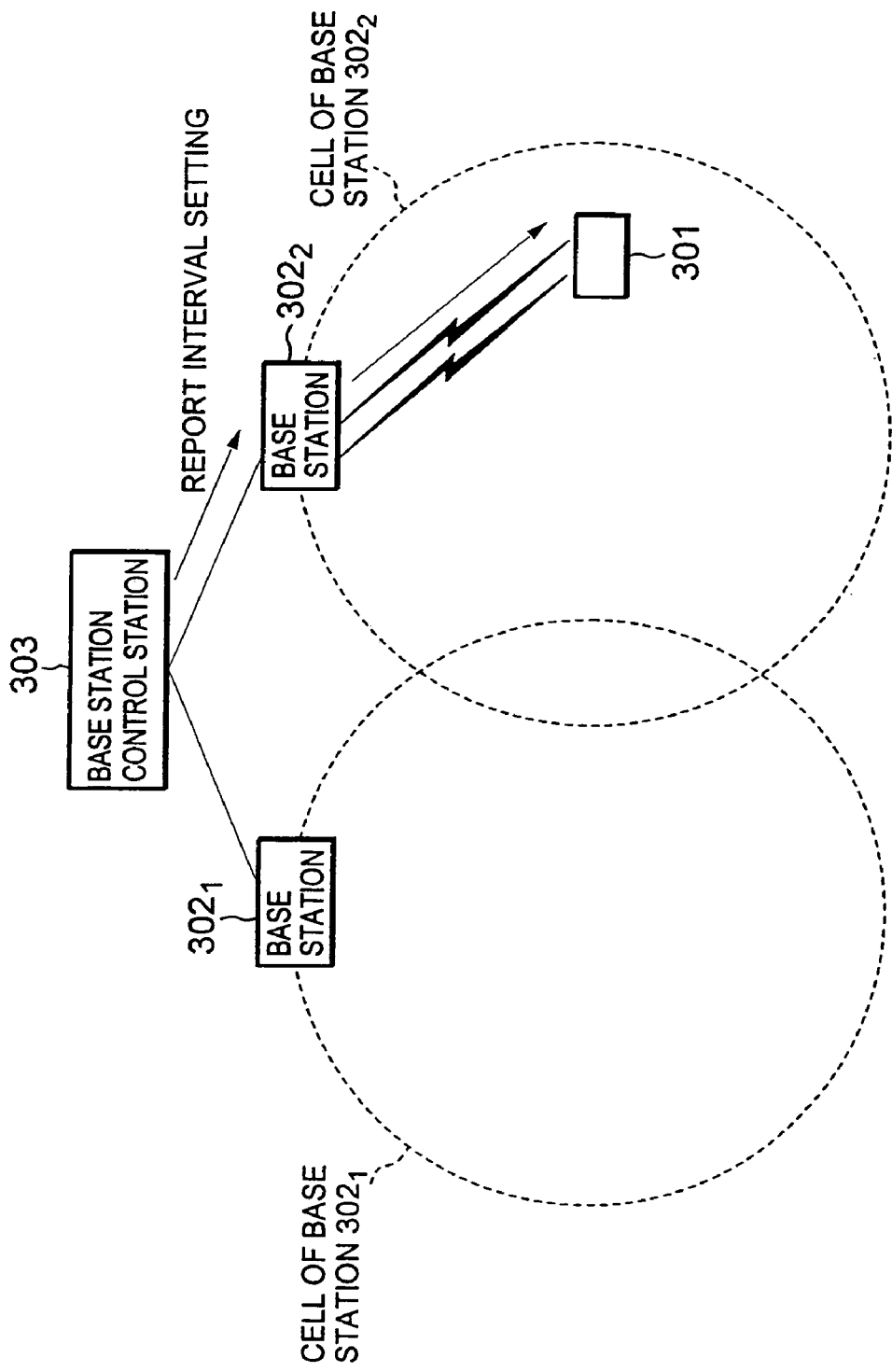
FIG. 38 is a diagram for describing report frequency setting of receiving quality message in case of soft hand-off condition.

In this manner, if the mobile terminal 301 is out of the soft hand-off condition, the base station controlling station 303 controls the mobile terminal 301 to extend the report period of the receiving quality message (or returns to the original rate) as illustrated in FIG. 38. Then, the mobile terminal 301 transmits the receiving quality message to the base station 302₂ which provides communication services to the mobile terminal 301, e.g., at the interval of predetermined number of frames as illustrated in FIG. 17 rather than at the frame rate as illustrated in FIG. 15.

As a result, in case of the soft hand-off condition of the mobile terminal 301, the receiving quality in the mobile terminal 301 can be estimated relatively accurately by using only receiving quality message transmitted at the frame rate or at high frequency even if receiving quality estimation using both the receiving quality message and the power control information cannot be performed, e.g., like the communication system in FIG. 9.

On the other hand, if the mobile terminal 301 is not under the soft hand-off condition, the receiving quality in the mobile terminal 301 can be estimated by using only the receiving quality message transmitted at the interval of a predetermined number of frames or at a low frequency, i.e., by reducing the resources necessary to transmit the receiving quality message. Additionally, in this case, like in the communication system in FIG. 9, when the receiving quality is estimated using the receiving quality message and the power control information, the receiving quality in the mobile terminal 301 can be estimated accurately. It is to be noted that, in case of estimating the receiving quality using the receiving quality message and the power control information, the receiving quality can be estimated in similar or better accuracy as compared to the receiving quality estimation using only the receiving quality message even if the report frequency of the receiving quality message in the mobile terminal 301 is low.

Figure 39:
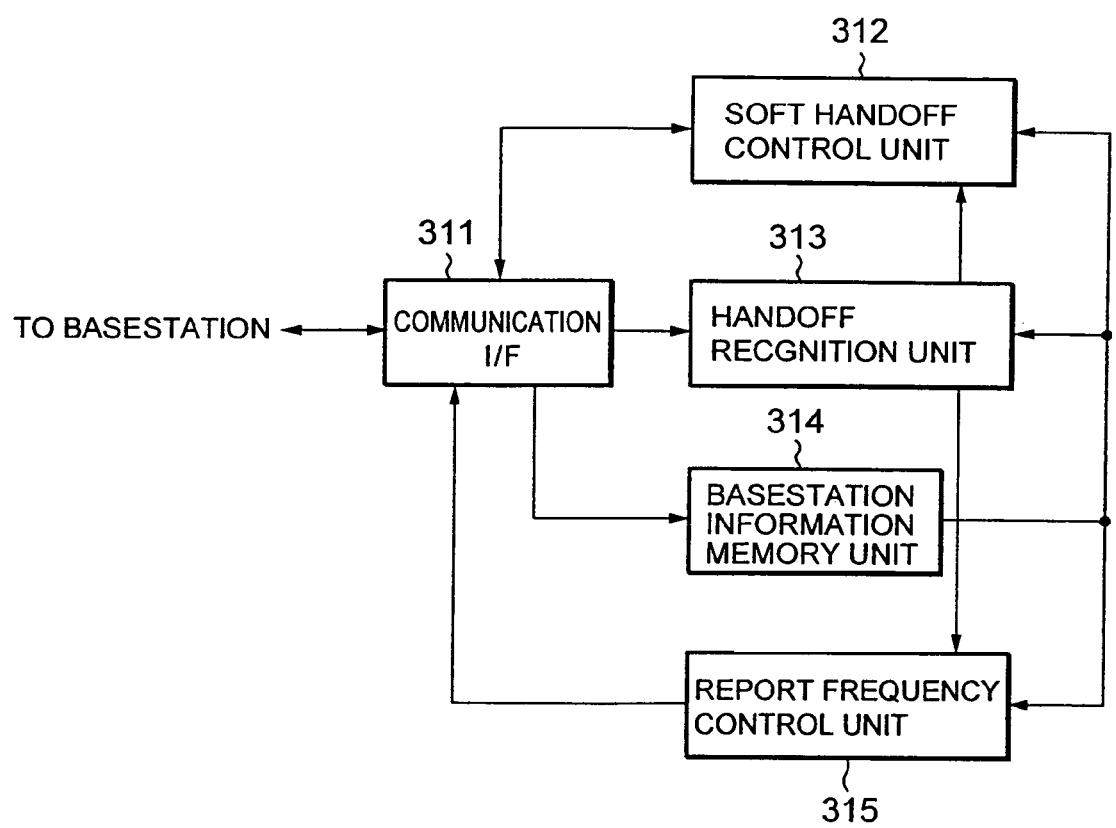
FIG. 39 is a block diagram of an example of base station controlling station 303.

Next, FIG. 39 shows an example of construction of the base station controlling station 303 for setting the report frequency of the receiving quality message by the mobile terminal 301 like the one described hereinabove.

Communication I/F 311 has a function as a communication interface for controlling communication with the base stations $302_1$ and $302_2$, receiving data transmitted from the base stations $302_1$ and $302_2$ for supplying such data to soft hand-off control unit 312, hand-off recognition unit 313 and base station information memory unit 314, and transmitting the data from the soft hand-off control unit 312 or report frequency control unit 315 to the base stations $302_1$ and $302_2$.

When the soft hand-off control unit 312 receives a judgment result of the need of hand-off from the hand-off recognition unit 313 to the mobile terminal 301, it makes the controls necessary for soft hand-off such as DPCH channel and DSCH channel parameter settings of the base stations $302_1$ and $302_2$ through the communication I/F 311.

The hand-off recognition unit 313 judges the need of the above described hand-off of the mobile terminal 301 based on the message including the radio wave signal strength in the mobile terminal 301 transmitted from the mobile terminal 301 by way of the base stations $302_1$ and $302_2$ and received by the communication I/F 311. The judgment result is supplied to the soft hand-off control unit 312. And the hand-off recognition unit 313 recognizes if the mobile terminal 301 is under the soft hand-off condition based on the message of, e.g., the radio wave signal strength in the mobile terminal 301. The recognition result is supplied to the report frequency control unit 315.

The base station information memory unit 314 stores the information on the mobile terminal to which communication services are provided by the base stations $302_1$ and $302_2$ as transmitted therefrom and received by the communication I/F 311 and the base station information on other base stations. It is to be noted that the base station information stored in the base station information memory unit 314 can be referenced by the soft hand-off control unit 312, the hand-off recognition unit 313 and the report frequency control unit 315. The soft hand-off control unit 312, the hand-off recognition unit 313 and the report frequency control unit 315 execute various procedures by referring to the information stored in the base station information memory unit 312 as necessity arises.

The report frequency control unit 315 executes the report frequency control procedure for controlling the reporting frequency (report period) of the receiving quality message of the mobile terminal 301 based on whether or not the mobile terminal 301 is under the soft hand-off condition.

In the base station controlling station 303 having the above construction, the base station information transmitted from the base stations $302_1$ and $302_2$ is received by the communication I/F 311 and supplied to the base station information memory unit 314.

Also, in the communication I/F 311, the radio wave signal strength in the mobile terminal 301 transmitted from the mobile terminal 301 through the base station $302_1$ and $302_2$ is received and supplied to the hand-off recognition unit 313.

The hand-off recognition unit 313 judges whether or not the hand-off is necessary based on the radio wave receiving strength in the mobile terminal 301 from the communication I/F 311 and, if judged that there is need for hand-off, the judgment result is supplied to the soft hand-off control unit 312.

Upon receiving the judgment result of the need for hand-off of the mobile terminal 301 from the hand-off recognition unit 313, the soft hand-off control unit 312 makes the necessary controls for soft hand-off of the base stations $302_1$ and $302_2$ through the communication I/F 311.

Also, the hand-off recognition unit 313 judges whether or not the mobile terminal 301 is under the soft hand-off condition and the judgment result is supplied to the report frequency control unit 315.

Upon receiving from the hand-off recognition unit 313 the judgment result that the mobile terminal 301 is under the soft hand-off condition, the report frequency control unit 314 sets the report frequency of the receiving quality message in the mobile terminal 301 to high frequency and such instruction information is transmitted to the mobile terminal 301 through either the base station $302_1$ and $302_2$ through the communication I/F 311. In this case, the mobile terminal 301 is set to generate the receiving quality message in high frequency and such high frequency message is inserted into the transmission data. As a result, the mobile terminal 301 transmits the receiving quality message in higher frequency as compared to the case not under the soft hand-off condition.

In addition, if the recognition result is received from the hand-off recognition unit 313 saying that the mobile terminal 301 is not under the soft hand-off condition, the report frequency control unit 314 sets the report frequency of the receiving quality message of the mobile terminal 301 to a low frequency and the instruction information is transmitted to the mobile terminal 301 through the communication I/F 311 and the base station $302_1$ and $302_2$. In this case, the receiving quality message generation frequency in the mobile terminal 301 is set to low frequency and is inserted into the transmission data in such low frequency. As a result, the mobile terminal 301 transmits the receiving quality message in low frequency as compared to the case unde the soft hand-off condition.

It has to be noted that, although the report frequency control procedure for controlling the report frequency of the receiving quality message by the mobile terminal 301 is executed by the base station controlling station 303 in response to whether or not the mobile terminal 301 is under the soft hand-off condition, it is possible to execute such report frequency control procedure in response to, e.g., the condition of the resources of the base stations $302_1$ and $302_2$ (e.g., number of codes, power, interference, hardware resources in the base stations, software resources and other communication resources).

In other words, for example, in case of any vacancy in resources such as the number of mobile terminals to which communication services are provided by the base station (i.e., the number of mobile terminals in the cell of the base station) and small interference amount, the report frequency of the receiving quality message can be set to high frequency. On the other hand, if resources are saturated due to a large number of mobile terminals in the cell of the base station or large interference amount, or if it is desired to suppress interference amount, the report frequency of the receiving quality message can be set to low frequency.

Figure 40:
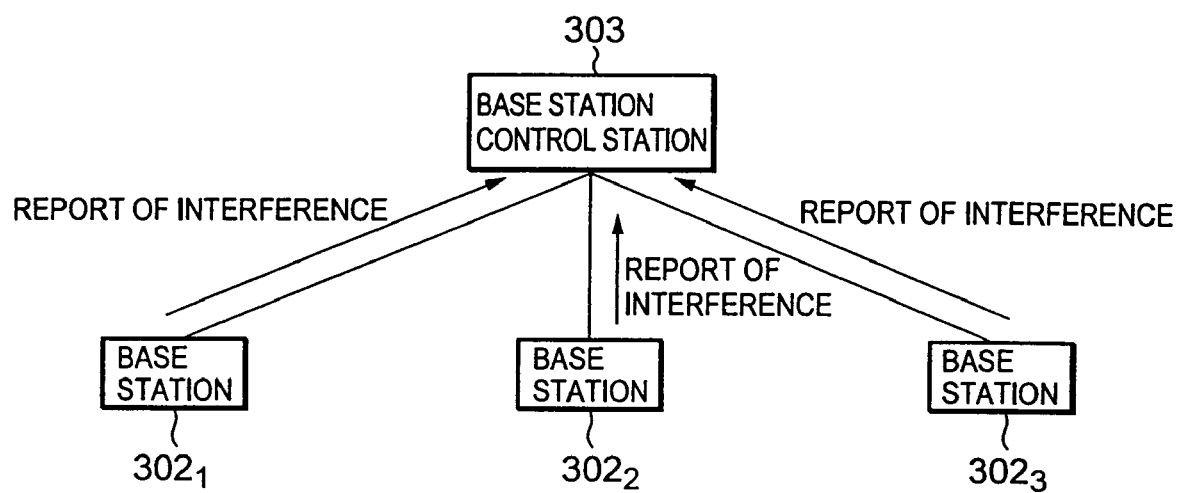
FIG. 40 is a diagram illustrating the way of transmitting interference amount from base station 302 to base station controlling station 303.

It is to be noted that interference amount can be transmitted to the base station controlling station 303 from each base station $302_1$ and $302_2$, $302_3$, ... as illustrated in, e.g., FIG. 40 so that the base station controlling station 303 can recognizes it.

In addition, the number of mobile terminals in the cell of each of the base stations $302_1$ and $302_2$, $302_3$, ... as can be recognized from, e.g., the number of channels in DPCH channel that the base station controlling station 303 allocated to each base station. In this case, the number of mobile terminals (number of users) within the cell can be recognized by the base station controlling station 303 without being transmitted from each of the base stations $302_1$ and $302_2$, $302_3$, ....

Figure 41:
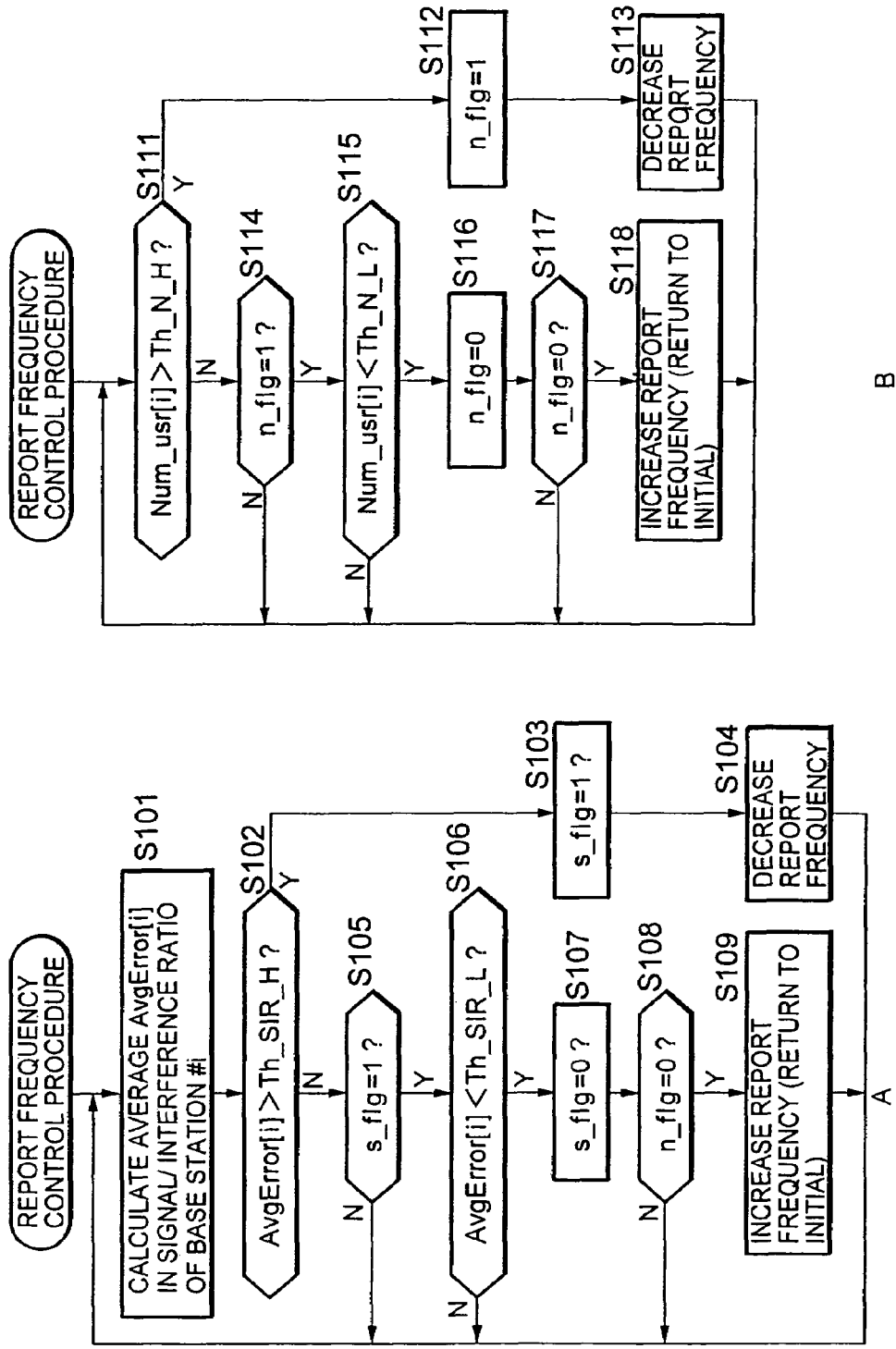
FIG. 41 is a flowchart for describing the report frequency control procedure.

Next, reference is made to the flowchart in FIG. 41 for further description of the report frequency control procedure in the base station controlling station 303 in FIG. 39 for controlling the report frequency of the mobile terminal 301 in response to both interference amount and the number of users in the cell.

In this case, the report frequency control procedures in FIG. 41A and FIG. 41B are executed in parallel in the report frequency control unit 315 of the base station controlling station 303 (FIG. 39).

In other words, the report frequency control unit 315 of the base station controlling unit 303 (FIG. 39) receives interference amount from the base station # i through the communication I/F 311 and the base station information memory unit 314.

Here, although there are various definitions of interference amount, 3GPP Technical Specification 25.215, e.g., discloses base station transmission power, signal-to-interference ratio, signal-to-interference ratio error, etc. In this particular case, e.g., a signal-to-interference ratio error is used as interference amount. It is to be noted here that the signal-to-interference ratio error represents the difference between the receiving quality estimated in the base station and the receiving quality from which a predetermined FER set for guaranteeing the quality of services provided by the base station (referred to as a reference receiving quality hereinafter). Larger the value, poorer is the receiving quality estimated in the base station than the reference receiving quality.

In the report frequency control procedure in FIG. 41A, the report frequency control unit 315 calculates in step S101 the average value of the signal-to-interference ratio error AvgError[i] for the base station # i by dividing the sum of the signal-to-interference errors for all mobile terminals within the cell of the base station # i transmitted from the base station # i by the number of users in the cell of the base station # i. Then, the procedure advances to step S102.

In step S102, the report frequency control unit 315 judges whether or not the average value of the signal-to-interference ratio errors AvgError[i] for the base station # i is greater (equal to or greater) than a predetermined threshold value Th_SIR_H.

If the average value of the signal-to-interference ratio error for the base station # i AvgError[i] is determined greater than the predetermined threshold value Th_SIR_H, i.e., the interference amount in the base station # i is large and it is difficult to maintain the quality of communication services in the base station # i without any countermeasure, the procedure advances to step S103. The report frequency control unit 45 indicates by setting, e.g., 1 as a 1-bit interference flag s_flg indicating that the interference amount is large. Then, the procedure advances to step S104.

In step S104, the report frequency control unit 315 sets the report frequency of the receiving quality message in the mobile terminals within the cell of the base station # i to a lower frequency than the current frequency and controls the communication I/F 311 to transmit such instruction information. The communication I/F 311 transmits such instruction information to mobile terminals within the cell of the base station # i by way of the base station # i. This sets the report frequency of the receiving quality message from the mobile terminals to low frequency for suppressing the use of resources of the base station # i, and thus suppressing interference amount.

Then, returning to step S101 for waiting for transmission of a new interference amount (i.e., signal-to-interference ratio error), the same procedure as described hereinabove is repeated.

On the other hand, if the average value of the signal-to-interference ratio error for the base station # i AvgError[i] is determined not greater than the predetermined threshold value Th_SIR_H in step S102, the procedure advances to step S105 in which the report frequency control unit 315 checks whether or not the interference flag s_flg is 1.

If determined in step S105 that the interference flag s_flg is not 1, i.e., the interference flag s_flg is, e.g., 0 indicating a low interference amount, it returns to step S101 and waits for transmission of a new interference amount for repeating the above procedure.

As a result, in this case, the report frequency of the mobile terminals within the cell of the base station # i maintains the current condition.

In addition, if the interference flag s_flg is determined to 1 in step S105, i.e., the interference flag s_flg was determined to 1 in step S103 and the interference flag s_flg continued to remain 1, the procedure advances to step S106. The report frequency control unit 315 checks whether or not the average value of the signal-to-interference ratio error for the base station # i AvgError[i] is smaller (or equal to or less) than a low threshold value Th_SIR_L smaller than the threshold value Th_SIR_H in step S102.

If it is determined in step S106 that the average value of signal-to-interference ratio error of the base station # i is less than the threshold value Th_SIR_L, i.e., the average value of signal-to-interference ratio error for the base station # i AvgError[i] is less than the threshold value Th_SIR_H in step S102 but not less than the threshold value Th_SIR_L, i.e., the interference amount in the base station # i is not very large but is quite large, the procedure returns to step S101 to wait for a new interference amount to be transmitted from the base station # i and the above procedure is repeated hereinafter.

As a result, in this case, the report frequency of the receiving quality message by the mobile terminals within the cell of the base station # i is not changed from the current value.

In addition, if the average value of signal-to-interference ratio errors of the base station # i AvgError[i] is determined less than the threshold value Th_SIR_L in step S106, i.e., the interference amount in the base station # i is low, the procedure advances to step S107. The report frequency-control unit 315 sets the interference flag s_flg to 0 indicating low interference amount and the procedure advances to step S108.

In step S108, the report frequency control unit 315 checks whether a 1 bit user number flag n_flg indicating the number of users (the number of terminals) within the cell of the base station # i is, e.g., 0 indicating relatively small number.

It is to be noted that the user flag n_flg 1 indicates that the number of users is relatively large. Also, setting of the user number n_flg to 0 or 1 is made in accordance with the report frequency control procedure as described hereinafter and illustrated in the flowchart in FIG. 41B.

If it is determined that the user number flag n_flg is not 0 in step S108, i.e., the user number flag n_flg is 1 and the number of users within the cell of the base station # i is not small (i.e., the user number is large or not very large but fairly large), the procedure advances to step S101 and waits for transmission of new interference amount from the base station # i. The above procedure is repeated hereinafter.

As a result, also in this case, the report frequency of the receiving quality message of the mobile terminals within the cell of the base station # i is not changed from the current setting in the case.

In addition, if it is determined in step S108 that the user number flag n_flg is 0, i.e., the number of users within the cell of the base station # i is small, the procedure advances to step S109. The report frequency control unit 315 sets the report frequency of the receiving quality message from the mobile terminals within the cell of the base station # i to higher frequency than the current frequency (e.g., if the report frequency was set to low frequency in the past step S104 or step S113 in FIG. 41B to be described hereinafter, such setting is returned to the initial frequency) and such instruction information is transmitted from the communication I/F 311. The communication I/F 311 transmits the instruction information from the report frequency control unit 315 to the mobile terminals within the cell of the base station # i through such base station # i, thereby setting the report frequency of the receiving quality message of the mobile terminals to high frequency.

The procedure then returns to step S101 and waits for transmission of new interference amount from the base station # i and the above procedure is repeated hereinafter.

Next, in the report frequency control procedure in FIG. 41B, the report frequency control unit 315 checks in step S111 if the number of users within the cell of the base station # i Num_usr[i] is larger (or equal to or larger) than a predetermined threshold value Th_N_H.

In step S111, if the number of users within the cell of the base station # i Num_usr[i] is determined to be larger than a predetermined threshold value Th_N_H, i.e., the number of users within the cell of the base station # i is large so that the resources of the base station # i may saturate and makes it difficult to maintain the quality of services, the procedure advances to step S112$_n$ The report frequency control unit 315 sets the user number flag n_flg to 1 indicating that the number of users is large and the procedure advances to step S113.

In step S113, the report frequency control unit 315 sets the report frequency of the receiving quality message of the mobile terminals within the cell of the base station # i to lower frequency than the current frequency as is the case in step S104 in FIG. 41A. Such instruction information is transmitted from the communication I/F 311. The communication I/F 311 transmits the instruction information from the report frequency control unit 315 to mobile terminals within the cell of the base station # i through such base station # i. This sets the report frequency of the receiving quality message of the mobile terminals to low frequency, thereby suppressing the use of resources of the base station # i.

In addition, the procedure returns to step S111 and the above procedure will be repeated hereinafter.

On the other hand, if the number of users within the cell of the base station # i Num_usr[i] is determined not larger than a predetermined threshold value Th_N_H in step S111, the procedure advances to step S114 in which the report frequency control unit 315 checks if the user number flag n_flg is 1.

If the user number flag n_flg is determined not 1 in step S114, i.e., the user number flag n_flg is 0 indicating that the number of users within the cell is small, the procedure returns to step S111 to repeat the above procedure hereinafter.

As a result, in this case, the report frequency of the receiving quality messages of the mobile terminals within the cell of the base station # i is not changed from the current frequency.

In addition, if the user number flag n_flg is determined 1 in step S114, i.e., the user number flag n_flg was set to 1 in the past step S114 and the user number flag n_flg remained 1 thereafter, the procedure advances to step S115. The report frequency control unit 315 checks if the user number within the cell of the base station # i is less than the threshold value Th_N_H in step S111 smaller (or equal to and smaller) than the low threshold value Th_N_L.

If the user number within the cell of the base station# i Num_usr[i] is determined less than the threshold value Th_N_L in step S115, or the user number within the cell of the base station # i Num_usr[i] is less than the threshold value Th_N_H in step S111 but not less than the threshold value Th_SIR_L, i.e., the number of users within the cell of the base station # i is not very large but fairly large, the procedure returns to step S111. The above procedure will be repeated hereinafter.

As a result, even in this case, the report frequency of the receiving quality message of the mobile terminals within the cell of the base station # i is not changed from the current frequency.

In addition, if the user number Num_usr[i] within the cell of the base station # i is determined less than the threshold value Th_N_L in step S115, i.e., the user number within the cell of the base station # i is small, the procedure advances to step S116. The report frequency control unit 315 sets the user number flag n_flg to 0 indicating that the user number is small. Then, the procedure advances to step S117.

In step S117, the report frequency control unit 315 checks if the interference flag s_flg indicating relative magnitude of the interference amount in the base station # i is 0 indicating that the interference amount is small.

If the interference flag s_flg is determined not 0 in step S117, i.e., the interference flag s_flg is 1 and the interference amount in the base station # i is not small (i.e., the interference amount is large or not very large but is moderately large), the procedure returns to step S111. The above procedure will be repeated hereinafter.

As a result, even in this case, the report frequency of the receiving quality message by the mobile terminals within the cell of the base station # i is not changed from the current frequency in this case.

In addition, if the interference amount s_flg is determined 0 in step S117, i.e., the interference amount in the base station # i is small, the procedure advances to step S118. In this step S118, the report frequency control unit 315 sets the report frequency of the receiving quality message by the mobile terminals within the cell of the base station # i to higher frequency than the current rate as is the case in step S109 in FIG. 41A. Such instruction information is transmitted to the communication I/F 311. The communication I/F 311 transmits the instruction information to mobile terminals within the cell of the base station # i through such base station # i, thereby setting the report frequency of the receiving quality message of the mobile terminals to high frequency.

Then, the procedure returns to step S111 and the above procedure will be repeated thereafter.

According to the report frequency control procedure in FIG. 41, the report frequency is sets to low frequency if the interference amount becomes high or if the number of users in the cell increases. And the report frequency of the receiving quality message will remain unchanged from the current rate until the interference amount becomes low or the number of users within the cell reduces sufficiently. However, when the interference amount reduces sufficiently and the number of users within the cell decreases sufficiently, the report frequency of the receiving quality message becomes high frequency (returns to the initial rate).

In addition, although the above described report frequency control procedure can be executed at, e.g., frame rate or at the interval of several frames.

Moreover, although the report frequency of the receiving quality message is controlled in the above case, a similar control may be made on the report frequency of the mode request message.

Furthermore, although the report frequency of the receiving quality message will be decreased sequentially if the average value of the interference amount AvgError[i] is less than the threshold value Th_SIR_H and if the user number within the cell Num_usr[i] is greater than the threshold value Th_N_H in the above embodiment, such switching of the report frequency can be 2 steps, i.e., a first step and a second step which is lower frequency than the first frequency. This can be achieved by setting the report frequency in steps S104 and S113 in the embodiment in FIG. 41 to the second frequency and setting the report frequency to the first frequency in the steps S109 and S118.

Figure 42:
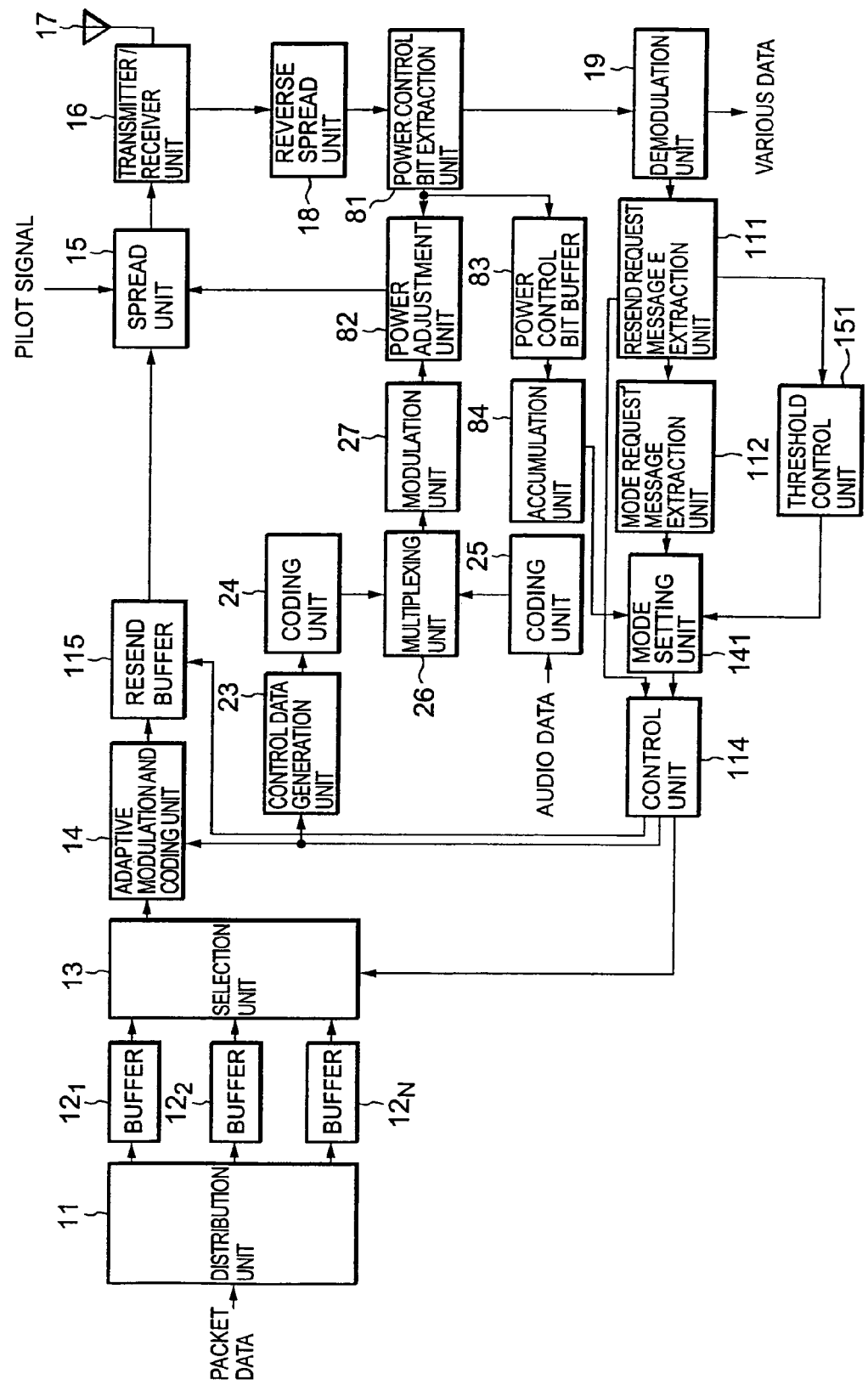
FIG. 42 is a block diagram showing another example of base station 131.

Next, FIG. 42 illustrates the construction of another example of the base station 131 in FIG. 27. It is to be noted in FIG. 42 that the units corresponding to those in FIG. 28 use the same reference numerals and their descriptions will be omitted hereinafter. In other words, the base station 131 in FIG. 42 has basically the same construction as that in FIG. 28 except the new provision of threshold control portion 151.

Supplied to the threshold control unit 151 is a resend request message from the resend request message extraction unit 111. The threshold control unit 151 controls (corrects) the threshold values $-Th_{down}$ and $TH_{up}$ to be used in the mode setting procedure in the mode setting unit 141 in FIG. 30 based on the resend request message supplied from the resend request message extraction unit 111.

In other words, in the base station 131 in FIG. 28, identical threshold values $-TH_{down}$ and $TH_{up}$ are used for all mobile terminals in the mode setting procedure executed by the mode setting unit in FIG. 30.

Although efficient data transmission is possible using identical threshold values $-Th_{down}$ and $TH_{up}$ for all mobile terminals if they have the same receiving characteristic, it is not common that all mobile terminals have the same receiving characteristic. Accordingly, for achieving efficient data transmission by all mobile terminals having different receiving characteristic, it is necessary to execute the mode setting procedure in FIG. 30 using threshold values $TH_{down}$ and $TH_{up}$ corresponding to the receiving characteristic of individual mobile terminal.

For this end, in the base station 131 in FIG. 42, the threshold values $-Th_{down}$ and $TH_{up}$ to be use in the mode setting procedure in the threshold control unit 151 FIG. 30 are controlled to values corresponding to the receiving characteristic of the mobile terminals 131.

Figure 43:
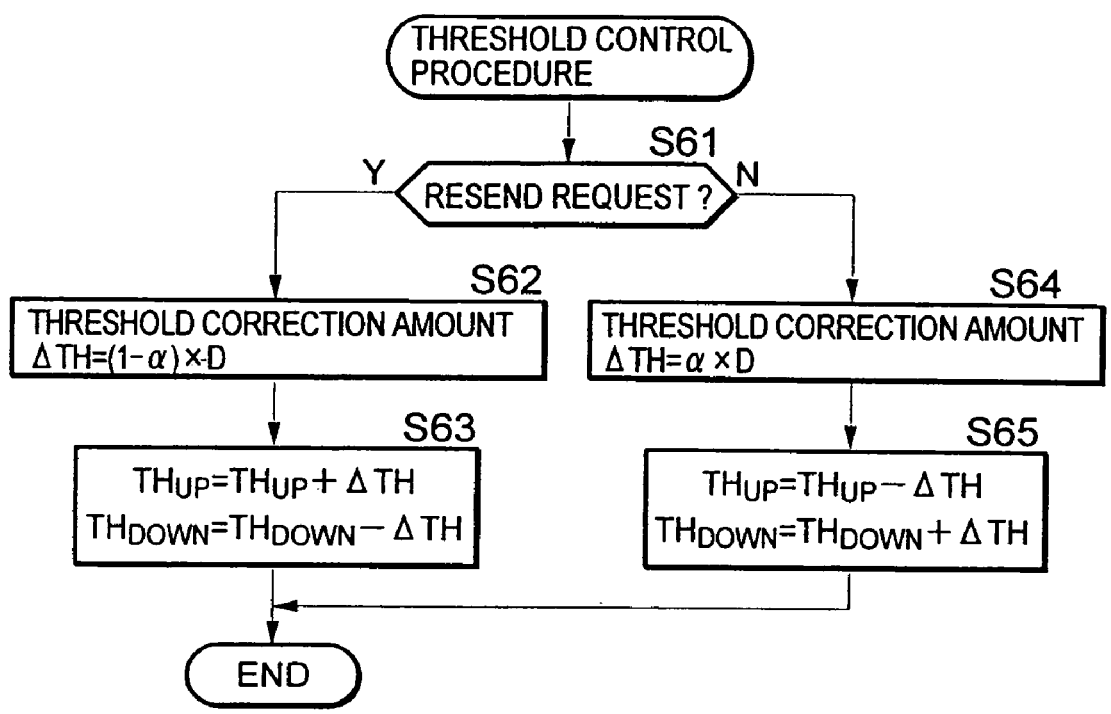
FIG. 43 is a flowchart of threshold control procedure in threshold control unit 151.

In other words, FIG. 43 is a flowchart illustrating the threshold control procedure in the threshold control unit 151.

This threshold control procedure is executed at every time when a frame is supplied to the resend request message extraction unit 111 from the demodulation unit 19.

In other words, in the threshold control procedure, the threshold control unit 151 checks in first step S61 if the resend request message is received from the resend request message extraction unit 111.

If it is determined to have received the resend request message in step S61, the threshold control unit 151 sequentially advances to steps S62 and S63. In order to make modulation coding mode of high data rate is hard to be set, the threshold value $TH_{up}$ is corrected to a large value. In order to make the modulation coding mode of high resistance to noise easy to set, the threshold value $TH_{down}$ is corrected to a smaller value.

In other words, the fact that the resend request message is received by the base station 131 indicates that the data transmitted to the mobile terminal 101 from the base station 131 was insufficient in resistance to noise characteristic. It is therefore preferable to correct the threshold values $TH_{up}$ and $TH_{down}$ so that a high data rate modulation coding mode, i.e., a low resistance to noise modulation coding mode is hard to be set and a high resistance to noise modulation coding mode is easy to be set.

So, in step S62, the threshold control unit 151 calculates a correction amount (referred to as threshold correction amount hereinafter) $\Delta TH$ of the threshold values $TH_{up}$ and $TH_{down}$ in accordance with, e.g., the following expression:

$$\Delta TH = (1-\alpha)\Delta D \qquad (8)$$

It is to be noted that $\alpha$ is a value corresponding to a targeted error rate FER and $0\alpha<1$. In addition, D is a reference value for correcting the threshold value $TH_{up}$ and $TH_{down}$.

In step S562, when the threshold correction value $\Delta TH$ is calculated, the procedure advances to step S63. The threshold control unit 151 corrects the thereshold values $TH_{up}$ and $TH_{down}$ in response to the threshold correction amount $\Delta TH$ in accordance with, e.g., the following expression and completes the procedure.

$$TH_{up} = TH_{up} + \Delta TH$$

$$Th_{down} = Th_{down} - \Delta TH \qquad (9).$$

On the other hand, if it is determined that no resend request message is received, the threshold control unit 151 advances sequentially to steps S64 and S65. The threshold $TH_{up}$ is corrected to a smaller value so that a high data rate modulation coding mode is hard to be set and a threshold value $TH_{down}$ is corrected to a larger value so that a higher resistance to noise modulation coding mode is easily to be set.

In other words, if the base station 131 does not receive the resend request message means that the data transmitted from the base station 131 to the mobile terminal 101 has sufficient resistance to noise and it is possible to transmit the data at even higher data rate. It is preferable to correct the threshold values $TH_{up}$ and $TH_{down}$ so that the modulation coding mode to higher resistance to noise, i.e., a lower data rate is hard to be set and the modulation coding mode of higher data rate is easily to be set. Accordingly, in step S64, the threshold control unit 315 calculate the correction amount (threshold correction amount) $\Delta TH$ of the threshold values $TH_{up}$ and $TH_{down}$ in accordance with the following expression:

$$\Delta TH = \Delta \times D \qquad (10)$$

If the threshold correction amount $\Delta TH$ is calculated in step S64, the threshold control unit 151 advances to step S65 and corrects the threshold values $TH_{up}$ and $TH_{down}$ in accordance with the following expression and completes the procedure.

$$TH_{up} = TH_{up} - \Delta TH$$

$$Th_{down} = TH_{down} + \Delta TH \qquad (11)$$

It is to be noted that the threshold correction procedure in FIG. 43 is executed for each mobile terminal. In the mode setting procedure in FIG. 43 for each mobile terminal, the threshold values $TH_{up}$ and $TH_{down}$ as calculated in the threshold control procedure are used for each of the mobile terminals.

Figure 44:
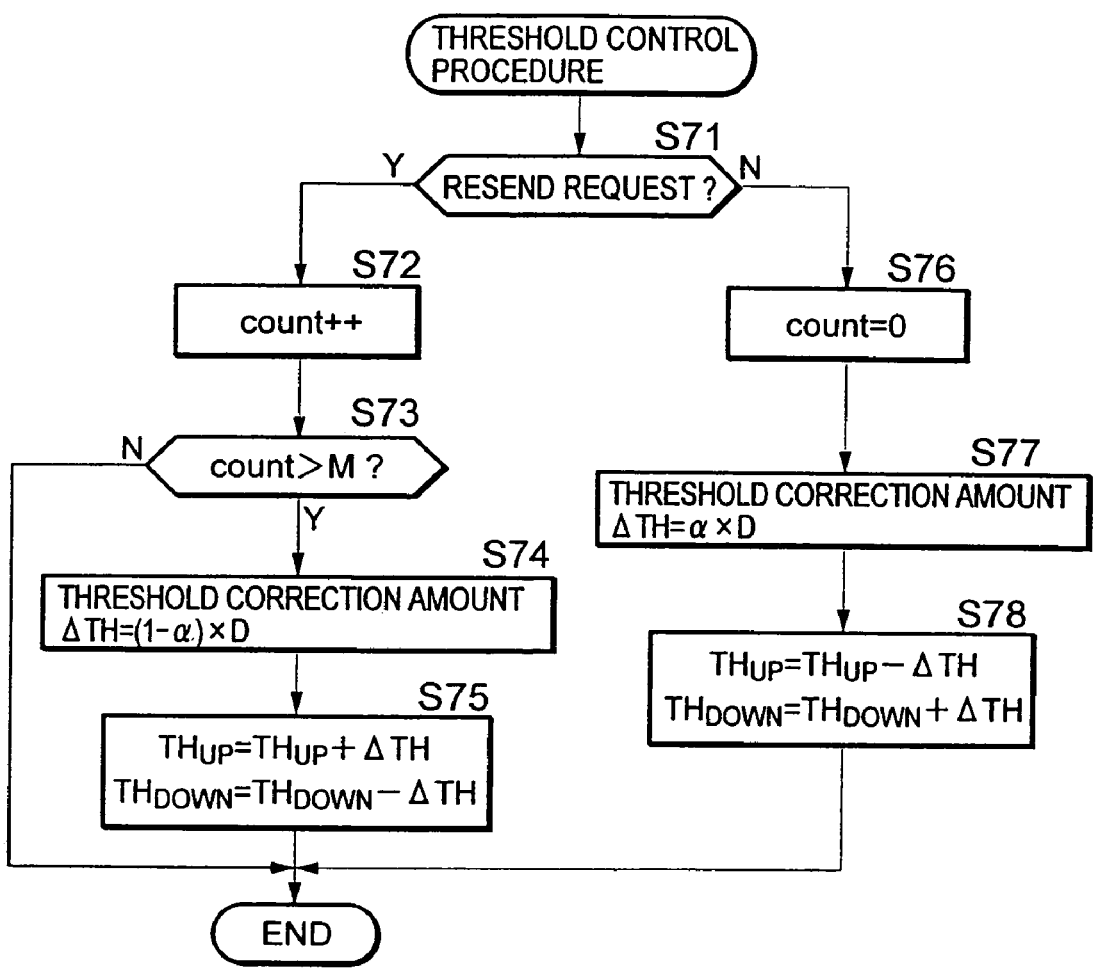
FIG. 44 is a flowchart of threshold control procedure in threshold control unit 151.

Next, FIG. 44 is a flowchart of another embodiment of the threshold control processing in the threshold control unit 151.

In the embodiment in FIG. 44, it is checked in first step S71 if the resend request message is received like step S61 in FIG. 43.

If it is determined that the resend request message is received in step S71, the threshold control unit 151 advances to step S72 and increments 1 as a variable 'count' for counting the number of continuous resend request messages. Then, the procedure advances to step S73.

In step S73, the threshold control unit 151 checks if the variable 'count' is greater than M. I the variable 'count' is determined greater than M in step S73, the procedure advances sequentially to steps S74 and S75. Similar procedures are followed in these steps as steps S62 and S63 in FIG. 43, respectively. And the procedure is completed.

On the other hand, if it is determined that no resend request message is received in step S71, the threshold control unit 151 advances to step S76 and the variable 'count' is reset to 0. And the procedure advances sequentially to steps S77 and S78 for executing respectively similar procedures to steps S64 and S65 in FIG. 43 before completing the procedure.

As a result, in the embodiment in FIG. 44, if no resend request message is received by the base station 131 from the mobile terminals, correction of the threshold values $TH_{up}$ and $TH_{down}$ is made in the similar manner to the case in FIG. 43.

On the other hand, if the resend request message is received by the base station 131 from the mobile terminals 131, correction of the threshold values $TH_{up}$ and $TH_{down}$ is made in the similar manner to the case in FIG. 43 only if the resend request message is received continuously for more than M times.

In other words, in the embodiment in FIG. 44, correction of the threshold values $TH_{up}$ and $TH_{down}$ in such a manner as to set to the modulation coding mode of higher resistance to noise is made only if the resend request messages are transmitted in M consecutive frames.

It is to be noted, however, that correction of the threshold values $TH_{up}$ and $TH_{down}$ can be made to have a desired receiving quality based on, e.g., the receiving frequency of the resend request messages, error rate FER or residual error rate by calculating the error rate FER in the mobile terminal 101 or the residual error rate after resending.

The series of procedures as described hereinabove can be performed by means of hardware or software. In the case of performing the series of procedures by means of software, programs for embodying such software may be installed in a general-purpose computer or the like.

Illustrated in FIG. 45 is the construction of a computer in which the programs for executing the above described procedures may be installed.

The programs may be stored in advance in a hard disk 205 or ROM 203 installed in the computer as recording medium.

Alternatively, such programs may be temporarily or permanently stored (saved) in removable recording medium 211 such as a flexible disk, a CD-ROM (Compact Disc Read Only Memory), an MD (Magneto Optical) disk, a semiconductor memory, etc. Such removable recording medium 211 can be provided as so-called package software.

It is to be noted that such programs may be transferred to the computer from a download site in wireless manner by way of a communication satellite for digital broadcasting satellite, or through a wire by way of a network such as LAN (Local Area Network), the Internet, etc. In the computer, the programs transferred in the above manner are received at communication unit 208 and installed into built-in hard disk 205.

The computer includes a built-in CPU (Central Processing Unit) to which instructions are entered in input unit 207 connected to input/output interface 210 through a keyboard, a mouse, a microphone or the like under operation by a user. The programs stored in ROM (Read Only Memory) 203 are executed on receiving such instructions. Alternatively, the CPU 202 can executes by loading into RAM (Random Access Memory) 204 programs stored in the hard disk 205, installed in the hard disk 205 by receiving in communication unit 208 transferred from a satellite or a network or installed in the hard disk 205 by reading out of removable recording medium 211 loaded onto drive 209. In this manner, the CPU 202 executes the procedures in the above flowcharts or the process in the block diagrams as described hereinabove. And the CPU 202 outputs the results of such procedures through the input/output interface 210 onto output unit 206 comprising an LCD (Liquid Crystal Display), a speaker or the like, transmitted from the communication unit 208 or may be recorded in the hard disk 205.

It is to be noted that the processing steps describing the programs for instructing the computer to execute various processing in this specification is not necessarily follow the time sequence as illustrated in the flowchart. Parallel or individual processing (e.g., parallel processing or object processing) may be included.

In addition, programs may be executed by a single computer or by a plurality of computers in a distributed processing manner. It is also possible to execute the programs by transferring such programs to a remote computer.

It has to be noted that, although the present invention has been described about a system for wireless communication by the W-CDMA system in the above embodiments, the present invention can be applied to any communication system other than the W-CDMA The present invention is applicable to not only a wireless communication but also a wire communication. The present invention is not restricted to mobile terminals.

When DSCH channel (FIG. 10 (B)) is not allocated to a mobile terminal, i.e., no communication is made between the mobile terminal and the base station, it is possible to set a low transmission frequency of the receiving quality message or the mode request message from the mobile terminal to the base station. On the contrary, when DSCH channel is allocated to a mobile terminal, i.e., the communication is established between the mobile terminal and the base station, it is possible to set a high transmission frequency of the receiving quality message or the mode request message from the mobile terminal to the base station.

INDUSTRIAL APPLICABILITY

According to the first information processing apparatus, the first information processing method, the first program and the first recording medium of the present invention, the current receiving quality of a communication apparatus is estimated based on both the receiving quality message transmitted from the communication apparatus at a first interval and the power control information transmitted at a second interval shorter than the first interval. As a result, the current receiving quality of the communication apparatus can be estimated accurately.

According to the first communication apparatus, the first communication method, the second program and the second recording medium of the present invention, a receiving quality thereof may be calculated based on the received signal from an information processing apparatus for generation of the receiving quality message indicating the receiving quality thereof and the power control information is also generated for requesting transmission power adjustment of the information processing apparatus based on the signal received from the information processing apparatus. Then, the receiving quality message is inserted into the transmission signal to the information processing apparatus to be transmitted at a first interval and the power control information is inserted into the transmission signal at a second interval shorter than the first interval. As a result, the current receiving quality of the communication apparatus can be estimated accurately in the information processing apparatus based on the receiving quality message and the power control information.

According to the first communication system and the second communication method of the present invention, a receiving quality thereof can be calculated in a communication apparatus based on the signal received from an information processing apparatus for generating the receiving quality message indicating its receiving quality and a power control information for requesting transmission power adjustment of the information processing apparatus is generated based on the signal received from the information processing apparatus. And the receiving quality message is inserted into the transmission signal to the information processing apparatus to be transmitted at a first interval and the power control information is inserted into the transmission signal at a second interval shorter than the first interval. On the other hand, in the information processing apparatus, the current receiving quality of the communication apparatus is estimated based on both the receiving quality message and the power control information. As a result, the current receiving quality of the communication apparatus can be estimated accurately.

According to the second information processing apparatus, the second information processing method, the third program and the third recording medium of the present invention, acquired are a mode request message transmitted from a communication apparatus at a first interval and a power control information for requesting transmission power adjustment transmitted from the communication apparatus at a second interval shorter than the first interval. And a transmission mode to the communication apparatus is set based on both the mode request message and the power control information. As a result, efficient communication in the transmission mode best suited for the current receiving quality in the communication apparatus can be made.

According to the second communication apparatus, the third communication method, the fourth program and the fourth recording medium of the present invention, a receiving quality thereof can be calculated based on the signal received from an information-processing apparatus for generating a mode request message indicating the requesting transmission mode based on the receiving quality and also generating a power control information requesting a transmission power adjustment of the information processing apparatus based on the signal received from the information processing apparatus. And the mode request message is inserted into the transmission signal to the information processing apparatus so as to be transmitted at a first interval and the power control information is inserted into the transmission signal at a second interval shorter than the first interval. As a result, efficient communication can be made in the transmission mode best suited for the current receiving quality of the communication apparatus.

According to the second communication system and the fourth communication method of the present invention, a receiving quality thereof can be calculated in a communication apparatus based on the signal received from an information processing apparatus for generating a mode request message indicating the requesting transmission mode based on the receiving quality and a power control information for requesting the transmission power adjustment of the information processing apparatus is generated based on the signal received from the information processing apparatus. And the mode request message is inserted into the transmission signal to the information processing apparatus at a first interval and the power control information is inserted into the transmission signal in a second interval shorter than the first interval. On the other hand, acquired in the information processing apparatus are the mode request message transmitted from the communication apparatus at the first interval and the power control information transmitted from the communication apparatus at the second interval. And the transmission mode for the communication apparatus is set based on both the mode request message and the power control information. As a result, efficient communication can be made in the transmission mode best suite for the current receiving quality of the communication apparatus.

According to the third information processing apparatus of the present invention, a receiving quality message indicating the receiving quality calculated in a communication apparatus and transmitted therefrom at an interval of a predetermined number of frames is acquired and the current receiving quality of the communication apparatus is estimated based on the receiving quality message. As a result, the receiving quality can be estimated without using large resources for acquisition of the receiving quality message.

According to the third communication apparatus of the present invention, a receiving quality thereof can be calculated at an interval of a predetermined number of frames based on the signal received from the an information processing apparatus for generating the receiving quality message indicating the receiving quality. And the receiving quality message is inserted into the transmission signal to the information processing apparatus at an interval of a predetermined number of frames. As a result, the receiving quality message can be transmitted without using large resources.

According to the fourth information processing apparatus of the present invention, under the soft hand-off condition of a communication apparatus, a receiving quality message to be transmitted at an interval of a predetermined frames and indicating the receiving quality calculated in the communication apparatus is acquired and the current receiving quality o the communication apparatus is estimated based only on the receiving quality message. As a result, under the soft hand-off condition, the receiving quality message at every frame can be estimated.

According to the fourth communication apparatus of the present invention, under the soft hand-off condition, a receiving quality thereof can be calculated at an interval of predetermined frames for generating the receiving quality message indicating the receiving quality. And the receiving quality is inserted into the transmission signal to an information processing apparatus at every predetermined frames. As a result, under the soft hand-off condition, the receiving quality message can be transmitted at the frame rate.

According to the first receiving quality message report controlling method of the present invention, recognized is if a communication apparatus is under the soft hand-off condition, and the report interval of the receiving quality message in the communication apparatus is set depending on whether or not the communication apparatus is under the soft hand-off condition. As a result, it is possible to change the receiving quality message reporting interval depending on the soft hand-off condition.

According to the fifth information processing apparatus of the present invention, acquired is the receiving quality message indicating the receiving quality transmitted from a communication apparatus at a predetermined frequency and calculated in the communication apparatus, and the current receiving quality of the communication apparatus is estimated based on the receiving quality message. In this case, if the communication apparatus is under the soft hand-off condition, the receiving quality message is acquired more frequently than under other conditions. As a result, the receiving quality can be estimated based on the receiving quality message transmitted at a predetermined frequency under other conditions, or based on the receiving quality message transmitted at higher frequency under the soft hand-off condition.

According to the fifth communication apparatus of the present invention, a receiving quality thereof is calculated at a predetermined frequency based on the signal received from an information processing apparatus for generating the receiving quality message indicating the receiving quality. And the receiving quality message is inserted into the transmission signal to the information processing apparatus. In this case, under the soft hand-off condition of the communication apparatus, the receiving quality message is generated more frequently than under other conditions. As a result, the receiving quality message can be transmitted at a predetermined frequency under other conditions while transmitting at higher frequency under the soft hand-off condition.

According to the second receiving quality message report controlling method of the present invention, the communication resource condition for communication between communication apparatuses is recognized for setting the interval of reporting the receiving quality message in the communication apparatus in response to the communication resource condition. As a result, the reporting frequency of the receiving quality message can be varied depending on the communication resource condition.

According to the sixth information processing apparatus of the present invention, acquired is the receiving quality message indicating the receiving quality transmitted from a communication apparatus at a predetermined interval and calculated in the communication apparatus and estimated is the current receiving quality of the communication apparatus based on the receiving quality message. In this case, the interval of the receiving quality message transmitted from the communication apparatus is determined in response to the communication resource condition. As a result, the receiving quality can be estimated based on the receiving quality message that is variable in the report frequency depending on the communication resource condition.

According to the sixth communication apparatus of the present invention, a receiving quality thereof is calculated at a predetermined frequency based on the signal received from an information processing apparatus for generating the receiving quality message indicating the receiving quality. And the receiving quality message is inserted into the transmission-signal to the information processing apparatus at a predetermined frequency. In this case, the receiving quality message is generated based on the interval determined in response to the communication resource condition. As a result, it is possible to make the transmission frequency of the receiving quality message variable in response to the communication resource condition.

What is claimed is:

1. An information processing apparatus for setting a transmission mode based on a mode request message transmitted from a communication apparatus and for requesting the setting of the transmission mode that is predetermined by the communication apparatus as a suitable transmission mode for the communication apparatus, the information processing apparatus comprising:

mode request message acquisition means for acquiring the mode request message to be transmitted from the communication apparatus at a first interval;

power control information acquisition means for acquiring a power control information for requesting transmission power adjustment to be transmitted from the communication apparatus at a second interval shorter than the first interval; and transmission mode setting means for setting the transmission mode to the communication apparatus based on both the mode request message and power control information, wherein the transmission mode is set based on a numerical indicator that is calculated by adding a first numerical indicator generated based on the mode request message and a second numerical indicator generated based on the power control information, a zero weight being assigned to the second numerical indicator when the second numerical indicator is less than a predetermined threshold value, and wherein the power control information is transmitted without being coded.

2. An information processing apparatus as described in claim 1, wherein the mode request message acquisition means acquires the mode request message to be transmitted from the communication apparatus at a predetermined frame rate.

3. An information processing apparatus as described in claim 1, wherein the mode request message acquisition means acquires the mode request message to be transmitted from the communication apparatus by skipping a predetermined number of frames.

4. An information processing apparatus as described in claim 1, wherein the transmission mode setting means sets the transmission mode to the communication apparatus based on the mode request message and the power control information acquired in a predetermined interval.

5. An information processing apparatus as described in claim 4, further comprising accumulation means for accumulating the power control information acquired in a predetermined interval, and the transmission mode setting means setting the transmission mode to the communication apparatus based on an accumulation value obtained by the accumulation means and the mode request message.

6. An information processing apparatus as described in claim 4, wherein the transmission mode setting means sets the transmission mode to the communication apparatus by varying the predetermined time interval corresponding to a delay time from a transmission of the mode request message by the communication apparatus until the transmission mode is set based on the mode request message.

7. An information processing apparatus as described in claim 1, wherein the transmission mode setting means makes correction of the transmission mode requested by the mode request message based on the power control information and sets the final transmission mode.

8. An information processing apparatus as described in claim 7, wherein the transmission mode setting means restrains the transmission mode correction based on the power control information in the case when the communication apparatus can also communicate with another information processing apparatus.

9. An information processing apparatus as described in claim 1, wherein the communication apparatus transmits a resend request message of the data if there is error in the received data, and the transmission mode setting means sets the transmission mode to the communication apparatus based also on the resend request message.

10. An information processing apparatus as described in claim 9, wherein the transmission mode setting means further comprises threshold value correction means for comparing the adjustment value of the transmission power requested by the power control information with a predetermined threshold value, correcting the transmission mode requested by the mode request message for setting a final transmission mode and correcting the predetermined threshold value based on the resend request message.

11. An information processing apparatus as described in claim 10, wherein the threshold correction means corrects the predetermined threshold value based on the resend request message so as to provide a predetermined receiving quality for the communication apparatus.

12. An information processing apparatus as described in claim 1, further comprising data rate control means for controlling the data rate in communication between the communication apparatuses based on the transmission mode set by the transmission mode setting means.

13. An information processing apparatus as described in claim 12, wherein the data rate control means controls the data rate by changing a data coding method or modulation method.

14. An information processing method for setting a transmission mode based on a mode request message transmitted from a communication apparatus and for requesting the setting of the transmission mode that is predetermined by the communication apparatus as a suitable transmission mode for the communication apparatus, comprising:
a mode request message acquisition step for acquiring the mode requesting message transmitted from the communication apparatus at a first interval;
a power control information acquisition step for acquiring a power control information requesting transmission power adjustment to be transmitted from the communication apparatus at a second interval shorter than the first interval; and
a transmission mode setting step for setting the transmission mode to the communication apparatus based on both the mode request message and power control information,
wherein the transmission mode is set based on a numerical indicator that is calculated by adding a first numerical indicator generated based on the mode request message and a second numerical indicator generated based on the power control information, a zero weight being assigned to the second numerical indicator when the second numerical indicator is less than a predetermined threshold value, and
wherein the power control information is transmitted without being coded.

15. A computer-readable medium for recording a program to instruct a computer to execute an information processing to set a transmission mode based on a mode request message transmitted from a communication apparatus and for requesting the setting of the transmission mode that is predetermined by the communication apparatus as a suitable transmission mode for the communication apparatus, the program comprising:
a mode request message acquisition step for acquiring the mode request message to be transmitted from the communication apparatus at a first interval;
a power control information acquisition step for acquiring a power control information requesting transmission power adjustment to be transmitted from the communication apparatus at a second interval shorter than the first interval; and
a transmission mode setting step for setting the transmission mode to the communication apparatus based on both the mode request message and power control information,
wherein the transmission mode is set based on a numerical indicator that is calculated by adding a first numerical indicator generated based on the mode request message and a second numerical indicator generated based on the power control information, a zero weight being assigned to the second numerical indicator when the second numerical indicator is less than a predetermined threshold value, and
wherein the power control information is transmitted without being coded.

16. A communication apparatus for performing communication between an information processing apparatus for transmitting the data by setting the transmission mode for transmitting data to a communication partner, comprising:
mode request message generation means for generating a mode request message indicating the transmission mode based on a receiving quality thereof by calculating the receiving quality based on the signal transmitted from the information processing apparatus;
power control information generation means for generating a power control information requesting transmission power adjustment of the information processing apparatus based on the signal received from the information processing apparatus;
mode request message insertion means for inserting the mode request message into the transmission signal to the information processing apparatus so that the mode request message is transmitted at a first interval by skipping a predetermined number of frames according to information sent from the information processing apparatus; and
power control information insertion means for inserting the power control information into the transmission signal in a manner that the power control information is transmitted at a second interval shorter than the first interval,
wherein the transmission mode is set based on a numerical indicator that is calculated by adding a first numerical indicator generated based on the mode request message and a second numerical indicator generated based on the power control information, a zero weight being assigned to the second numerical indicator when the second numerical indicator is less than a predetermined threshold value, and
wherein the power control information is transmitted without being coded.

17. A communication apparatus as described in claim 16, wherein the mode request message insertion means inserts the mode request message into the transmission signal so that the mode request message is transmitted at a predetermined frame.

18. A communication apparatus as described in claim 16, wherein the mode request message inserting means is inserted into the transmission signal so that the mode request message is transmitted by skipping a predetermined number of frames.

19. A communication apparatus as described in claim 16, wherein the mode request message insertion means inserts the mode request message into the transmission signal by changing the first interval of transmitting the mode request message based on the resources for communicating with the information processing apparatus.

20. A communication apparatus as described in claim 16, wherein the mode request message insertion means changes the first interval depending on whether or not the communication is made with the information processing apparatus.

21. A communication apparatus as described in claim 20, wherein the mode request message insertion means makes the first interval shorter when the communication with the information processing apparatus is performed than when the first interval when the communication between the information processing apparatuses is not performed.

22. A communication apparatus as described in claim 16, further comprising error detection means for detecting an error in the data included in the receiving signal and resend request message insertion means for inserting the resend request message to request resending the data into the transmission signal when there is an error in the data.

23. A communication method for communicating with an information processing apparatus for transmitting data by setting the transmission mode to a communication partner, comprising:
    a mode request message generation step for generating a mode request message indicating the transmission mode requesting based on a receiving quality by obtaining a receiving quality thereof based on the signal received from the information processing apparatus;
    a power control information generation step for generating a power control information requesting transmission power adjustment of the information processing apparatus based on the signal received from the information processing apparatus;
    a mode request message insertion step for inserting the mode request message into the transmission signal to the information processing apparatus so that the mode request message is transmitted at a first interval by skipping a predetermined number of frames according to information sent from the information processing apparatus; and
    a power control information insertion step for inserting the power control information into the transmission signal so that the power control information is transmitted at a second interval shorter than the first interval,
    wherein the transmission mode is set based on a numerical indicator that is calculated by adding a first numerical indicator generated based on the mode request message and a second numerical indicator generated based on the power control information, a zero weight being assigned to the second numerical indicator when the second numerical indicator is less than a predetermined threshold value, and
    wherein the power control information is transmitted without being coded.

24. A computer readable medium for storing a program for instructing a computer to execute a communication processing for communicating with the information processing apparatus to transmit data by setting a transmission mode to transmit the data to a communication partner, the program comprising:
    a mode request message generation step for generating a mode request message indicating the transmission mode requesting a receiving quality thereof obtained based on the signal received from the information processing apparatus;
    a power control information generation step for generating power control information for generating a power control information requesting transmission power adjustment of the information processing apparatus based on a signal received from the information processing apparatus;
    a mode request message insertion step for inserting the mode request message into the transmission signal to the information processing apparatus so that the mode request message is transmitted at a first interval by skipping a predetermined number of frames according to information sent from the information processing; and
    a power control information insertion step for inserting the power control information into the transmission signal so that the power control information is transmitted at a second interval shorter than the first interval,
    wherein the transmission mode is set based on a numerical indicator that is calculated by adding a first numerical indicator generated based on the mode request message and a second numerical indicator generated based on the power control information, a zero weight being assigned to the second numerical indicator when the second numerical indicator is less than a predetermined threshold value, and
    wherein the power control information is transmitted without being coded.

25. A communication system including an information processing apparatus for transmitting data on a transmission mode set for transmitting the data to a communication partner, and one or more communication apparatus for communicating with the information processing apparatus, the communication system comprising:
    the communication apparatus including:
        mode request message generation means for generating a mode request message indicating the requesting transmission mode based on receiving quality calculated based on a signal received from the information processing apparatus;
        power control information generation means for generating a power control information for requesting transmission power adjustment of the information processing apparatus based on the signal received from the information processing apparatus;
        mode request message insertion means for inserting the mode request message into the transmission signal to the information processing apparatus so that the mode request message is transmitted at a first interval by skipping a predetermined number of frames according to information sent from the information processing; and
        power control information insertion means for inserting the power control information into the transmission signal so that the power control information is transmitted at a second interval shorter than the first interval; and
    the information processing apparatus including:
        mode request message acquisition means for acquiring the mode request message transmitted from the communication apparatus at the first interval and for requesting the setting of the transmission mode that is predetermined by the communication apparatus as a suitable transmission mode for the communication apparatus;
        power control information acquiring means for acquiring the power control information transmitted from the communication apparatus at the second interval; and
        transmission mode setting means for setting the transmission mode of the communication apparatus based on both the mode request message and power control information,
    wherein the transmission mode is set based on a numerical indicator that is calculated by adding a first numerical indicator generated based on the mode request message and a second numerical indicator generated based on the power control information, a zero weight being assigned to the second numerical indicator when the second numerical indicator is less than a predetermined threshold value, and wherein the power control information is transmitted without being coded.

26. A communication method for a communication system including an information processing apparatus for transmitting data on a transmission mode set for transmitting the data to a communication partner, and one or more communication apparatus for communicating with the information processing apparatus, the communication method comprising:

in the communication apparatus,
- a mode request message generation step for generating a mode request message indicating the requested transmission mode based on the receiving quality obtained based on the signal received form the information processing apparatus;
- a power control information generation step for generating a power control information requesting transmission power adjustment of the information processing apparatus based on the signal received from the information processing apparatus;
- a mode request message insertion step for inserting the mode request message into the transmission signal to the information processing apparatus so that the mode request message is transmitted at a first interval by skipping a predetermined number of frames according to information sent from the information processing apparatus; and
- a power control information insertion step for inserting the power control information into the transmission signal so that the power control information is transmitted at a second interval shorter than the first interval;

and in the information processing apparatus,
- a mode request message acquisition step for acquiring a mode request message transmitted from the communication apparatus at the first interval and for requesting the setting of the transmission mode that is predetermined by the communication apparatus as a suitable transmission mode for the communication apparatus;
- a power control information acquisition step for acquiring the power control information transmitted from the communication apparatus at the second interval; and a transmission mode setting step for setting the transmission mode to the communication apparatus based on both the mode request message and power control information, wherein the transmission mode is set based on a numerical indicator that is calculated by adding a first numerical indicator generated based on the mode request message and a second numerical indicator generated based on the power control information, a zero weight being assigned to the second numerical indicator when the second numerical indicator is less than a predetermined threshold value, and wherein the power control information is transmitted without being coded.

* * * * *

UNITED STATES PATENT AND TRADEMARK OFFICE
CERTIFICATE OF CORRECTION

PATENT NO. : 7,630,692 B2  
APPLICATION NO. : 11/329744  
DATED : December 8, 2009  
INVENTOR(S) : Katsutoshi Itoh et al.

Page 1 of 1

It is certified that error appears in the above-identified patent and that said Letters Patent is hereby corrected as shown below:

Title page Add

Item

--(30)        Foreign Application Priority Data

| | | |
|---|---|---|
| November 16, 2000 | JP | 2000-349051 |
| August 22, 2001 | JP | 2001-251135--. |

--(86)  PCT No.:    PCT/JP01/10024

§371 (c)(1),  
(2), (4) Date:    November 16, 2001--.

Signed and Sealed this  
Twelfth Day of July, 2016

Michelle K. Lee  
*Director of the United States Patent and Trademark Office*